United States Patent
Suib et al.

(10) Patent No.: US 9,452,933 B2
(45) Date of Patent: Sep. 27, 2016

(54) MESOPOROUS METAL OXIDES AND PROCESSES FOR PREPARATION THEREOF

(71) Applicant: UNIVERSITY OF CONNECTICUT, Farmington, CT (US)

(72) Inventors: Steven L. Suib, Storrs, CT (US); Altug Suleyman Poyraz, Willington, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 284 days.

(21) Appl. No.: 14/037,107

(22) Filed: Sep. 25, 2013

(65) Prior Publication Data

US 2014/0286846 A1 Sep. 25, 2014

Related U.S. Application Data

(60) Provisional application No. 61/705,372, filed on Sep. 25, 2012.

(51) Int. Cl.
*C01B 13/32* (2006.01)
*B01J 21/06* (2006.01)
(Continued)

(52) U.S. Cl.
CPC ............. *C01B 13/328* (2013.01); *B82Y 30/00* (2013.01); *C01B 19/004* (2013.01); *C01B 33/113* (2013.01); *C01B 33/124* (2013.01); *C01B 35/1027* (2013.01); *C01B 37/02* (2013.01); *C01G 1/02* (2013.01); *C01G 3/02* (2013.01); *C01G 23/053* (2013.01); *C01G 25/02* (2013.01); *C01G 45/02* (2013.01); *C01G 49/06* (2013.01); *C01G 51/04* (2013.01); *C01P 2002/72* (2013.01); *C01P 2004/03* (2013.01);

(Continued)

(58) Field of Classification Search
CPC ...... C01B 13/14; C01B 13/34; C01B 13/328
See application file for complete search history.

(56) References Cited

U.S. PATENT DOCUMENTS 5,958,367 A  9/1999  Ying et al.
6,752,979 B1  6/2004  Talbot et al.
(Continued)

OTHER PUBLICATIONS

International Preliminary Report on Patentability (IPRP) dated Apr. 9, 2015 from corresponding PCT/US2013/061736, pp. 11.
(Continued)

*Primary Examiner* — Melvin C Mayes
*Assistant Examiner* — Michael Forrest
(74) *Attorney, Agent, or Firm* — Bryan D. Zerhusen; Locke Lord LLP

(57) ABSTRACT

A process for preparing a mesoporous metal oxide, i.e., transition metal oxide, Lanthanide metal oxide, a post-transition metal oxide and metalloid oxide. The process comprises providing a micellar solution comprising a metal precursor, an interface modifier, a hydrotropic ion precursor, and a surfactant; and heating the micellar solution at a temperature and for a period of time sufficient to form the mesoporous metal oxide. A mesoporous metal oxide prepared by the above process. A method of controlling nano-sized wall crystallinity and mesoporosity in mesoporous metal oxides. The method comprises providing a micellar solution comprising a metal precursor, an interface modifier, a hydrotropic ion precursor, and a surfactant; and heating the micellar solution at a temperature and for a period of time sufficient to control nano-sized wall crystallinity and mesoporosity in the mesoporous metal oxides. Mesoporous metal oxides and a method of tuning structural properties of mesoporous metal oxides.

42 Claims, 75 Drawing Sheets

(51) Int. Cl.

| | |
|---|---|
| B82Y 30/00 | (2011.01) |
| C01G 1/02 | (2006.01) |
| C01B 19/00 | (2006.01) |
| C01B 33/113 | (2006.01) |
| C01B 35/10 | (2006.01) |
| C01B 33/12 | (2006.01) |
| C01B 37/02 | (2006.01) |
| C01G 23/053 | (2006.01) |
| C01G 25/02 | (2006.01) |
| C01G 45/02 | (2006.01) |
| C01G 49/06 | (2006.01) |
| C01G 51/04 | (2006.01) |
| C01G 3/02 | (2006.01) |

(52) U.S. Cl.
CPC ........ C01P2004/04 (2013.01); C01P 2004/64 (2013.01); C01P 2006/12 (2013.01); C01P 2006/14 (2013.01); C01P 2006/16 (2013.01); C01P 2006/17 (2013.01)

(56) References Cited

U.S. PATENT DOCUMENTS

| | | |
|---|---|---|
| 2006/0292062 A1 | 12/2006 | Hojo et al. |
| 2010/0196237 A1 | 8/2010 | Yin et al. |
| 2010/0254890 A1 | 10/2010 | Yang et al. |

OTHER PUBLICATIONS

International Search Report dated Feb. 4, 2014 from corresponding PCT/US2013/061730, pp. 3.
International Written Opinion dated Feb. 4, 2014 from corresponding PCT/US2013/061730, pp. 9.
Antonelli et al., Synthesis and Characterization of Hexagonally Packed Mesoporous Tantalum Oxide Molecular Sieves, Chem. Mater., (1996), pp. 874-881, vol. 8, No. 4.
Luca et al., Study of the Structure and Mechanism of Formation through Self-Assembly of Mesostructured Vanadium Oxide, (1997), pp. 2731-2744., vol. 9,No. 12.
Yang et al., Block Copolymer Templating Syntheses of Mesoporous Metal Oxides with Large Ordering Lengths and Semicrystalline Framework, Chem. Mater., (1999), pp. 2813-2826, 11.
Ferdi Schüth, et al., Non-siliceous Mesostructured and Mesoporous Materials, Chem. Mater. (2001),pp. 3184-3195,vol. 13, No. 10.
Tian et al., Self-adjusted synthesis of ordered stable mesoporous minerals by acid-base pairs, nature materials, (2003), pp. 159-162, Published online: ,doi:10.1038/nmat838,vol. 2, www.nature.com/naturematerials.
G.J.D.A. Soler-Illia et al., Block copolymer-templated mesoporous oxides, Current Opinion in Colloid and Interface Science, (2003), pp. 109-126, 8.
Grosso et al., Fundamentals of Mesostructuring Through Evaporation-Induced Self-Assembly, Adv. Funct. Mater., (2004), pp. 309-322, vol. 14, No. 4.
Cassiers et al., Surfactant-Directed Synthesis of Mesoporous Titania with Nanocrystalline Anatase Walls and Remarkable Thermal Stability, J. Phys. Chem. B, (2004), pp. 3713-3721, vol. 108, No. 12.
Sinha et al., Three-Dimensional Mesoporous Chromium Oxide: A Highly Efficient Material for the Elimination of Volatile Organic Compounds Angew. Chem. Int. Ed., (2005), pp. 271-273, 44.
Ba et al., Non-aqueous Synthesis of Tin Oxide Nanocrystals and Their Assembly into Ordered Porous Mesostructures, Adv. Mater., (2005), pp. 2509-2512, 17.
Brezesinski et al., Self-Assembly and Crystallization Behavior of Mesoporous, Crystalline HfO2 Thin Films:A Model System for the Generation of Mesostructured Transition-Metal Oxides, small, (2005), pp. 889-898, 1, No. 8-9.
J. Cao et al., Controllable syntheses of hexagonal and lamellar mesostructured lanthanum oxide, Materials Letters, (2005), pp. 408-411, 59.
J. Chen et al., Morphogenesis of Highly Ordered Mixed-Valent Mesoporous Molybdenum Oxides, J. Am. Chem. Soc., (2005), pp. 14140-14141, 127.

Brezesinski et al., Crystal-to-Crystal Phase Transition in Self-Assembled Mesoporous Iron Oxide Films,Angew. Chem. Int. Ed.,(2006), pp. 781-784, 45.
Fan et al., Nanoparticle Assembly of Ordered Multicomponent Mesostructured Metal Oxides via a Versatile Sol-Gel Process, Chem. Mater., (2006), No. 26, 6391-6396, vol. 18.
Sel et al., Principles of Hierarchical Meso- and Macropore Architectures by Liquid Crystalline and Polymer Colloid Templating, Langmuir (2006), pp. 2311-2322, vol. 22, No. 5.
Armatas et al., Hexagonal Mesoporous Germanium, Science, (2006), pp. 817-820, vol. 313.
Brinker et al., Morphological control of surfactant-templated metal oxide films, Current Opinion in Colloid & Interface Science, (2006), pp. 126-132, 11.
Carreon et al., Mesoporous Nanocrystalline Mixed Metal Oxides from Heterometallic Alkoxide Precursors: Cobalt—Nickel Oxide Spinels for Propane Oxidation, Eur. J. Inorg. Chem., (2006), pp. 4983-4988.
Boettcher et al., Harnessing the Sol-Gel Process for the Assembly of Non-Silicate Mesostructured Oxide Materials, Acc. Chem. Res. ,(2007), 40, pp. 784-792.
Cao et al., Synthesis of Ultra-Large-Pore SBA-15 Silica with Two-Dimensional Hexagonal Structure Using Triisopropylbenzene as Micelle Expander, Chem. Mater.,(2009), pp. 1144-1153, vol. 21, No. 6.
Poyraz et al., Role of Organic and Inorganic Additives on the Assembly of CTAB-P123 and the Morphology of Mesoporous Silica Particles, J. Phys. Chem. C, (2009), pp. 18596-18607, vol. 113, No. 43.
Das et al., Self-Assembled Mesoporous Zirconia and Sulfated Zirconia Nanoparticles Synthesized by Triblock Copolymer as Template, J. Phys. Chem. C, (2009), pp. 8918-8923, 113.
Deshmane et al., Thermally Stable Nanocrystalline Mesoporous Gallium Oxide Phases, Eur. J. Inorg. Chem., (2009), pp. 3275-3281.
Arora et al., Block Copolymer Self-Assembly—Directed Single-Crystal Homo- and Heteroepitaxial Nanostructures, Science, (2010), pp. 214-219, vol. 330.
Bian, et al., A template-free, thermal decomposition method to synthesize mesoporous MgO with a nanocrystalline framework and its application in carbon dioxide adsorption† J. Mater. Chem., (2010), pp. 8705-8710, 20.
Brezesinski et al., Pseudocapacitive Contributions to Charge Storage in Highly Ordered Mesoporous Group V Transition Metal Oxides with Iso-Oriented Layered Nanocrystalline Domains, J. Am. Chem. Soc., (2010), pp. 6982-6990, 132.
Chen et al., Synthesis of Monodisperse Mesoporous Titania Beads with Controllable Diameter, High Surface Areas, and Variable Pore Diameters (14-23 nm), J. Am. Chem. Soc., (2010), pp. 4438-4444, 132.
C.A. Deshmane et al., Microwave-assisted synthesis of nanocrystalline mesoporous gallium oxide, Microporous and Mesoporous Materials, (2010), pp. 97-102, 130.
G.J.D.A. Soler-Illia et al., Multifunctional hybrids by combining ordered mesoporous materials and macromolecular building blocks Chem. Soc. Rev., (2011), pp. 1107-1150, 40.
Chaubal et al., Nonionic polymeric surfactant template for mesoporous NiCo2O4 formation, J Porous Mater, (2011), pp. 177-183, 18.
H. Chen et al., A novel mesostructured alumina-ceria-zirconia tri-component nanocomposite with high thermal stability and its three-way catalysis, Microporous and Mesoporous Materials, (2011), pp. 368-374, 143.
L. Chen et al., Direct synthesis and characterization of mesoporous Fe3O4 through pyrolysis of ferric nitrate-ethylene glycol gel, Journal of Alloys and Compounds, (2011), pp. L1-L5, 509.
C.A. Deshmane et al., Epoxidation of cyclooctene over mesoporous Ga, Ga—Nb, and Ga—Mo oxide catalysts, Catalysis Communications, (2011), pp. 46-51, 15.
G. Fan et al., Synthesis of high-surface-area micro/mesoporous ZnAl2O4 catalyst support and application in selective hydrogenation of o-chloronitrobenzene, Catalysis Communications, (2011), pp. 113-117, 15.

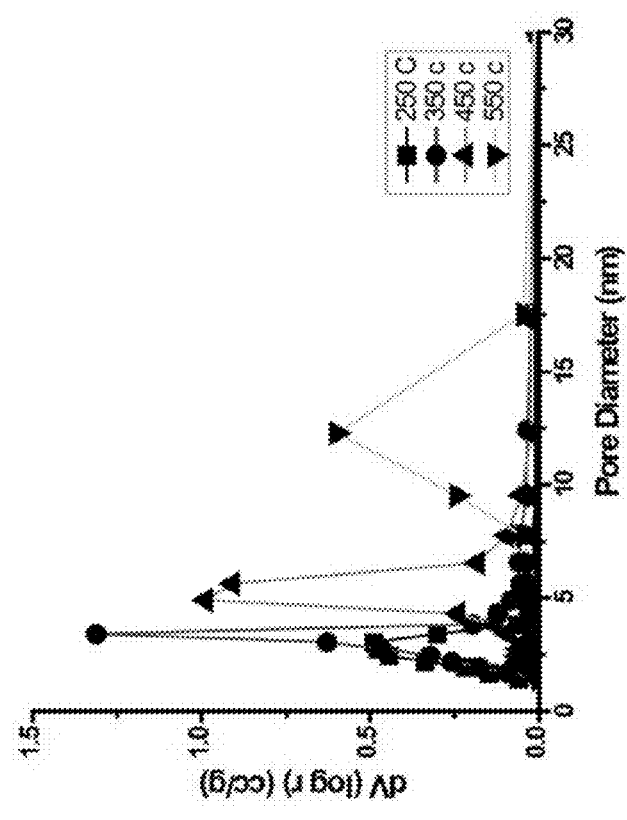
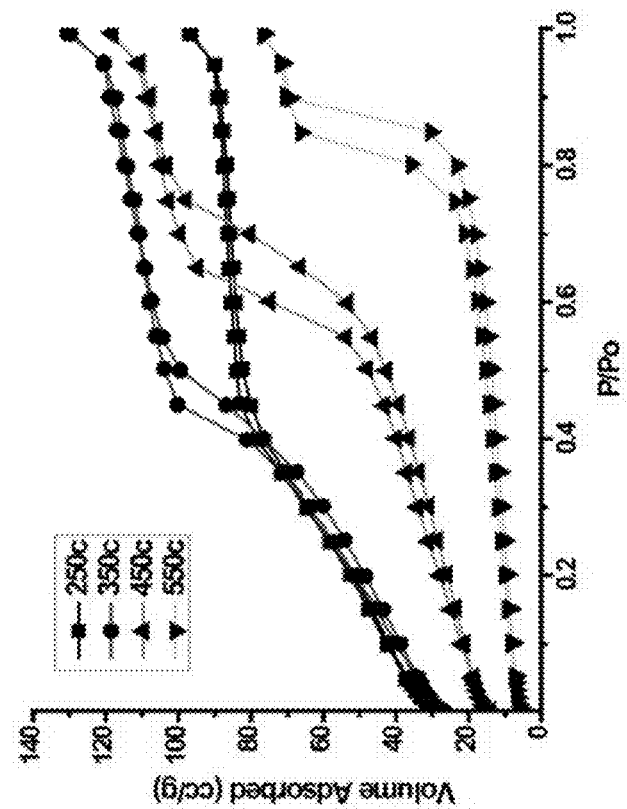
Figure 3

Figure 48 Cont.

| A⁺ | Metallo head group (Co, Cu), imidazolium, pyridinium, 3R-ammonium, guanidinium |
| --- | --- |
| B⁻ | F⁻, Cl⁻, Br⁻, I⁻, SO₄²⁻, SCN⁻, HPO₄²⁻, acetate, NO₃⁻, ClO₄⁻, tosylate, carboxyl |
| C | [CH₂]ₙ, [CF₂]ₙ, [CH₂F₂]ₙ (partially florinated), [CH₂]ₘ-[CF₂]ₙ, poly phenylene ethynylene, 3-(OR)Benzene, [CRH]ₙ, Chitosan, maltoside, polystyrene, bi-block (any combination of C), -O-Benzene, fatty acides, PPO, PEO |
| D | Si(OR)₃, [CH₂]ₙ, [CF₂]ₙ, [CH₂F₂]ₙ (partially florinated), poly phenylene ethynylene, 3-(OR)Benzene, [CRH]ₙ, Chitosan, maltoside, polystyrene, -O-Benzene, fatty acides, PPO, PEO |

Figure 49 Cont.

| A⁻ | COO⁻, OSO₃⁻, SO₃⁻, OPO₃⁻, glutamic acid, glycine |
|---|---|
| B⁺ | H⁺, 4R-ammonium, ammonium, K⁺, Na⁺, Li⁺, Mg²⁺, Ca²⁺, guanidinium |
| C | [CH₂]ₙ, [CF₂]ₙ, [CH₂F₆]ₙ (partially florinated), poly phenylene ethynylene, 3-(OR)Benzene, [CRH]ₙ, chitosan, maltoside, polystyrene, -O-Benzene, [CH₂]ₘ-[CF₂]ₙ, fatty acides |
| D | Si(OR)₃, [CH₂]ₙ, [CF₂]ₙ, [CH₂F₆]ₙ (partially florinated), poly phenylene ethynylene, 3-(OR)Benzene, [CRH]ₙ, chitosan, maltoside, polystyrene, -O-Benzene, fatty acides |

Figure 50 Cont.

| | | |
|---|---|---|
| A | Relatively hydrophobic to B | [CH₂]ₙ, [CF₂]ₘ, [CH₂Fₓ]ₕ (partially florinated), [CH₂]ₘ-[CF₂]ₙ, poly phenylene ethynylene, 3-(OR)Benzene chain, [CRH]ₙ, Chitosan, maltoside, polystyrene, bi-block (any combination of C), -O-Benzene, fatty acides, PPO, PEO, poly-methacrylic acid, poly-acrylic acid |
| B | Relatively hydophilic to A | PPO, PEO, [CRH]ₙ, gluepyronaside, poly-methacrylic acid, poly-acrylic acid |
| C | Relatively hydophilic or hydrophobic to A or B | [CH₂]ₙ, [CF₂]ₘ, [CH₂Fₓ]ₕ (partially florinated), [CH₂]ₘ-[CF₂]ₙ, poly phenylene ethynylene, 3-(OR)Benzene, [CRH]ₙ, Chitosan, maltoside, polystyrene, bi-block (any combination of C), -O-Benzene, fatty acides, PPO, PEO, poly-methacrylic acid, poly-acrylic acid |
| D | Π-Π interaction | aromatic molecules forming Π-Π interaction, benzene, substituted benzene, furan pyrone, styrene, azo-benzene, naphtalene. Can be single molecule or can be exist as block |
| E | Branching point | Any substituted or aromatic ring (eg. Benzene, hexane, pentane etc.) |

| Catalyst | Surface Area (m²/g) | Pore Volume (cc/g) | Conversion% | Selectivity% |
|---|---|---|---|---|
| Commercial $Mn_2O_3$ | 16 | --- | 0 | 0 |
| Commercial $Mn_3O_4$ | 6 | --- | 11 | 100 |
| OMS-2 (MW) | 129 | 0.97 | 65 | 100 |
| UCT-4 ($Mn_2O_3$) | 59 | 0.105 | 53 | 100 |
| UCT-1 (Fresh) | 200 | 0.153 | 8 | 100 |
| UCT-1 (350 °C) | 178 | 0.32 | 80 | 100 |
| UCT-19-SDS (250 °C) | 54 | 0.133 | 80 | 100 (85 °C) |
| UCT-26-TMB-Fresh | 167 | 0.226 | 1 | 100 |
| UCT-26-TMB-250 | | | 100 | 100 |
| UCT-26-TMB-350 | --- | --- | 75 | 100 |

Figure 64

| Entry | T (°C) | Time (min) | Conversion % | Selectivity% | | | |
|---|---|---|---|---|---|---|---|
| | | | | 1 | 2 | 3 | 4 |
| 1 | 90 | 5 | 100 | 90 | 4 | 6 | - |
| 2 | 90 | 10 | 100 | 76 | 8 | 16 | - |
| 3 | 90 | 15 | 100 | 97 | 3 | - | - |
| 4 | 50 | 15 | 98 | 61 | 8 | 14 | 17 |
| 5 | 50 | 30 | 100 | 54 | 15 | 16 | 15 |
| 6 | RT | 15 | 87 | 24 | - | 18 | 58 |
| 7 | RT | 30 | 93 | 16 | 9 | 23 | 52 |

Figure 68

| Calcination (°C) | Catalyst | Surface Area (m²/g) | Conversion (%) | Selectivity (%) |
|---|---|---|---|---|
| 450 | UCT-16 | 150 | 100 | 100 |
| Commercial | CeO$_2$ | 55.3 | 11 | 100 |
| 450 (Commercial) | CeO$_2$ | 34.2 | 8 | 100 |

Figure 71

| Catalyst | T (°C) | Conversion % | Selectivity % | Yield% |
|---|---|---|---|---|
| Commercial ZrO₂ | 200 | 0 | 0 | 0 |
| UCT-17 (ZrO₂) | 200 | 10 | 100 | 10 |
| SO₄ [UCT-17 (UCT-44)] | 150 | 100 | 100 | 45 |
| SO₄ [UCT-17 (UCT-44)] | 200 | 100 | 100 | 63 |

MESOPOROUS METAL OXIDES AND PROCESSES FOR PREPARATION THEREOF

RELATED APPLICATIONS

This application claims the benefit of U.S. Patent Application Ser. No. 61/705,372, filed Sep. 25, 2012, which is incorporated herein by reference. This application is related to U.S. Patent Application Ser. No. 61/705,370, filed Sep. 25, 2012, which is incorporated herein by reference.

BACKGROUND

1. Field of the Disclosure

This disclosure relates to mesoporous metal oxides and processes for making mesoporous metal oxides, in particular, the synthesis of thermally stable mesoporous metal oxides with controllable nano-sized wall crystallinity and mesoporosity. This disclosure also relates to a method of tuning structural properties of mesoporous metal oxides, and a method of controlling nano-sized wall crystallinity and mesoporosity in mesoporous metal oxides.

2. Discussion of the Background Art

Porous transition metal oxides consist of micropores (<2 nm), mesopores (2-50 nm), micropores (>50 nm) and sometimes combinations of these. Considerable interest in the control of pore sizes and pore size distributions of such materials has been a focus for quite some time. The control of particle size in particular in the nanometer regime in the synthesis of nano-size metal oxides is also currently being pursued. Nano-size materials can have markedly different properties than similar compositions that are bulk size (μm and above). Control of morphologies of porous transition metal oxides such as hollow spheres, rods, helices, spirals, and many other shapes has been a major focus of researchers over at least the last 10 years.

Such control comes from specific synthetic methods such as use of templates, structure directors, surfactants, core shell, self assembly, epitaxial growth, size reduction, capping agents, sol gel, and other methods. Morphologies can be controlled by compositions including dopants. The conditions during syntheses such as use of heat, light, pH, point of zero charge, stirring, high pressure, and others are also important.

Mesoporous materials with varied pore sizes and pore size distributions can be obtained for some systems such as silicon and titanium based oxide materials. However, control of pore size distributions to make single size pores and to systematically control such pore sizes and uniformity is difficult, especially with transition metal oxide systems. Control of the structure of the material is also an issue. Many systems have both micropores and mesopores and pore interconnectivity is of interest with these materials. Enhanced mass transport for catalytic reactions might be realized by fine-tuning the porosity of such systems. Incorporation of biomolecules larger than the micropore regime also might be done using well ordered crystalline mesoporous materials.

Most studies of mesoporous transition metal oxide (MTMO) materials have focused on groups I-IV including Y, Ti, Hf, Zr, V, Nb, Ta, Cr, Mo, and W. These have low angle X-ray diffraction peaks indicative of mesostructural ordering and Type IV isotherms. These syntheses have focused on use of water or water plus a base or urea with various amine and carboxyl containing surfactants (S). Other syntheses have been conducted in an alcohol (mainly ethanol) and in the presence of either an acid (mainly hydrochloric acid) or a base. There are either strong Coulombic interactions ($S^+$, $I^-$; $S^-I^+$; $S^+X^-I^+$; $S^-X^+I^-$) or strong ligand metal interactions (I:S<2, very thin walls), and such systems have limited thermal stability and amorphous walls, where I=inorganic species, and X is a mediator. Such syntheses are open to air and various aging times and environmental conditions can influence the porosity of these materials.

Water content is a critical parameter with the synthesis of porous transition metal oxides. Water competes with ethoxy and other alkoxy groups for coordination to the metal and also significantly affects hydrolysis and condensation rates. Since most syntheses are open to the air the water content is very difficult to control. On the other hand, water is essential for reaction. When the number of water molecules per metal atom (H) is >1 then phase separation and nonporous oxides result. When H is <1, ordered mesoporous materials are formed when the metal has empty $t_{2g}$ orbitals. These materials obtain water from the environment during synthesis. When H is <<1, strong surfactant/transition metal interactions occur with weak surfactant surfactant interactions and there is no reaction.

Thermodynamic interactions in such syntheses and factors influencing each term are given in Table 1 below. Table 1 sets forth thermodynamic parameters of surfactant (S) transition metal (M) mesopore syntheses.

TABLE 1

| $DG_m = DG_{org} + DG_I + DG_{inter} + DG_{sol}$ [1] | | | |
|---|---|---|---|
| S-S Interaction determines mesostructure formed (Lamellar, Hexagonal, Cubic) | High Lewis acidity Unsaturated Coordination H (Hydrolysis Ratio H<<1), Condensation hindering molecules (carboxyl, amine, ethylene glycol) | Strong S-M interaction at interface (Coulombic, Covalent bonding, Hydrogen bonding) | Unknown and unpredictable |

In Equation 1 above, $DG_m$ is the formation energy of the mesostructured material; $DG_{org}$ is the surfactant-surfactant interaction; $DG_I$ is the metal-metal interaction; $DG_{inter}$ is the surfactant-metal interaction; and $DG_{sol}$ is the solvent interaction. It would be desirable to develop a process that minimizes the last 2 terms, $DG_{inter}$ and $DG_{sol}$, in order to make well ordered MTMO materials. The absence of totally empty d orbitals restricts the strong interaction between surfactant and metal (ligand to metal charge transfer) which is generally accepted as essential for the formation of ordered materials. Filled $t_{2g}$ orbitals such as in systems containing Mn, Fe, Co, and others are difficult to make with the above methods since charge transfer reactions do not occur.

The present disclosure provides many advantages over the prior art, which shall become apparent as described below.

SUMMARY OF THE DISCLOSURE

This disclosure relates in part to thermally stable mesoporous metal oxide materials, and to controlling physicochemical properties of the mesoporous metal oxide materials by the use of co-surfactants, organic and inorganic additives, mixed metal oxides, solvents and solvent mixtures, and acid mixtures, in the synthesis thereof. The mesoporous metal oxide materials can be prepared by mixing one or more transition metal precursors (Mn, Fe, Co, Ni, Cu, Zn, Ti, Zr), metalloids (Si, Al) and/or lanthanides (Ce) in any ratio (0.1-100%) with one or more of the co-surfactants, organic and inorganic additives, solvents and solvent mixtures, and acid mixtures. Physicochemical properties of the mesoporous metal oxide materials such as unit cell size, pore size, pore type, pore volume, mesostructure type, and surface morphology, can be controlled by the use of co-surfactants, organic and inorganic additives, mixed metal oxides, solvents and solvent mixtures, and acid mixtures. These mesoporous metal oxide materials preserve their unique properties such as crystalline wall structure, pore size, and unit cell expansion, upon heat treatment.

The inverted micelle controlled formation of the mesoporous metal oxide materials of this disclosure makes the tuning of physicochemical properties of the materials possible by controlling micellization and inter-micellar interaction using additives, i.e., co-surfactants, organic and inorganic additives, mixed metal oxides, solvents and solvent mixtures, and acid mixtures. This disclosure demonstrates fine tuning of these parameters by the use of co-surfactants, organic and inorganic additives, mixed metal oxides, solvents and solvent mixtures, and acid mixtures, in the synthesis of the mesoporous metal oxide materials.

This disclosure also relates in part to a process for preparing a mesoporous metal oxide, said process comprising:

providing a micellar solution comprising one or more metal precursors, one or more surfactants, one or more interface modifiers, one or more hydrotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous metal oxide.

This disclosure further relates in part to a mesoporous metal oxide produced by a process comprising:

providing a micellar solution comprising one or more metal precursors, one or more surfactants, one or more interface modifiers, one or more hydrotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous metal oxide.

This disclosure yet further relates in part to a method of controlling nano-sized wall crystallinity and mesoporosity in mesoporous metal oxides, said method comprising:

providing a micellar solution comprising one or more metal precursors, one or more surfactants, one or more interface modifiers, one or more hydrotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to control nano-sized wall crystallinity and mesoporosity in the mesoporous metal oxides.

This disclosure yet further relates in part to a mesoporous metal oxide particulate having nano-sized wall crystallinity, a particle size between about 1 and about 500 nm, a BET surface area between about 50 and about 1000 $m^2/g$, a pore volume (BJH) between about 0.05 and about 2 $cm^3/g$, a monomodal pore size (BJH desorption) distribution between about 1 and 25 nm, and optionally a wall thickness ($2d/\sqrt{3}$−PD, where d is the d-spacing and PD is the pore diameter) between about 2 and about 20 nm; wherein the mesoporous metal oxide particulate exhibits thermal stability up to a temperature of about 800° C.

This disclosure also relates in part to a method of tuning structural properties of mesoporous metal oxides, said method comprising:

selecting one or more metal precursors, one or more surfactants, one or more interface modifiers, and one or more hydrotropic ion precursors;

providing a micellar solution comprising said one or more metal precursors, one or more surfactants, one or more interface modifiers, one or more hydrotropic ion precursors, and optionally one or more organic and/or inorganic additives; wherein said micellar solution comprises a dispersion of micelles in which at least a portion of said one or more metal precursors are solubilized in the micelles; and heating the micellar solution at a temperature and for a period of time sufficient to form the mesoporous metal oxides.

Several advantages result from the processes of this disclosure. This disclosure provides a unique approach and method for the synthesis of thermally stable mesoporous metal (e.g., Mn, Fe, Co, Ni, Cu, Zn, Ti, Zr, Si, Ce, Sm and Gd) oxides with controllable mesopore size (e.g., 2 nm-13 nm) and nano-sized crystalline walls for various sorptive, conductive, structural, catalytic, magnetic and optical applications. This disclosure not only makes the synthesis of mesoporous (metal, transition metal, Lanthanide metal, post-transition metal, metalloid) oxides possible, but also allows one to precisely tune the structural properties of synthesized porous materials by the use of co-surfactants, organic and inorganic additives, mixed metal oxides, solvents and solvent mixtures, and acid mixtures, in the synthesis thereof, and with simple heat treatment cycles. Moreover, the method of this disclosure is applicable to all transition metals, Lanthanide metals, post-transition metals and metalloids with modifications as appropriate in the synthesis procedure.

The high surface area mesoporous metal oxides of this disclosure can have applications in catalysis, drug delivery systems, electrochemistry, HPLC, optical materials, semiconductors, and the like. The performance of a mesoporous metal oxide material in various applications does not only depend on the metal system or systems used but also physicochemical properties of these materials such as mesostructure, pore size and pore volume. These physicochemical properties of mesoporous materials are the main determinants in performance. In accordance with this disclosure, the physicochemical properties of the mesoporous metal oxide materials such as unit cell size, pore size, pore type, pore volume, mesostructure type, and surface morphology, can be controlled by the use of co-surfactants, organic and inorganic additives, mixed metal oxides, solvents and solvent mixtures, and acid mixtures.

In comparison with conventional mesoporous silica such as MCM-41, it has been surprisingly found that the mesoporous metal oxide materials of this disclosure have totally different porous structures than the typical 2D hexagonal and cubic Si and Ti oxide systems, and are more stable for calcination. Traditional Si and Ti oxide materials have long tube channels, whereas the mesoporous metal oxide materials of this disclosure are formed by assembly of nanoparticles. For Ti materials, the mesoporous metal oxide materials of this disclosure have crystalline walls in which crystallinity can be controlled by various calcination procedures by preserving porosity. In comparison with conventional mesoporous silica such as MCM-41, the mesoporous metal oxide materials of this disclosure exhibit pore expansion by calcination, thermal stability, and ability to incorporate various metals by preserving porosity and mesostructure.

Further objects, features and advantages of the present disclosure will be understood by reference to the following drawings and detailed description.

BRIEF DESCRIPTION OF THE DRAWINGS

FIG. 3 depicts (a) nitrogen sorption isotherms of mesoporous $Mn_2O_3$ materials heated to different final temperatures, and (b) a BJH desorption pore size distribution graph of corresponding samples, as prepared in Examples 1 and 2.

FIG. 58(a) shows low angle PXRD diffraction of as synthesized UCT-1 and UCT-27 (TMB). FIG. 58(b) shows low angle PXRD diffraction of UCT-27 (TMB) after various heating cycles.

FIG. 59(a) depicts $N_2$ sorption isotherms of mesoporous $Mn_2O_3$ TMB materials (UCT-27) heated to different final temperatures. FIG. 59(b) depicts BJH desorption pore size distributions of mesoporous $Mn_2O_3$ TMB materials (UCT-27) heated to different final temperatures.

FIG. 61(a) shows TEM images of manganese oxide TMB based mesoporous materials heated to 150° C. FIG. 61(b) shows TEM images of manganese oxide TMB based mesoporous materials heated to 250° C.

FIG. 64 sets forth the conditions and results generated from the Hantzsch reaction catalyzed by mesoporous iron oxide depicted in FIG. 63.

FIG. 68 sets forth the conditions and results generated from the hydration reaction catalyzed by mesoporous cerium oxide depicted in FIG. 67.

FIG. 71 sets forth the conditions and results generated from the conversion reaction depicted in FIG. 70.

DETAILED DESCRIPTION OF THE PREFERRED EMBODIMENT

Figure 1:
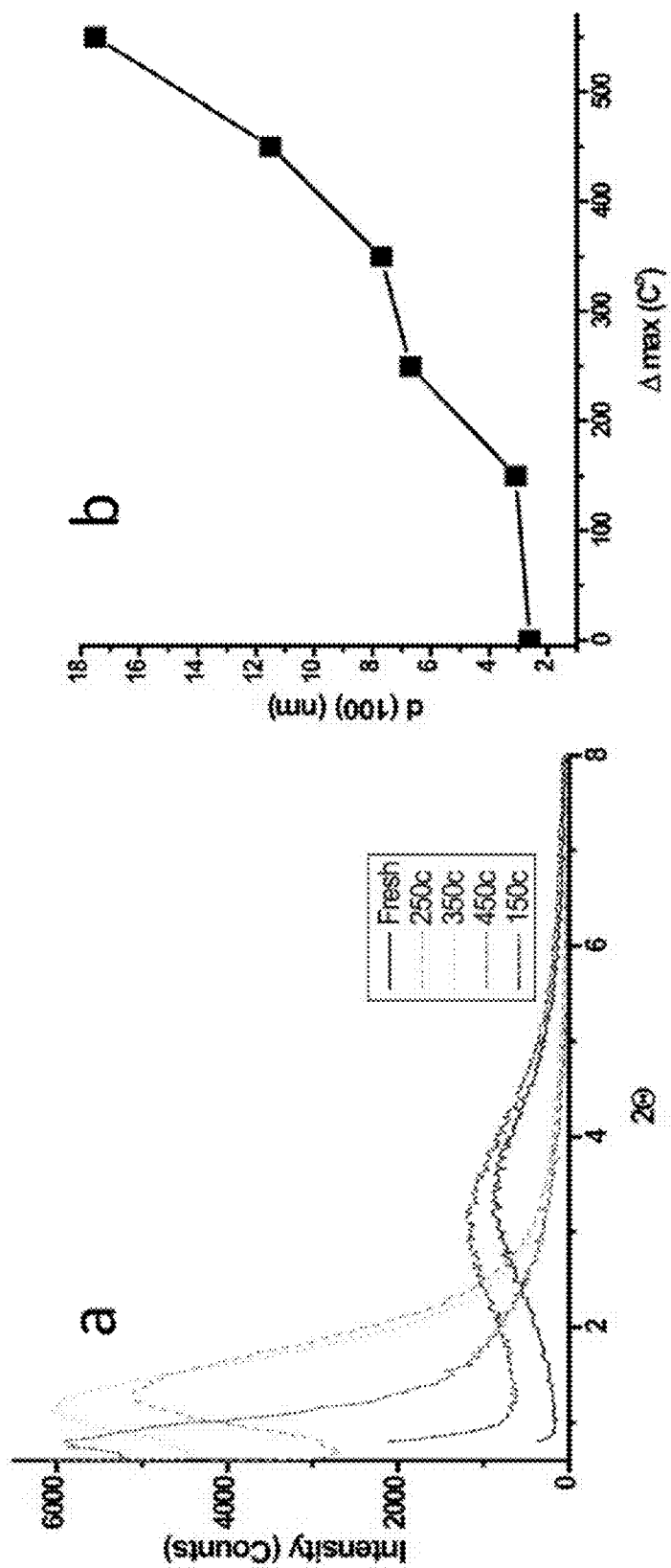
FIG. 1 depicts (a) low angle powder X-ray diffraction (PXRD) of as synthesized (fresh) and mesoporous $Mn_2O_3$ materials heated at different temperatures, and (b) a graph showing change of unit cell dimensions by heat treatment, as prepared in Examples 1 and 2.

All numerical values within the detailed description and the claims herein are modified by "about" or "approximately" the indicated value, and take into account experimental error and variations that would be expected by a person having ordinary skill in the art.

The process of the present disclosure for making mesoporous metal oxides affords a high degree of control with respect to nano-sized wall crystallinity and mesoporosity. The mesoporous metal oxides are useful in various applications including, but not limited to, catalytic, magnetic and optical applications. In particular, the mesoporous metal oxides are useful as catalysts, sensors, batteries and energy production, optical displays, environmental and sorbent applications.

This disclosure offers a new type of porous metal oxide family. It not only makes use of wide range of metals, e.g., transition metals, Lanthanide metals, post-transition metals and metalloids, but also provides more control on the structural properties of synthesized mesoporous metal oxides.

The method of this disclosure eliminates contribution of critical thermodynamic parameters such as strength of interaction at interface, hydrolysis and condensation rates of metal precursor and water content of reaction medium, thereby yielding totally reproducible porous metal oxides. For example, thermodynamically solvation by water is eliminated or minimized by eliminating or minimizing the amount of water in the system. This in turn limits hydrolysis.

The present disclosure provides a simple wet-chemical process that enables the synthesis of nanometer-sized particles (50-300 nm) with tunable pore sizes in the range of 2-30 nm, preferably 2-20 nm, and more preferably 2-13 nm. This surfactant-mediated synthesis may be generalized to achieve various pore structures, including 3-D cubic Im3m, 3-D cubic Fm3m, 2-D hexagonal P6m, foam-like and worm-like pores, as well as different material compositions. The synthesis can produce ultrafine particles with well-defined mesopores, regular particle morphology and excellent pore accessibility. The mesopores are adjustable in size and have high structural ordering. The process uses a surfactant that may act as a supramolecular template for formation of the periodic mesostructure.

One of the unique features of the porous materials synthesized with this method is the tunable porosity. The pore diameter can be controlled between the super micropore range (e.g., about 2 nm) and the mid-mesopore range (e.g., about 13 nm) without losing available pore volume. A pore size of 13 nm is quite unusual for the mesoporous materials synthesized with various surfactant systems. The pore size of the synthesized materials increases with heat treatments applied which is also a unique discovery of this disclosure. This is a contradiction of pore size by heat treatment because of further condensation of wall structure and collapse of the structure with increased heat treatment duration and temperature applied. Tunable pore size might be useful for various catalytic applications in terms of size selective reactions and enhanced ion mobility for battery applications, etc.

Another unique advantage of this method is controlling the crystal structure of the nano-sized metal oxide walls. For instance, amorphous, bixbyite, hausmannite and manganite structures can be obtained for the manganese system. That makes possible the synthesis of target crystal structures for specific applications. Different crystal structures of metals show different optical, magnetic and catalytic properties which indicate that the method described herein is highly desirable for designing unique porous materials.

Other illustrative crystal structures of the nano-sized metal oxide walls include, for example, $CeO_2$, $Mn_2O_3$, $Mn_3O_4$, $Fe_2O_3$, $Co_3O_4$, $ZnO$, $CuO$, $TiO_2$ (Anatase), $ZrO_2$, NiOOH, and the like. The method of this disclosure provides for controllable nano-sized wall crystallinity and the synthesis of target crystal structures for specific applications.

In accordance with this disclosure, well ordered crystalline mesoporous metal oxide systems can be prepared that can result in enhanced sorptive, conductive, structural, catalytic, magnetic and optical properties, in particular, enhanced catalytic activity and selectivity from better transport properties.

Figure 38:
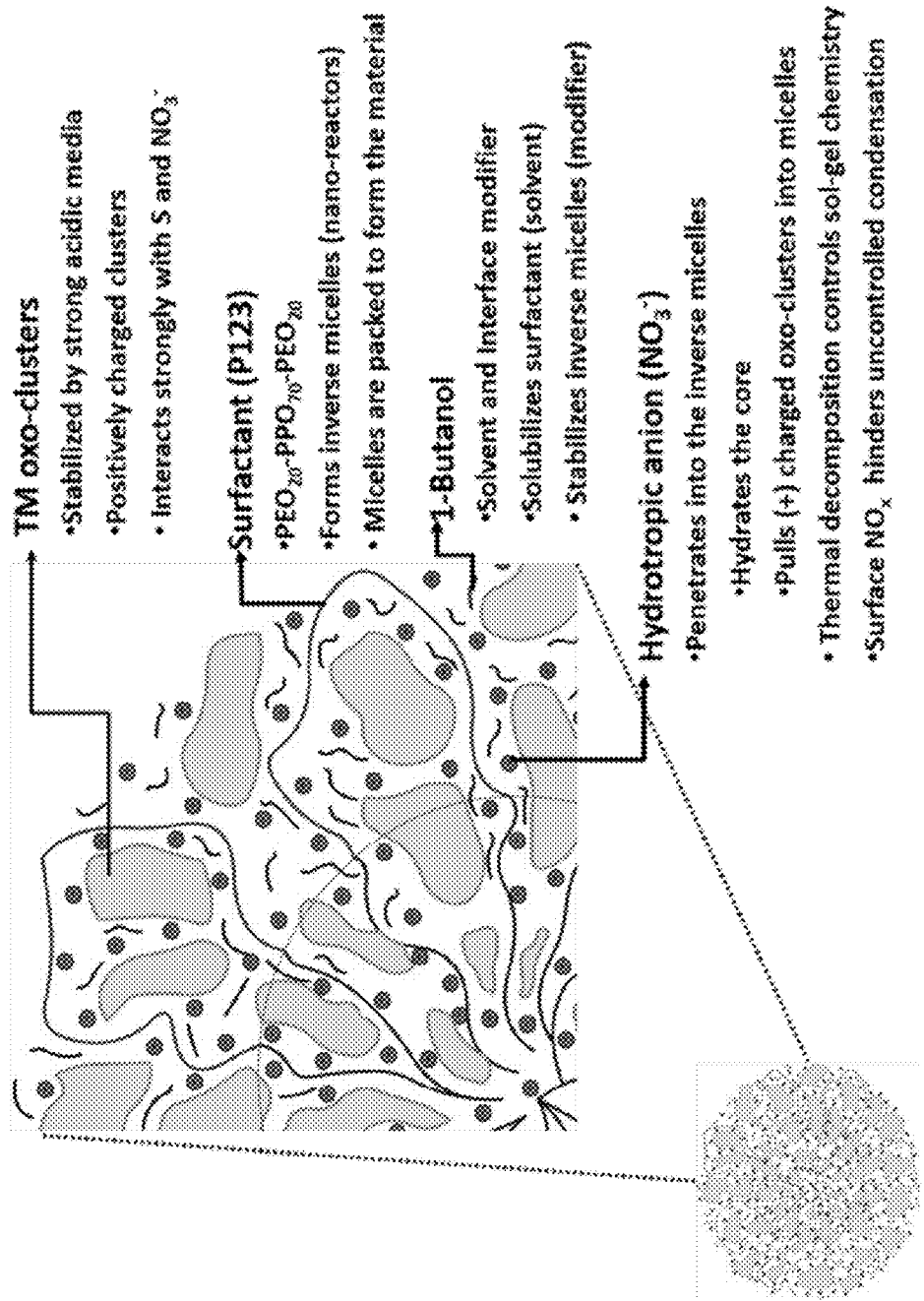
FIG. 38 depicts the sol gel micelle process for preparing well ordered metal oxide mesoporous materials with monomodal uniform pore sizes in accordance with this disclosure.

The process of this disclosure involves a sol-gel micelle based method as depicted in FIG. 38. In an embodiment, the process for preparing $Mn_2O_3$ uses $HNO_3$ at low pH to increase metal precursor solubility, stabilize lower oxidation states, and hydrate the core of the micelles. Mn oxo clusters are stabilized in the $2^+$ oxidation state. Stronger hydrogen bonding interactions with surfactants occur. In FIG. 38, the surfactant species is Pluronic® P123 surfactant which is also the reaction medium. Minimization of water in these syntheses limits the aggregation of metal oxide clusters and confines the entire reaction to the core. An interface modifier like butanol hinders the condensation and limits oxidation of surfactant molecules present in the micelle once the critical micelle concentration (CMC) has been reached. The hydrotropic nitrate ion increases solubility of the Pluronic® P123 surfactant, penetrates into the micelle and decreases the aggregation number (AN), pulls the positively charged manganese oxide clusters into the micelle and balances charge. Referring to Equation 1 hereinabove, in these syntheses, $\Delta G_{inter}$ (everything is in the micelle) and $\Delta G_{sol}$ (no solvent) are not a concern, $\Delta G_I$ is controlled (confinement in the micelle), and $\Delta G_{org}$ is adjusted with $NO_3^-$ and butanol. The $NO_3^-$ ion is critical and can be monitored with Fourier Transform Infrared (FTIR) spectroscopy. On coordination of $NO_3^-$ to $Mn^{2+}$, symmetry is lowered from $D_{3h}$ to $C_{3v}$, the asymmetric stretching mode (E') splits and a stretching mode at 1060 $cm^{-1}$ appears that is also Raman active. In free nitrate, the asymmetric stretching mode of water is near 1360 $cm^{-1}$. In solid environments, nitrate ions balance positive charges and shift the band to lower frequencies. Nitrate ions also bring a further stability to formed nanocrystals by covering the surface of these particles.

During this process, surfactant is oxidized at long reaction times and formed carboxyl groups coordinate to oxomanganese clusters and compete with nitrate to exist in the micelles, although in some systems this is not the case. All samples regardless of reaction time show thermal stability up to 250° C. During the synthesis, carboxylate bands increase while nitrate bands decrease. Spectra are normalized with respect to the Mn—O stretching band (584 cm$^{-1}$). The surfactant C—O stretching mode is between 1050 cm$^{-1}$-1200 cm$^{-1}$. The carboxyl groups are formed due to oxidation of the surfactant at long reaction times. These carboxyl groups are oxidized at 150° C. with a concomitant color change of the solution from black to brown. $NO_3^-$ ions do not fully disappear util 200° C. The carboxyl groups need to be removed to preserve the mesoporous structure. Failure to remove the carboxylate groups leads to unstable mesoporous materials. Depending on reaction conditions, different manganese oxide structures (crystalline walls) can be formed.

In accordance with this disclosure, during thermal treatment, the d-spacings increase. The unit cell expands during heat treatment. The exact position of the d(100) peak depends on the heating temperature and time. Corresponding BET surface area (100-200 m$^2$/g), pore size distributions, and pore volumes (up to 0.22 cc/g) show that mesporous materials are produced with excellent control of pore size distributions (monomodal). These materials are stable up to 800° C. Such control of pore size distribution, enhanced pore volumes, and thermal stabilities are significant advantages afforded with metal oxide mesoporous material compositions prepared in accordance with the process of this disclosure.

The BET surface area of the metal oxide mesoporous material compositions prepared in accordance with the process of this disclosure can be controlled by heat treatment as shown in Table 6 of Example 3 herein below. The surface area of a metal oxide mesoporous material composition is dependent on the particular temperature of the heat treatment and also on the particular material and its structure. At different heat treatment temperatures, different properties can be obtained, e.g., different pore sizes, stabilities, and the like, enabling the metal oxide mesoporous material compositions of this disclosure to be used for different reactions and applications.

As used herein, "thermal stability" means no, or essentially no, degradation of structure at a designated temperature. As used herein, "monomodal" means one, or essentially one, mode as in pore size distribution. As used herein, "control of mesoporosity" means uniform, or essentially uniform, control of pore size, pore size distribution, and shape.

Figure 39:
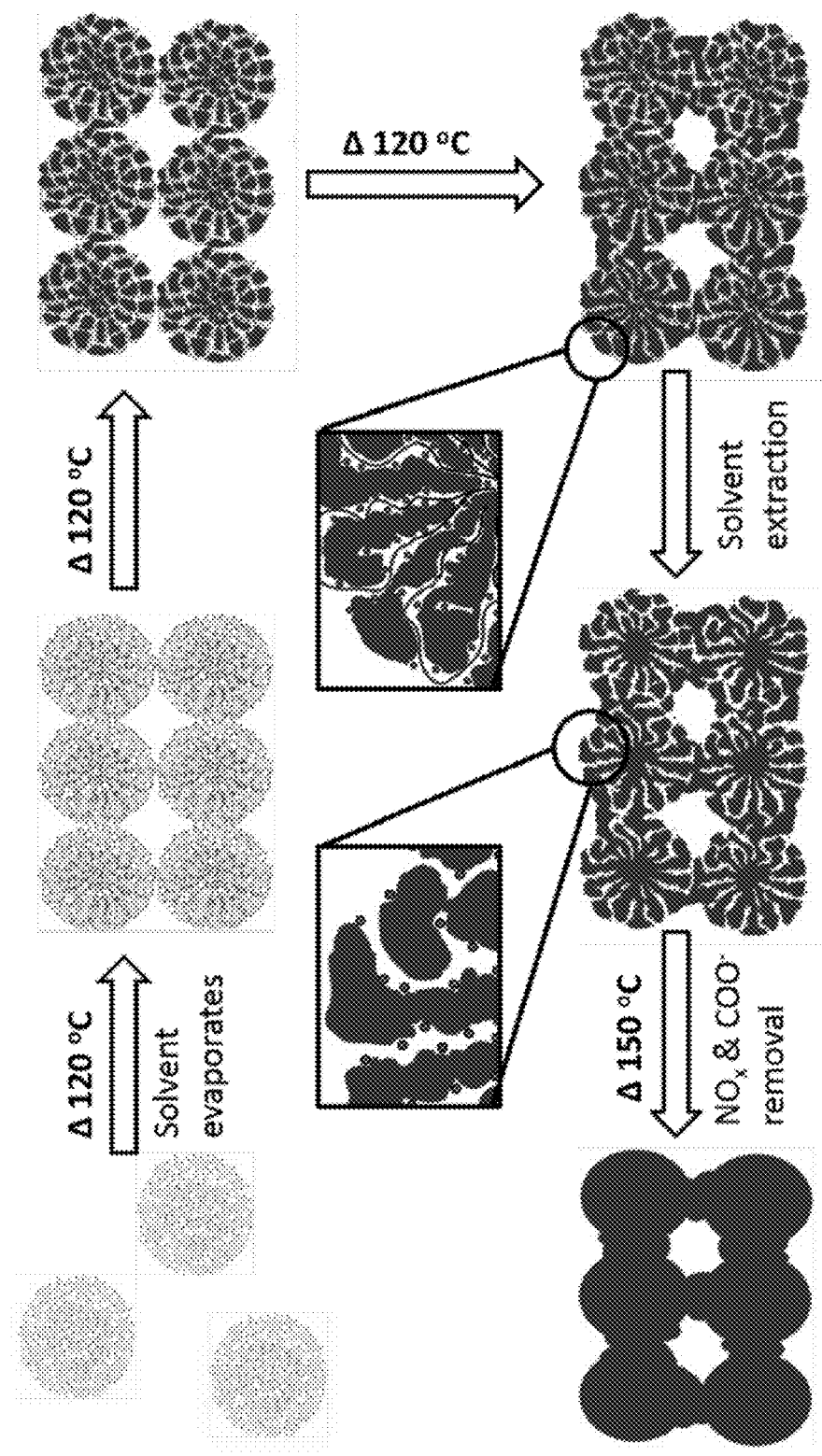
FIG. 39 depicts a proposed mechanism for the formation of highly ordered mesoporous $Mn_2O_3$ in accordance with this disclosure.

Referring to FIG. 39, a proposed mechanism of formation of ordered mesopores is shown. There is pore expansion up to 350° C. Mesopores merge to form larger ordered mesoporous materials between 350° C. and 450° C. The crystalline walls are made up of nanoparticles of manganese oxide that order as observed by X-ray diffraction (XRD), transmission electron microscopy (TEM), and electron diffraction (ED) methods.

Figure 40:
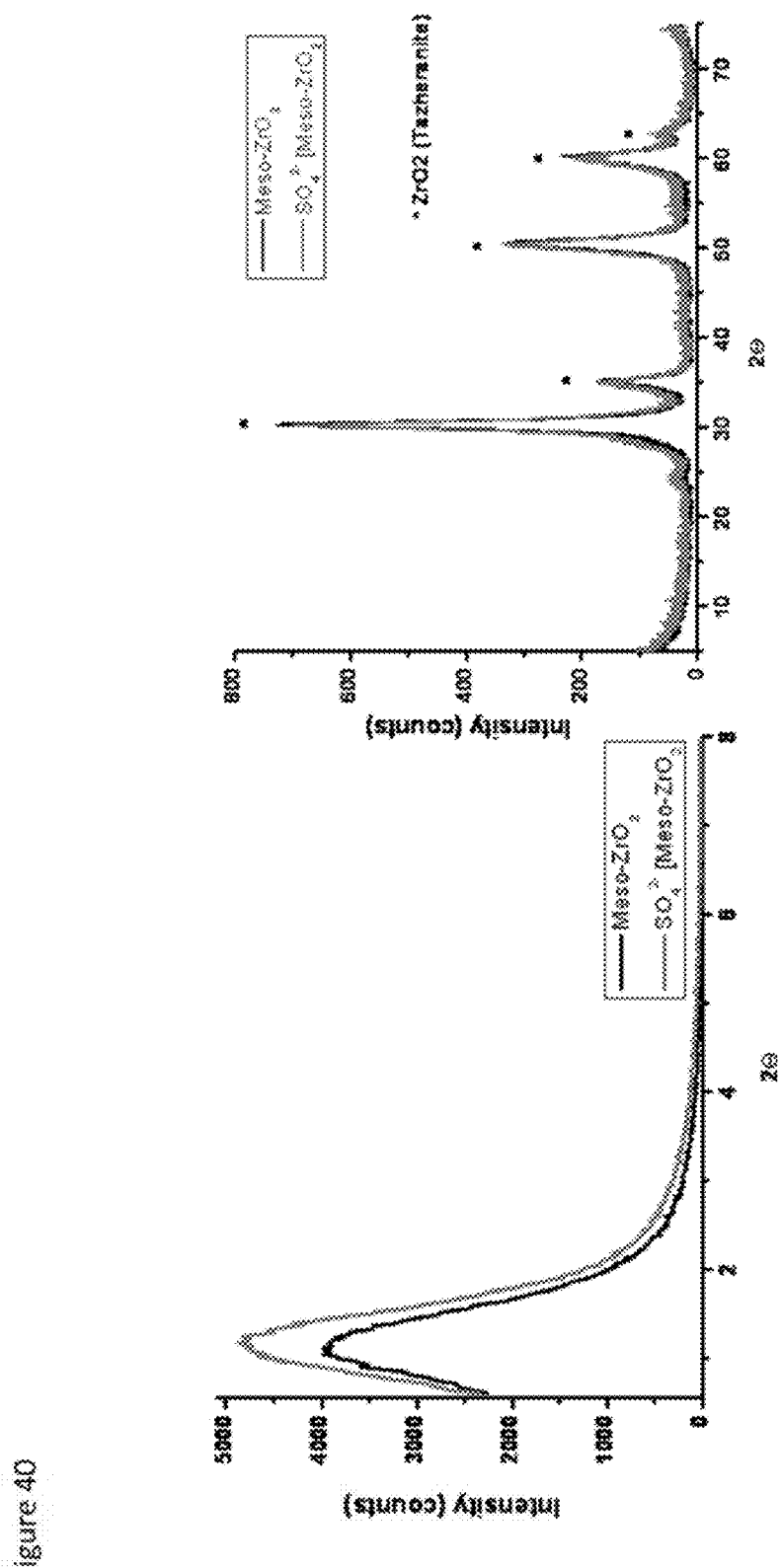
FIG. 40 depicts data showing properties of mesoporous zirconium oxide in comparison with sulfated mesoporous zirconium oxide.

FIG. 40 depicts data showing properties of mesoporous zirconium oxide in comparison with sulfated mesoporous zirconium oxide. The sulfated mesoporous zirconium oxide leads to a stable material. Sulfating often enhances acidity.

Figure 41:
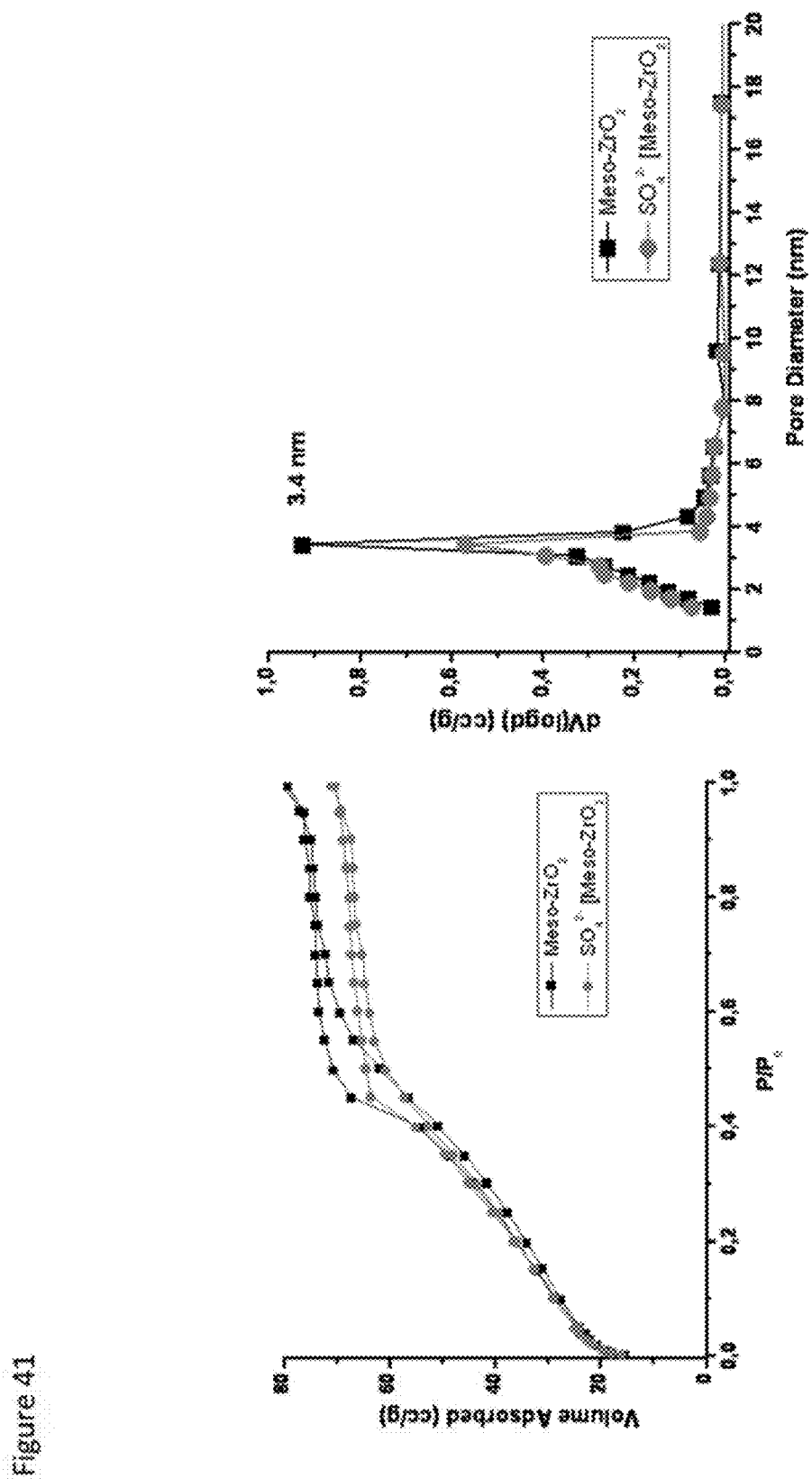
FIG. 41 depicts what is believed to be the mechanism for $HNO_3$ activity.
Figure 41:
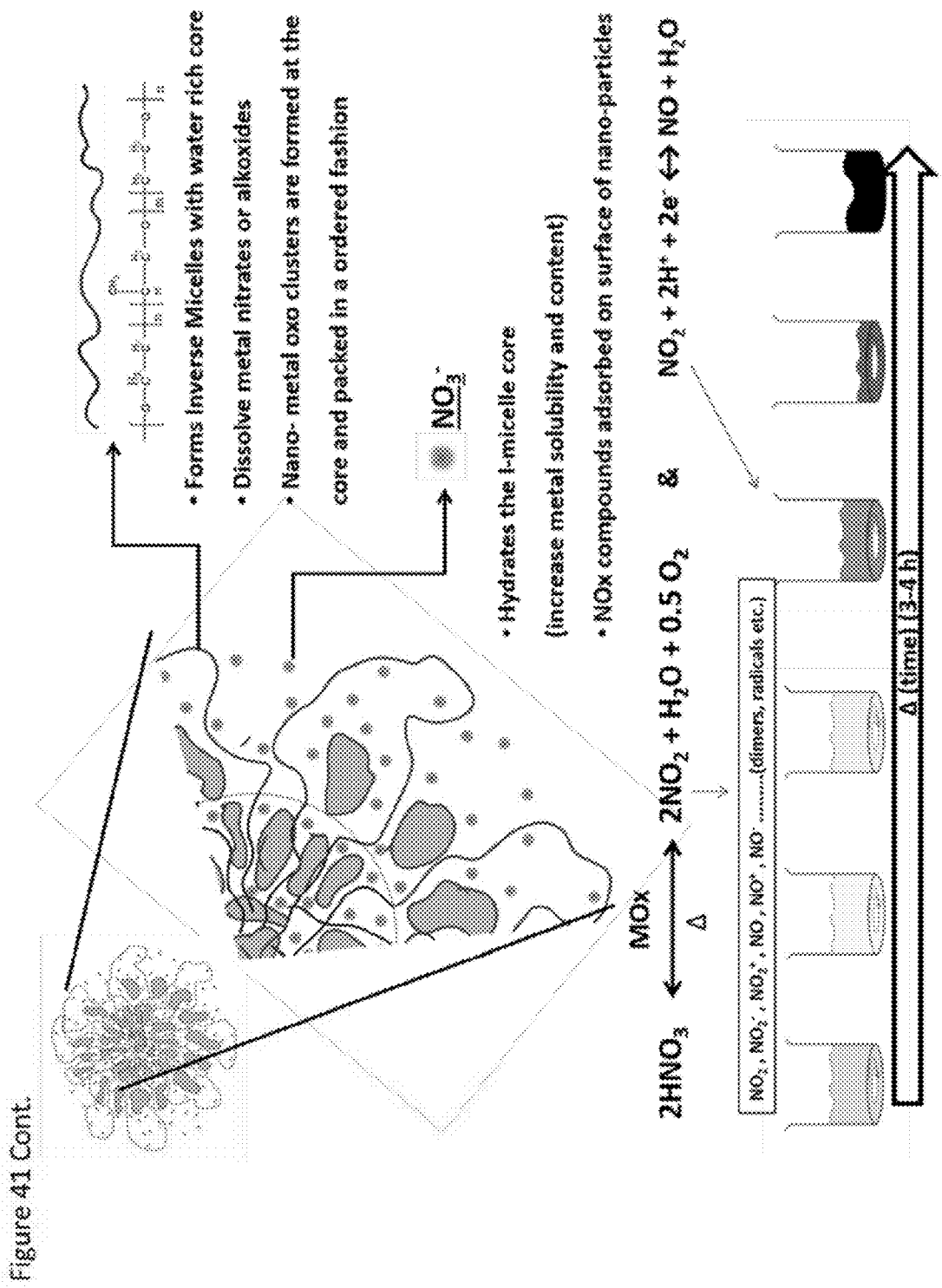
Figure 42:
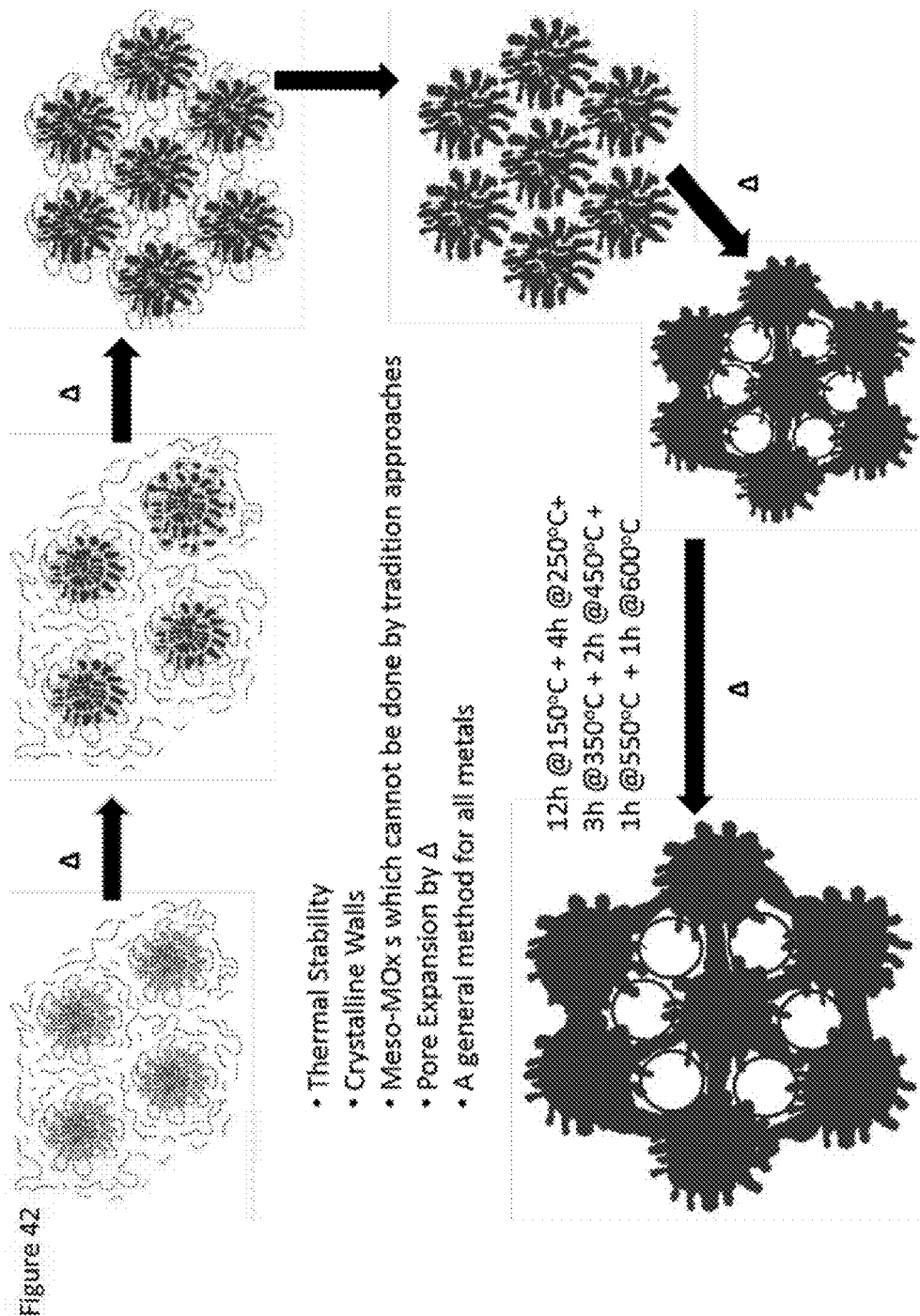
FIG. 42 depicts a proposed mechanism for the formation of highly ordered mesoporous metal oxide in accordance with this disclosure.

FIG. 41 depicts what is believed to be the mechanism for $HNO_3$ activity. FIG. 42 depicts a proposed mechanism for the formation of highly ordered mesoporous metal oxide in accordance with this disclosure.

In the process of this disclosure, the micellar solution may comprise water, and may be an aqueous solution. This may also be a solution, a dispersion or an emulsion, and may be a microemulsion. This solution may have a pH between about 0.5 and about 5, or between about 1 and about 3. The surfactant may be anionic, cationic, non-ionic, zwitterionic, or mixtures thereof. This may be a polymeric surfactant, and may be a copolymer surfactant, for example a block copolymer surfactant. The surfactant may be an alkylene oxide block copolymer surfactant, e.g. an EO/PO block copolymer surfactant. The surfactant may be miscible or immiscible with the interface modifier.

The metal precursors useful in the processes of this disclosure can be any water soluble metal salt, preferably metal salts with hydrotropic counter anions and alkoxide sources of any metal. The metal precursors also exhibit moderate alcohol solubility. The metal precursors are conventional materials known in the art and are commercially available.

One or more metal precursors are useful in the processes of this disclosure. Physicochemical properties of the mesoporous metal oxide materials of this disclosure can be controlled by the use of mixed metal oxides in the synthesis thereof. The inverted micelle controlled formation of the mesoporous metal oxide materials of this disclosure makes the tuning of physicochemical properties of the materials possible by controlling micellization and inter-micellar interaction using additives such as mixed metal oxides.

Illustrative metal precursors include, for example, metal nitrates, metal alkoxides, metal halides, metal phosphates, metal acetates, and $M_xO_y$ oxides that are capable of dissolving in $HNO_3$. More particularly, metal precursors include, for example, $M(NO_3)_x \cdot yH_2O$ (M=Mn, Fe, Co, Cu, Zn, Si), tetraethyl orthosilicate (TEOS), tetramethyl orthosilicate (TMOS), titanium butoxide, zirconium n-propoxide, zirconium butoxide, $Ce(NO_3)_3 \cdot 6H_2O$, $Gd(NO_3)_3 \cdot 6H_2O$, $Sm(NO_3)_3 \cdot 6H_2O$, and the like.

Other metal precursors useful in the process of this disclosure include, for example, metal $Cl^-$, $I^-$, $SCN^-$, $SO_4^{2-}$, $F^-$ salts, and the like. Preferably, any metal and metal oxide which $HNO_3$ can dissolve can be used. Any metal salt which does not form insoluble nitrate salts can be used.

The metal precursors useful in the process of this disclosure include precursors of transition metals, Lanthanide metals, post-transition metals, metalloids, and mixtures thereof. For example, the transition metal precursors comprise Group 3-12 transition metal precursors, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursors. In an embodiment, the transition metal precursors are selected from Group 6-12 transition metal precursors including Cr, Mo, W, Mn, Tc, Re, Fe, Ru, Os, Co, Rh, Ir, Ni, Pd, Pt, Cu, Ag, Au, Zn, Cd and Hg precursors. Preferably, the Group 6-12 transition metal precursors include Mn, Fe, Co, Ni, Cu and Zn precursors. The Lanthanide metal precursors include La, Ce, Pr, Nd, Pm, Sm, Eu, Gd, Tb, Dy, Ho, Er, Tm, Yb and Lu precursors, or any mixture thereof. The post-transition metal precursors include Al, Ga, In, Tl, Sn, Pb and Bi precursors, or any mixture thereof. The metalloid precursors include B, Si, Ge, As, Sb, Te, Po and At precursors, or any mixture thereof.

The concentration of the metal precursors used in the process of this disclosure can vary over a wide range and need only be a concentration sufficient to form the mesoporous metal oxides. The metal precursors can be present in a molar concentration ratio of from about $1 \times 10^{-2}$ M to about 10 M, preferably from about $1 \times 10^{-1}$ M to about 5 M, and more preferably from about $5 \times 10^{-1}$ M to about 1 M (based on a total volume of 10 milliliters).

The interface modifiers useful in the processes of this disclosure can be any aliphatic, alicyclic or aromatic hydrocarbons of between about 1 and about 20 carbon atoms, e.g., butanol. The interface modifiers are conventional materials known in the art and are commercially available. Any organic solvents that allow the surfactant to organize itself into inverse micelles are useful in the processes of this disclosure.

One or more interface modifiers, e.g., organic solvents, are useful in the processes of this disclosure. Physicochemical properties of the mesoporous metal oxide materials of this disclosure can be controlled by the use of mixed interface modifiers in the synthesis thereof. The inverted micelle controlled formation of the mesoporous metal oxide materials of this disclosure makes the tuning of physicochemical properties of the materials possible by controlling micellization and inter-micellar interaction using additives such as mixed interface modifiers.

Illustrative interface modifiers include, for example, aliphatic, alicyclic and aromatic hydrocarbons of between about 1 and about 20 carbon atoms, including mixtures thereof. The aliphatic hydrocarbons may be branched or straight chain. The aliphatic, alicyclic and aromatic hydrocarbons include, for example, n-butanol, pentanol, hexanol, higher carbon-containing alcohols, trimethyl benzene (TMB), acetylacetonate, lauric acid, toluene, benzene, cyclohexene, any carboxylic group containing organic molecule such as glucose, terpene, terpenoid hydrocarbons, citrus terpenes, d-limonene, and the like, and mixtures thereof. The aliphatic, alicyclic and aromatic hydrocarbons may have between 1 and 20, 1 and 18, 1 and 16, 1 and 12, 1 and 10, or 1 and 8 carbon atoms.

The role of butanol is multiple and one role is to occupy the interface, since the butanol occupation is thermodynamically favored in the hydrophobic-hydrophilic interface of Pluronic® surfactants. However, an interface modifier (or co-surfactant in this context) may not be required and can be replaced by another surfactant.

In accordance with this disclosure, the use of butanol in different solvent systems can be replaced with other smaller alcohols, water, or a hydrotropic ion. The main purpose of butanol is to increase the surfactant solubility. In the absence of butanol, Pluronic® surfactants are not fully soluble in higher order alcohols. One can avoid the use of other additives to see the solvent effect and prevent possible confusion about observed physicochemical properties which can also be affected by additives.

Using higher order alcohols than ethanol yields formation of inverse micelles for the Pluronic® type surfactants. Considering that the inverse micelle formation is essential for mesoporous metal oxide materials of this disclosure, one can use higher order alcohols or alcohol mixtures as solvents for the synthesis of the mesoporous metal oxide materials. In theory, one can choose any organic solvent or solvent mixture or modified solvents yielding Pluronic® inverse micelles to synthesize the mesoporous metal oxide materials of this disclosure.

The use of butanol as a co-surfactant helps all Pluronic® surfactants to be in uniform inverse micellar form by increasing its solubility. It is also possible to replace butanol by either charged or neutral co-surfactants in various solvent systems to increase Pluronic® surfactant solubility. Addition of more butanol to the system reverses the effect of pentanol since butanol is thermodynamically more stable in the interface. The necessity of the co-surfactant role can be satisfied by adding more butanol into the hexanol system. Butanol-hexanol mixtures can be considered as a pentanolic solution meaning that in a certain ratio mixing butanol and hexanol the solution behaves like pentanol.

In different solvents, butanol can be added to the system as a co-surfactant and hydrolysis-condensation regulator. The use of butanol is essential for Pluronic® surfactant systems in solvents or solvent mixtures, since butanol satisfies three critical roles in a given transition metal-Pluronic® surfactant system. First, butanol is an alcohol and helps controlling sol-gel chemistry of the transition metal. Secondly, butanol has a role as solvent to form an inverse micelle. The third role is being a co-surfactant in Pluronic® systems. Simply, butanol makes the micelle more thermodynamically stable which is also known as a geometric requirement. Further, the boiling point of butanol is just above the reaction temperatures. Chaotic environments created by boiling of solvents generally result in inhomogeneous condensation rates and perturbs the liquid crystal phase. Pressure-temperature relationships may be useful to eliminate boiling when using a high boiling point solvent.

One can eliminate or replace the use of butanol in the synthesis of the mesoporous metal oxide materials of this disclosure as long as the new system satisfies the following requirements: the role of butanol as a co-surfactant can be replaced with a different alcohol or smaller chain length surfactant; the role as solvent can be replaced with any organic solvent as long as a suitable alcohol is picked (for sol-gel chemistry) and reaction temperature adjusted considering the new solvent; and the use of a different surfactant which does not require co-surfactant or another co-surfactant to fulfill this requirement.

The concentration of the interface modifiers used in the process of this disclosure can vary over a wide range and need only be a concentration sufficient to form the mesoporous metal oxides. The interface modifiers can be present in a molar concentration ratio of from about 1 M to about 40 M, preferably from about 2 M to about 15 M, and more preferably from about 5 M to about 10 M (based on a total volume of 10 milliliters).

The concentration of the interface modifiers used in the process of this disclosure can vary over a wide range depending on the interface modifier type. More hydrotropic ions should be used in smaller amounts of interface modifiers and vice versa. This ratio can reach 5-50 M since the interface modifier is evaporated and its upper limit can be varied. Also, scaling up the reaction can be done by varying this ratio.

The hydrotropic ion precursors, e.g., acids, useful in the processes of this disclosure can be any hydrotropic anion beyond chloride in the Hoffmeister series, including mixtures thereof. The hydrotropic ion precursors are conventional materials known in the art and are commercially available. Suitable acids include, for example, nitric acid, hydrochloric acid, sulfuric acid, and mixtures thereof.

One or more hydrotropic ion precursors are useful in the processes of this disclosure. Physicochemical properties of the mesoporous metal oxide materials of this disclosure can be controlled by the use of mixed hydrotropic ion precursors in the synthesis thereof. The inverted micelle controlled formation of the mesoporous metal oxide materials of this disclosure makes the tuning of physicochemical properties of the materials possible by controlling micellization and inter-micellar interaction using additives such as mixed hydrotropic ion precursors.

The acid is one of the main components of the method for the synthesis of mesoporous metal oxide materials of this disclosure. The main role of the acid is to keep metals in their lowest possible oxidation state and prevent the condensation reaction until an intermediate liquid crystal phase has been achieved. Controlling the pH allows one to decide the path of condensation. The reactions conducted below the point of zero charge follow the cationic route and the pH values above this point follow the anionic route. The use of the acidic route is more pronounced then the basic route in synthesis of porous materials of transition metals by sol-gel chemistry. In principle, the synthesis of mesoporous metal oxide materials of this disclosure is possible by following the basic route if a controlled condensation reaction environment is achieved. The rate control can be achieved by temperature decrease, aging times prior to the heating step, co-solvent, and some organic and inorganic additives.

Nitrate ion is another important and essential component of the method for the synthesis of mesoporous metal oxide materials of this disclosure. Nitrate has multiple roles in the synthesis. The first role is the hydrotropic nature of this ion. Hydrotropic nitrate ions increase the surfactant solubility by hydrating the core of the inverted Pluronic® surfactant so the metal precursors use this water rich environment in the core either satisfying its water coordination or enhancing solvation of the oxo-metal clusters. The use of other metal sources with different counter anions rather than nitrate decreases the surfactant solubility and destroys the micelles. However, the use of more soluble smaller surfactants allows one to use other metal salts. The second role of nitrate is to adjust the pH of the reaction media.

In accordance with this disclosure, the right combinations of an acid source and hydrotropic ions can be chosen to mimic the same effect. In other words, the method allows the use of other acids such as HCl, $H_2SO_4$, $H_3PO_4$, $HClO_4$ or a combination and other hydrotropic anions such as $SCN^-$, $ClO_4^-$ or ion combinations. The other parameter which can also effect the possible acid and ion combinations and amounts is the surfactant type and amount. This is so since, even in same class of surfactants or surfactant combinations the critical micelle concentration (CMC) and critical micelle temperature (CMT) vary.

The effect of nitrate on control of the pH can also be mimicked by careful titration or supplying oxygen or sulfur or selenide or hydrogen sulfide or air (any gas oxidizes the metal, helping to speed up the condensation reaction) reaction media to promote the condensation reaction yielding the final mesoporous material.

Illustrative hydrotropic ion precursors include, for example, $HNO_3$, $NaNO_3$, $KNO_3$, metal halides (e.g., metal iodides), metal thiocyanides, and the like. Illustrative hydrotropic ions include, for example, $NO_3^-$, $SCN^-$, $Br^-$, $I^-$, an organic modifier such as ethylene glycol, and the like. A modifier can be used to modify the hydrotropic part such as $F^-$, 3,3',5,5'-tetramethylbenzidine (TMB), aromatic compounds, $Cl^-$, $SO_4^{2-}$, and the like.

The concentration of the hydrotropic ion precursors used in the process of this disclosure can vary over a wide range and need only be a concentration sufficient to form the mesoporous metal oxides. The hydrotropic ion precursors can be present in a molar concentration ratio of from about $1 \times 10^{-2}$ M to about 15 M, preferably from about $1 \times 10^{-1}$ M to about 10 M, and more preferably from about 1 M to about 5 M (based on a total volume of 10 milliliters).

The replacement of nitrate ions with a material that can gradually decrease the pH under process conditions may be useful in the process of this disclosure. Atmospheres of urea vapor or ammonia or other volatile bases may be useful in accomplishing the above. Hydrocyanation may be used, or HF or other acids. The concepts of the use of an acid or a base and controlling pH are embodiments of this disclosure.

The surfactants useful in the processes of this disclosure can be any anionic, cationic, non-ionic, zwitterionic surfactant, or mixtures thereof. The surfactants are conventional materials known in the art and are commercially available.

One or more surfactants, e.g., a surfactant and co-surfactant, are useful in the processes of this disclosure. Physicochemical properties of the mesoporous metal oxide materials of this disclosure can be controlled by the use of mixed surfactants in the synthesis thereof. The inverted micelle controlled formation of the mesoporous metal oxide materials of this disclosure makes the tuning of physicochemical properties of the materials possible by controlling micellization and inter-micellar interaction using additives such as mixed surfactants.

The use of a co-surfactant in the synthesis of mesoporous metal oxide materials synthesized with Pluronic® P123 surfactant:co-surfactant significantly affects the inverted micelles obtained as well as the physicochemical properties obtained for the resulting mesoporous materials. Addition of a co-surfactant which is smaller than the major surfactant Pluronic® P123 mostly affects the hydrophilic interactions inside the micelle. The increase in the hydrophilic interaction converts the spherical micelles to elongated micelles. The increase in the hydrophilic interaction in the core region is not the only contribution of the co-surfactants. The smaller co-surfactants also satisfy the geometrical requirement and also limit the interface volume by increasing the hydrophilic-hydrophobic gradient between the core and outer corona region. Limiting the interface volume and swelling the core region results in bigger and monodisperse nano-crystals which can be realized from the position and relative sharpness of the low angle diffraction patterns.

Illustrative surfactants include, for example, anionic, cationic, non-ionic, zwitterionic, or mixtures thereof. This may be a polymeric surfactant, and may be a copolymer surfactant. The copolymer surfactant may be a block copolymer, or may be a random copolymer, an alternating copolymer or some other type of copolymer. The block copolymer may be a diblock, triblock or other copolymer. The block copolymer may have between 2 and 5 blocks or more than 5 blocks. The material may have an odd or an even number of blocks, and may have 2, 3, 4 or 5 blocks. The block copolymer may have hydrophilic blocks alternating with hydrophobic blocks. The terminal blocks may be hydrophobic, or may be hydrophilic, or one may be hydrophilic and one hydrophobic. The copolymer surfactant may have 2, 3, 4, 5 or more than 5 different types of blocks (i.e. different monomers). The material may be an alkylene oxide block copolymer surfactant. The system may be an EO/PO copolymer surfactant, e.g. an EO/PO block copolymer surfactant. Suitable surfactants include Pluronic® P65 ($HO(CH_2CH_2O)_{20}(CH_2CH(CH_3)O)_{30}(CH_2CH_2O)_{20}H$) or (EO20PO30EO20), Pluronic® P85 ($HO(CH_2CH_2O)_{26}(CH_2CH(CH_3)O)_{40}(CH_2CH_2O)_{26}H$) or (EO26PO40EO26), Pluronic® 25R4 (PO19EO33PO19), Pluronic® F108 ($HO(CH_2CH_2O)_{129}(CH_2CH(CH_3)O)_{56}(CH_2CH_2O)_{129}H$) or (EO129PO56EO129), Pluronic® P123 ($HO(CH_2CH_2O)_{20}(CH_2CH(CH_3)O)_{70}(CH_2CH_2O)_{20}H$) or (EO20PO70EO20) and Pluronic® F127 ($HO(CH_2CH_2O)_{97}(CH_2CH(CH_3)O)_{69}(CH_2CH_2O)_{97}H$) or (EO97PO69EO97). The surfactant may be miscible or immiscible, or may be partially miscible, with the interface modifier.

Preferred surfactants useful in the process of this disclosure can be represented by the formula $$(HO(CH_2CH_2O)_n(CH_2CH(CH_3)O)_m(CH_2CH_2O)_nH)$$

wherein m is a value from about 10 to about 150, preferably from about 20 to about 100, and more preferably form about 20 to about 70, and n is a value from about 5 to about 150, preferably from about 10 to about 70, and more preferably form about 10 to about 30.

Other preferred surfactants useful in the process of this disclosure can be represented by the formula $$(PPO))_x(PEO)_y(PPO)_z$$

wherein PPO is polypropylene oxide, PEO is polyethylene oxide, and x, y and z are values sufficient for the surfactant to have a hydrophilic-lipophilic balance (HLB) from about 1 to about 18, preferably from about 1 to about 12, and more preferably from about 3 to about 7.

Other illustrative surfactants useful in the process of this disclosure include, for example, a Triton® surfactant, a Tween® surfactant, glucose, or an AB or BC polymer surfactant, wherein A is polyisoprene butylene, B is styrene, and C is selected from glucose, amine, carboxyl group-containing compound, and polyethylene glycol (PEG).

Still other illustrative surfactants include an ethoxylated castor oil, an ethoxylated coconut fatty acid, or an amidified, ethoxylated coconut fatty acid.

An ethoxylated castor oil can include, for example, a polyoxyethylene (20) castor oil, CAS No. 61791-12-6, PEG (polyethylene glycol)-10 castor oil, PEG-20 castor oil, PEG-3 castor oil, PEG-40 castor oil, PEG-50 castor oil, PEG-60 castor oil, POE (polyoxyethylene) (10) castor oil, POE(20) castor oil; POE (20) castor oil (ether, ester); POE(3) castor oil, POE(40) castor oil, POE(50) castor oil, POE(60) castor oil, or polyoxyethylene (20) castor oil (ether, ester).

An ethoxylated coconut fatty acid can include, for example, CAS No. 39287-84-8, CAS No. 61791-29-5, CAS No. 68921-12-0, CAS No. 8051-46-5, CAS No. 8051-92-1, ethoxylated coconut fatty acid, polyethylene glycol ester of coconut fatty acid, ethoxylated coconut oil acid, polyethylene glycol monoester of coconut oil fatty acid, ethoxylated coco fatty acid, PEG-15 cocoate, PEG-5 cocoate, PEG-8 cocoate, polyethylene glycol (15) monococoate, polyethylene glycol (5) monococoate, polyethylene glycol 400 monococoate, polyethylene glycol monococonut ester, monococonate polyethylene glycol, monococonut oil fatty acid ester of polyethylene glycol, polyoxyethylene (15) monococoate, polyoxyethylene (5) monococoate, or polyoxyethylene (8) monococoate.

An amidified, ethoxylated coconut fatty acid can include, for example, CAS No. 61791-08-0, ethoxylated reaction products of coco fatty acids with ethanolamine, PEG-11 cocamide, PEG-20 cocamide, PEG-3 cocamide, PEG-5 cocamide, PEG-6 cocamide, PEG-7 cocamide, polyethylene glycol (11) coconut amide, polyethylene glycol (3) coconut amide, polyethylene glycol (5) coconut amide, polyethylene glycol (7) coconut amide, polyethylene glycol 1000 coconut amide, polyethylene glycol 300 coconut amide, polyoxyethylene (11) coconut amide, polyoxyethylene (20) coconut amide, polyoxyethylene (3) coconut amide, polyoxyethylene (5) coconut amide, polyoxyethylene (6) coconut amide, or polyoxyethylene (7) coconut amide.

The surfactant can be, for example, one or more of Alfoterra® 123-8S, Alfoterra® 145-8S, Alfoterra® L167-7S, Ethox® HCO-5, Ethox® HCO-25, Ethox® CO-40, Ethox® ML-5, Ethal® LA-4, AG-6202, AG-6206, Ethox® CO-36, Ethox® CO-81, Ethox® CO-25, Ethox® TO-16, Ethsorbox® L-20, Ethox® MO-14, S-MAZ 80K, T-MAZ 60 K 60, Tergitol® L-64, Dowfax® 8390, Alfoterra® L167-4S, Alfoterra® L123-4S, and Alfoterra® L145-4S.

The surfactant can be, for example, one or more of castor oil, cocoa oil, cocoa butter, coconut oil, soy oil, tallow oil, cotton seed oil, a naturally occurring plant oil and a plant extract. Further, the surfactant can be, for example, one or more of an alkyl polyglucoside or an alkyl polyglucoside-based surfactant, a decyl polyglucoside or an alkyl decyl-polyglucoside-based surfactant.

Figure 47:
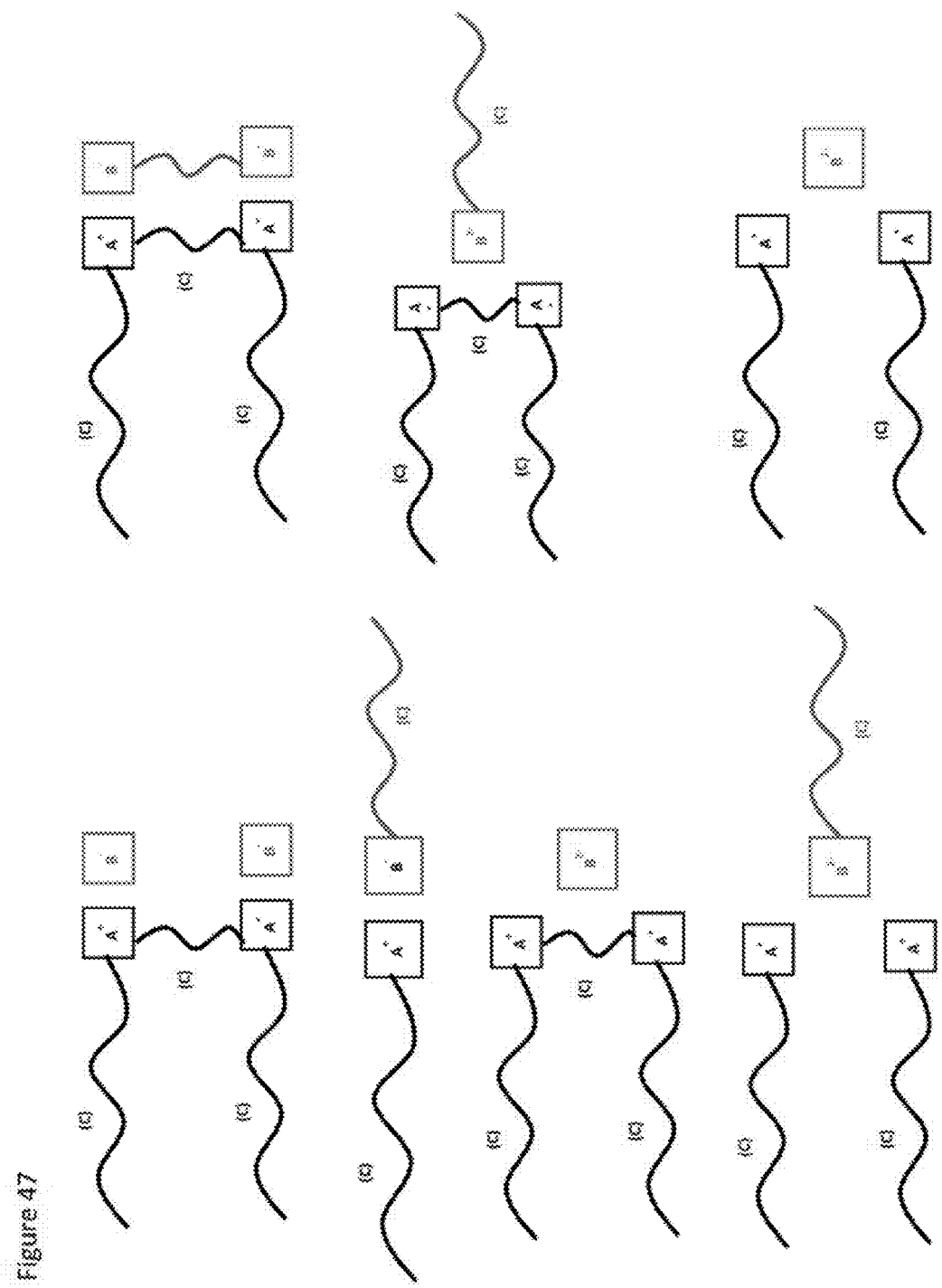
FIG. 47 shows an illustrative list of ionic surfactant types which can be used in the synthesis of mesoporous metal oxides of this disclosure, as either a co-surfactant or major surfactant.

The mesoporous metal oxides of this disclosure are unique types of materials that can be prepared by a synthesis using various surfactants and surfactant mixtures for fine tuning physicochemical properties of final mesoporous materials. FIG. 47 shows an illustrative list of ionic surfactant types which can be used in the synthesis of mesoporous metal oxides of this disclosure, as either a co-surfactant or major surfactant. However, nonionic surfactants are preferred over ionic surfactants due to their well established and wide range phase diagrams. Generally speaking, ionic surfactants do not have well defined inverse micelle phases in their phase diagrams and they generally form vesicle like structures or layered materials in hydrophobic environments. Moreover, the sizes of inverted micelles are smaller compared to the ones created by nonionic ones which can be considered as a problem for stabilizing the formed nanoparticles. Table 2 shows the list of hydrophilic head groups and hydrophobic chains. Another possible problem that might arise by the use of solely ionic surfactants is the risk of forming precipitates with metals and introducing a counter ion causing complications.

Figure 48:
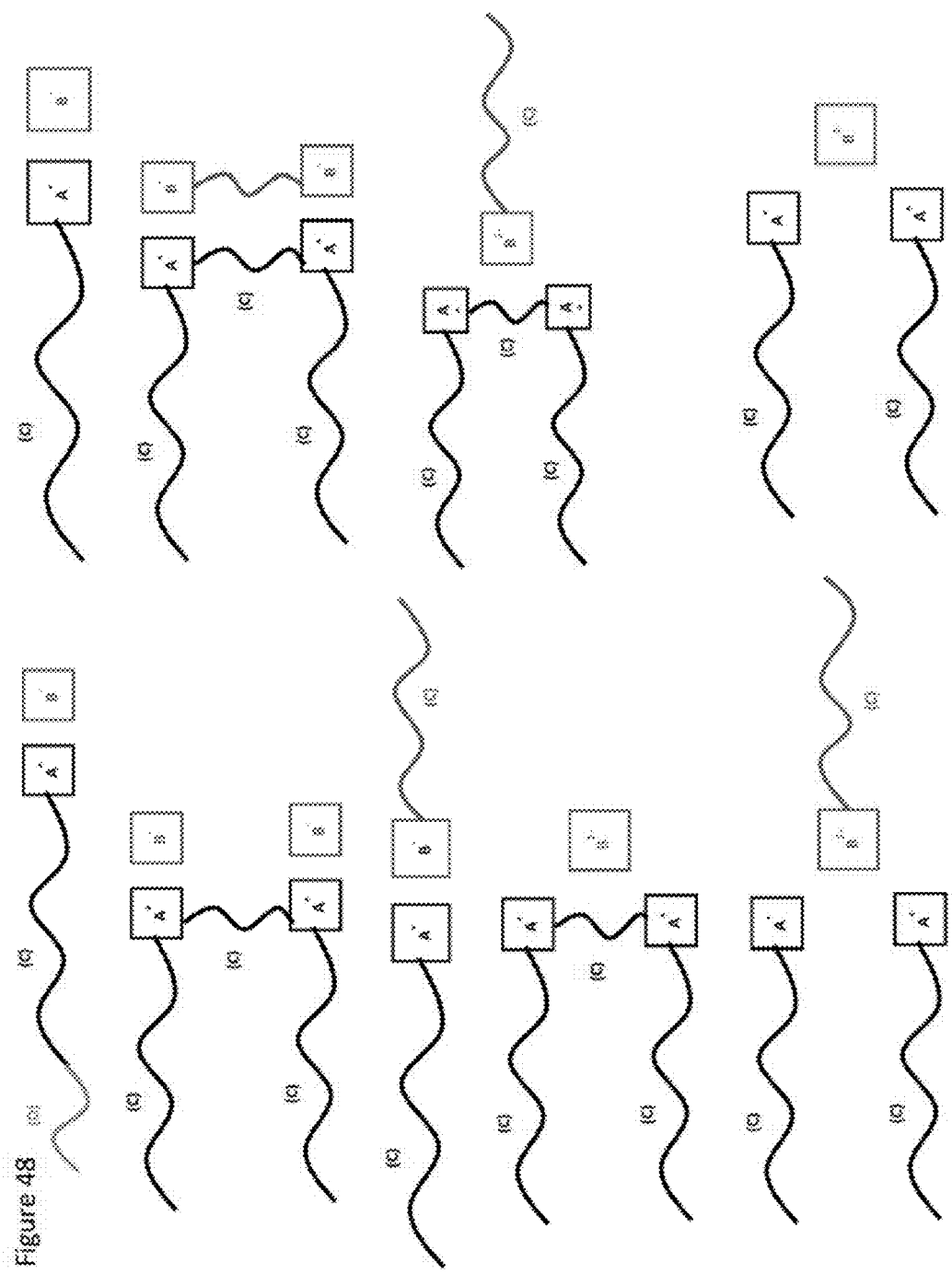
FIG. 48 shows an illustrative list of cationic surfactant types which can be used in the synthesis of mesoporous metal oxides of this disclosure, as either a co-surfactant or major surfactant.

FIG. 48 shows an illustrative list of cationic surfactant types which can be used in the synthesis of mesoporous metal oxides of this disclosure, as either a co-surfactant or major surfactant.

Figure 49:
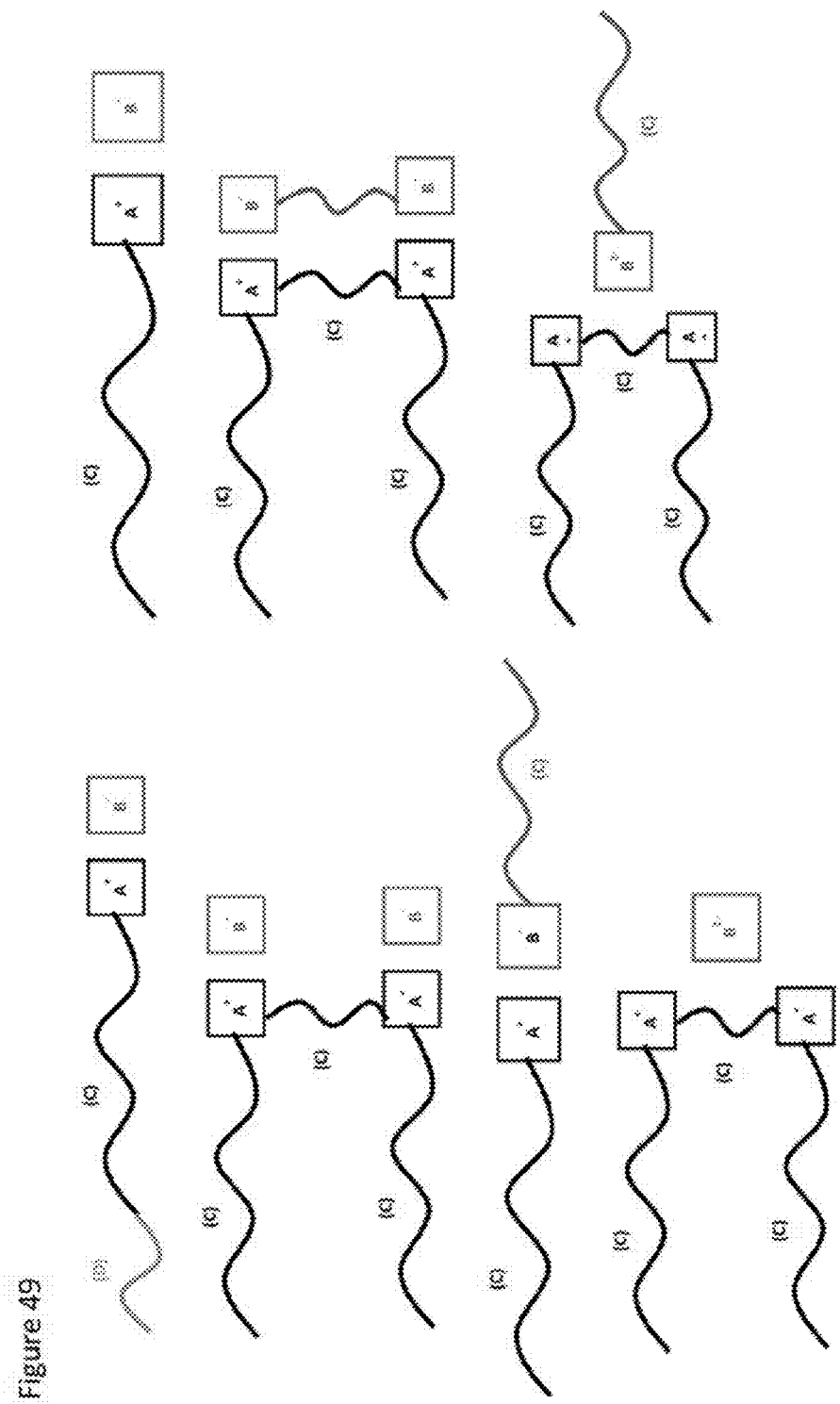
FIG. 49 shows an illustrative list of anionic surfactant types which can be used in the synthesis of mesoporous metal oxides of this disclosure, as either a co-surfactant or major surfactant. The anionic surfactant types are the same type of surfactants as in the cationic surfactants, except $A^+$ is replaced by $A^-$ and $B^-$ is replaced by B.

FIG. 49 shows an illustrative list of anionic surfactant types which can be used in the synthesis of mesoporous metal oxides of this disclosure, as either a co-surfactant or major surfactant. The anionic surfactant types are the same type of surfactants as in the cationic surfactants, except $A^+$ is replaced by $A^-$ and W is replaced by B.

Figure 50:
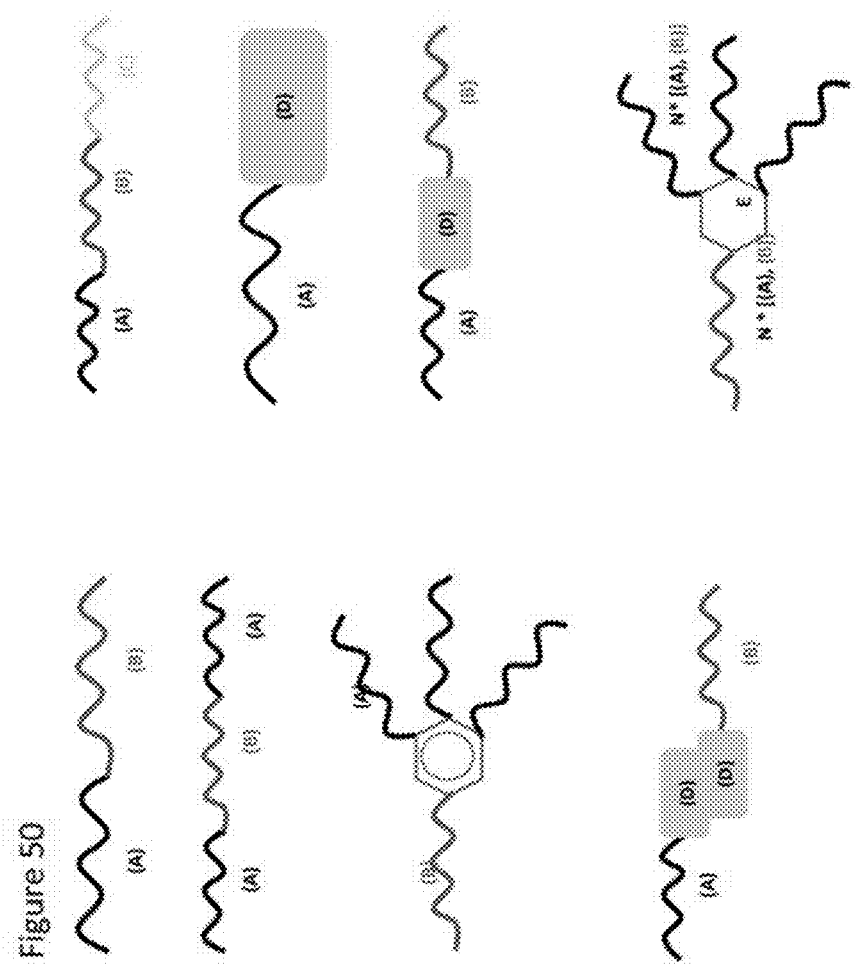
FIG. 50 shows an illustrative list of nonionic surfactant types which can be used in the synthesis of mesoporous metal oxides of this disclosure, as either a co-surfactant or major surfactant.

FIG. 50 shows an illustrative list of nonionic surfactant types which can be used in the synthesis of mesoporous metal oxides of this disclosure, as either a co-surfactant or major surfactant.

Surfactant types useful in this disclosure can synthetically be created by combination of nonionic and ionic functional groups mentioned above. A combination of ionic surfactants (anionic and cationic) can be useful in this disclosure since they may have different phase behavior. Multiple, strong hydrogen bonding interaction between two nonionic surfactants can yield a new type of nonionic surfactant having different phase behaviors than the behaviors of the individual surfactants used to form the new nonionic surfactant. A combination of ionic liquids and ionic surfactants can also yield a new type of surfactant useful in this disclosure.

Ionic surfactants have been found to be more effective for increasing the hydrophilic interaction since ionic character of the surfactants sucks more water into the core region. With the method of this disclosure, one can easily control the physicochemical parameters and the nano-crystal size and shape by using co-surfactants. Moreover, ionic surfactants also increase the obtained yield for the metal systems such as Fe, Mn, and Co.

Surfactant solubility and the metal source solubilizing potential of the surfactant are important parameters in this disclosure. Since, as long as the metal source is solubilized in the formed Pluronic® micelles a mesostructured material can be obtained. Regardless of the surfactant combination or metal mixture or solvent or acid source used, one can synthesize mesostructured materials with the method as long as a clear micellar solution is obtained before the reaction.

The concentration of the surfactant used in the process of this disclosure can vary over a wide range and need only be a concentration sufficient to form the mesoporous metal oxides. The surfactant can be present in a molar concentration ratio of from about $1\times10^{-5}$ M to about 1 M, preferably from about $1\times10^{-4}$ M to about $1\times10^{-1}$ M, and more preferably from about $1\times10^{-3}$ M to about $1\times10^{-2}$ M (based on a total volume of 10 milliliters).

The organic and inorganic additives useful in the processes of this disclosure can be any suitable organic or inorganic additives, including mixtures thereof. The organic and inorganic additives are conventional materials known in the art and are commercially available.

One or more organic and/or inorganic additives are useful in the processes of this disclosure. Physicochemical properties of the mesoporous metal oxide materials of this disclosure can be controlled by the use of mixed organic or inorganic additives in the synthesis thereof. The inverted micelle controlled formation of the mesoporous metal oxide materials of this disclosure makes the tuning of physicochemical properties of the materials possible by controlling micellization and inter-micellar interaction using additives such as mixed organic and/or inorganic additives.

Illustrative organic additives include, for example, urea, hydrocarbons (decane, octane etc.), benzene, mesitylene or trimethyl benzene (TMB), substituted benzene (tri-isopropylene, ethylbenzene, etc.), polyethylene glycol, thiourea, ethylene diamime, styrene, pyrene, naphthalene, azobenzene, aromatic dye molecules (brilliant green, methylene blue, methyl orange, perylene bisimide, congo red etc.), naphthalene, phenolic compounds, formaldehyde, PPO, PEO, sugars (D-fructose, glucose, sucrose, cellulose, starch, etc.), citric acid, phenol, aromatic alcohols (benzyl alcohol, etc.), alcohols (pentanol, hexanol, 2-propanol, etc.), carboxylic acids (heptanic acid), phosphates (trimethyl phosphate), oleyl ether, lysine, glycine, glutamic acid, tosylate, and carboxyl.

In particular, illustrative organic additives include, for example, aliphatic, alicyclic and aromatic hydrocarbons of between about 1 and about 20 carbon atoms, including mixtures thereof. The aliphatic hydrocarbons may be branched or straight chain. The aliphatic, alicyclic and aromatic hydrocarbons include, for example, n-butanol, pentanol, hexanol, higher carbon-containing alcohols, TMB, acetylacetonate, lauric acid, toluene, benzene, cyclohexene, any carboxylic group containing organic molecule such as glucose, terpene, terpenoid hydrocarbons, citrus terpenes, d-limonene, and the like, and mixtures thereof. The aliphatic, alicyclic and aromatic hydrocarbons may have between 1 and 20, 1 and 18, 1 and 16, 1 and 12, 1 and 10, or 1 and 8 carbon atoms.

Mesitylene (1,3,5-trimethylbenzene) (TMB) and other benzene organic derivatives can be used in the synthesis of mesoporous materials as pore swelling agent and increasing the meso-order of the synthesized Pluronic® surfactant based mesoporous materials. Organic additives might vary depending on the surfactant system. The key in selecting an organic additive is synergy between the additive and surfactant. Aromatic molecules are known to have a strong interaction with the relatively hydrophobic polypropylene oxide group (PPO) of the Pluronic® surfactants. TMB can be replaced with another benzene derivative or any organic molecule containing an aromatic ring including dye molecules. Another surfactant having different hydrophilic-hydrophobic groups or different types of surfactants such as star type, bis, charged surfactants can use other types of organic additives such as polyethylene glycol, and n-alcohols.

In the mesoporous metal oxide materials of this disclosure, organic additives have an effect different than regular systems. The outer swelled outer region of the inverted micelles leads them to pack in a different mesostructure. Despite the resulting materials not showing any surface area enhancement, they have significantly higher pore volume. This is because packing of inverted micelles move from random hexagonal packing to the least effective packing which is body centered cubic (bcc) packing. The micelle formation and intermicellar interaction can be controlled or modified easily by additives. The key is to choose appropriate additives for each surfactant system studied. The used organic additive for manipulation of surfactant packing and interaction is strictly surfactant dependent.

Organic additives are generally effective on non-ionic surfactants, on the other hand ionic surfactant packing or interaction control can more easily be done by inorganic additives. Inorganic additives are not only effective for controlling the ionic surfactants but also they are found to be very effective in non-ionic surfactant assembly. The effect of inorganic additives on non-ionic surfactant assembly is generally known as the Hoffmeister effect created by Hoffmeister series ions. The Hoffmeister series is a series of anions and cations which are sorted by their ability to increase surfactant solubility (hydrotropic) or decrease surfactant solubility (lyotropic).

Illustrative inorganic additives include, for example, aprotic and protic ionic liquids (ethylammonium nitrate (EAN), ethanolammonium nitrate (EOAN), diethanolammonium formate (DEOAF), laponite, $C_2H_5Si(OC_2H_5)_3$, (TESE, capping agent), $H^+$, 4R-ammonium, ammonium, $K^+$, $Na^+$, $Li^+$, $Mg^{2+}$, $Ca^{2+}$, guanidinium, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, and $ClO_4^-$.

The concentration of the organic or inorganic additives used in the process of this disclosure can vary over a wide range and need only be a concentration sufficient to form the mesoporous metal oxides. The organic or inorganic additives can be present in a molar concentration ratio of from about $1\times10^{-2}$ M to about 15 M, preferably from about $1\times10^{-1}$ M to about 10 M, and more preferably from about 1 M to about 5 M (based on a total volume of 10 milliliters).

The step of preparing the micellar solution may comprise combining the metal precursor with an interface modifier, a hydrotropic ion precursor, and a surfactant. The media may be a solution, a microemulsion, an emulsion, a dispersion or some other type of mixture. The ratio of metal precursor to surfactant may be between about 1:100 and about 1:2 on a w/w, v/v or w/v basis, and may be about 1:20. Before, during and/or after the combining, the micellar solution may be agitated, e.g. shaken, stirred, swirled, sonicated or otherwise agitated. The mixture may have a pH between about 0.5 and about 5, or between about 1 and about 3.

The metal precursor, interface modifier, hydrotropic ion precursor, and surfactant may be added to the micellar solution in any combination or at any stage during the process of preparing the micellar solution. The metal precursor, interface modifier, hydrotropic ion precursor, and surfactant may be added with or without agitation. Ti and Zr are exceptions. In these preparations, $HNO_3$ is first diluted in butanol.

The process may comprise the step of agitating the micellar solution to form a solution, a dispersion or an emulsion. The emulsion may be a microemulsion. The agitating may be vigorous, moderate or mild. This mixing may comprise shaking, stirring, sonicating, ultrasonicating, swirling or some other form of agitation. The step of reacting may comprise the step of agitating the micellar solution or the step of agitating the micellar solution may be a separate step conducted before the step of reacting.

In accordance with the process of this disclosure, the micellar solution is heated at a temperature and for a period of time sufficient to form the mesoporous metal oxide. In particular, the micellar solution is heated at a temperature and for a period of time sufficient to form a dried powder. The dried powder is first washed with an alcohol, e.g., ethanol, to remove organic components, e.g., surfactant, and then heated at a temperature and for a period of time sufficient to form the mesoporous transition metal oxide. The heating may be in air, or in some other gas, for example, oxygen, nitrogen, carbon dioxide, helium, argon or a mixture of any two or more of these.

The micellar solution is heated sequentially in the following manner. The micellar solution can be first heated at a temperature from about 75° C. to about 150° C., preferably from about 85° C. to about 140° C., and more preferably from about 90° C. to about 130° C., for a period from about 1 to about 12 hours, preferably from about 1 to about 10 hours, and more preferably from about 1 to about 8 hours. Thereafter, the micellar solution can be heated at a temperature from about 40° C. to about 80° C., preferably from about 45° C. to about 75° C., and more preferably from about 50° C. to about 70° C., for a period from about 1 to about 12 hours, preferably from about 1 to about 10 hours, and more preferably from about 1 to about 8 hours, to form the dried powder. Then the material is washed with ethanol to remove surfactant. This sequential heating is carried out in a manner sufficient to remove chemisorbed and/or physisorbed $NO_3^-$ and any left over $NO_x$. The second heating step at the lower temperature is for removing the NO species.

The dried powder is heated sequentially in the following manner Firstly, the dried powder is heated at a temperature from about 100° C. to about 200° C., preferably from about 125° C. to about 175° C., and more preferably from about 140° C. to about 160° C., for a period from about 2 to about 20 hours, preferably from about 4 to about 18 hours, and more preferably from about 6 to about 16 hours. Secondly, the dried powder is heated at a temperature from about 200° C. to about 300° C., preferably from about 225° C. to about 275° C., and more preferably from about 240° C. to about 260° C., for a period from about 1 to about 10 hours, preferably from about 2 to about 8 hours, and more preferably from about 2 to about 6 hours. Thirdly, the dried powder is heated at a temperature from about 300° C. to about 400° C., preferably from about 325° C. to about 375° C., and more preferably from about 340° C. to about 360° C., for a period from about 1 to about 8 hours, preferably from about 1 to about 7 hours, and more preferably from about 1 to about 6 hours. Fourthly, the dried powder is heated at a temperature from about 400° C. to about 500° C., preferably from about 425° C. to about 475° C., and more preferably from about 440° C. to about 460° C., for a period from about 0.5 to about 5 hours, preferably from about 1 to about 4 hours, and more preferably from about 1 to about 3 hours. Fifthly, the dried powder is heated at a temperature from about 500° C. to about 600° C., preferably from about 525° C. to about 575° C., and more preferably from about 540° C. to about 560° C., for a period from about 0.1 to about 2 hours, preferably from about 0.25 to about 2 hours, and more preferably from about 0.5 to about 2 hours.

In an embodiment, the micellar solution is heated sequentially as follows: at a temperature of about 100° C.-120° C. for a period of about 2-7 hours; and at a temperature of about 60° C. for a period of about 8-12 hours (e.g., overnight). In another embodiment, the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

The process of this disclosure can be conducted at a pressure sufficient to form the mesoporous metal oxide materials. Positive or negative pressures may be useful in the process of this disclosure. Suitable combinations of pressure, temperature and contact time may be employed in the process of this disclosure, in particular, temperature-pressure relationships that give mesoporous metal oxide materials having desired properties and/or characteristics. The pressure may range between about ambient and about 50 atmospheres, preferably between about ambient to about 40 atmospheres, and more preferably between about ambient to about 25 atmospheres. Normally the process is carried out at ambient pressure.

The process may additionally comprise washing the dried powder, e.g., nanoparticulates, for a period of time sufficient to remove organic components therefrom. The washing liquid may be water, or an aqueous liquid, or with a non-aqueous liquid, or an organic liquid (e.g., ethanol), or some combination of these. The particles may be washed once or more than once, and may be washed between 1 and about 10 times or more. Each wash may be with the same washing liquid as any other wash, or may be with a different washing liquid. The washing may comprise exposing the nanoparticulates to the washing liquid, e.g. suspending the nanoparticulates in the washing liquid, and then separating the nanoparticulates from the washing liquid, using any of the separating processes described herein. In particular, the dried powder is washed with ethanol for a period of time sufficient to remove surfactant therefrom.

The process may additionally comprise at least partially separating the nanoparticulates from a fluid (e.g., washing fluid) in which they are located (optionally suspended or dispersed). This may comprise filtering, settling, decanting, centrifuging, vacuum filtering, dialysis, membrane filtering, magnetic separation, or some other suitable process, and may comprise more than one of these.

In an embodiment, the mesoporous metal oxides can be nanoparticulates having a particle size between about 1 and about 500 nm, or between about 50 and about 300 nm, and a mean pore size between about 1 and about 50 nm, or between about 1 and about 30 nm or greater than 2 nm, or between about 2 and 13 nm. The nanoparticulates may have a 3-D cubic or 3-D foam-like mesostructure, or may have a 2-D hexagonal or wormlike mesostructure. The mesoporous nanoparticulates may comprise mesoporous transition metal oxides, Lanthanide metal oxides, post-transition metal oxides and metalloid oxides. The mesoporous metal oxides may be doped with other elements, for example titanium, aluminum or zirconium. The mesoporous nanoparticulates may be spherical or some other regular shape. There is also provided a plurality of mesoporous nanoparticulates. The mean particle size of the nanoparticulates may be between about 1 and about 500 nm. The particle size distribution may be broad or narrow. There may be less than about 50% of nanoparticulates having a particle size more than 10% different from (greater than or less than) the mean particle size.

The mesoporous metal oxides prepared by the process of this disclosure include oxides of transition metals, Lanthanide metals, post-transition metals, metalloids, and mixtures thereof. For example, the transition metal oxides comprise Group 3-12 transition metal oxides, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxides. In an embodiment, the transition metal oxides are selected from Group 6-12 transition metal oxides including Cr, Mo, W, Mn, Tc, Re, Fe, Ru, Os, Co, Rh, Ir, Ni, Pd, Pt, Cu, Ag, Au, Zn, Cd and Hg oxides. Preferably, the Group 6-12 transition metal oxides include Mn, Fe, Co, Ni, Cu and Zn oxides. The Lanthanide metal oxides include La, Ce, Pr, Nd, Pm, Sm, Eu, Gd, Tb, Dy, Ho, Er, Tm, Yb and Lu oxides, or any mixture thereof. The post-transition metal oxides include Al, Ga, In, Tl, Sn, Pb and Bi oxides, or any mixture thereof. The metalloid oxides include B, Si, Ge, As, Sb, Te, Po and At oxides, or any mixture thereof.

The surface area of the mesoporous metal oxide particulates, e.g. BET surface area, maybe between about 50 and about 1000 $m^2/g$, and may be between about 60 and 500, 70 and 200 and 80 and 190, $m^2/g$, and may be about 50, 75, 100, 125, 150, 175 or 200 $m^2/g$.

The pore volume (BJH) may be between about 0.05 and about 2 $cm^3/g$, or between about 0.075 and 2, and 0.1 and 2 $cm^3/g$, and may be about 0.05, 0.1, 0.15, 0.2 or 0.25 $cm^3/g$.

The pore size (diameter), e.g., BJH desorption, may be between about 1 and 50 nm, or between about 1.5 and 50 nm, 1.5 and 20 nm, 2 and 15 nm, and 2 and 13 nm, and may be about 2.0, 2.5, 3.0, 3.5, 4.0, 4.5, 0.5.0, 5.5 and 6 nm The wall thickness ($2d/\sqrt{3}-PD$, where d is the d-spacing and PD is the pore diameter) may be between about 2 and about 20 nm, or between about 3 and about 16 nm, 4 and 14 nm, or 5 and 12 nm, and may be about 5.0 5.5, 6.0, 6.5, 7.0, 7.5, 8.0, 8.5, 9.0, 9.5 and 10.0 nm. The formula applies to 2-dimensional hexagonal materials.

The crystal structures of the nano-sized metal oxide walls include, for example, $CeO_2$, $Mn_2O_3$, $Mn_3O_4$, $Fe_2O_3$, $Co_3O_4$, ZnO, CuO, $TiO_2$ (Anatase), $ZrO_2$, NiOOH, and the like.

The mesoporous particulates may be round or spherical, or may be oblate spherical, rod-like, aggregated, ellipsoid, ovoid, a modified oval shape, dome shaped, hemispherical; a round ended cylinder, capsule shaped, discoid, prismatic, acicular or polyhedral (either regular or irregular) such as a cube, a rectangular prism, a rectangular parallelepiped, a triangular prism, a hexagonal prism, rhomboid or a polyhedron with between 4 and 60 or more faces, or may be some other shape, for example an irregular shape.

The mesoporous metal oxides of this disclosure exhibit properties that are advantageous for specific applications. For example, the mesoporous metal oxides can exhibit thermal stability up to a temperature of about 350° C., preferably up to a temperature of about 450° C., and more preferably up to a temperature of about 550° C. or greater (e.g., 800° C.). Also, the mesoporous metal oxides can exhibit high pore volume after heat treatment cycles. For example, the unit cell expansion and pore-size increase do not cause a significant change at pore volume. In other words, ideally for a given material, one can change the pore size from super micropore region (about 2 nm) to mid mesopore region (about 20 nm) by preserving pore volume. Further, the mesoporous metal oxides can exhibit physicochemical properties after catalytic reactions under high pressure and temperature. For example, catalytic tests done on meso $ZrO_2$ and $CeO_2$ under 20 bar pressure of $N_2$ or $H_2$ at 150° C. did not cause any change at physicochemical properties of the materials.

The mesoporous metal oxide nanoparticulates, or a plurality thereof, can be useful for a variety of applications including, for example, catalysis, gas adsorption, synthesis of quantum dots and magnetic nanoparticles in functional materials and bioimaging applications, and as carriers for drugs, genes and proteins for biomedical applications. In particular, the mesoporous metal oxides are useful as catalysts, sensors, batteries and energy production, optical displays, environmental and sorbent applications.

There are several advantages afforded by the method of this disclosure including, for example, control of the crystal structure of the wall during heating, the possibility of synthesis without surfactant, precise control of pore size, and the method can be extended to a variety of transition metal oxides, Lanthanide oxides, post-transition metal oxides and metalloid oxides. The Pluronic® P123 surfactant is non-ionic and low foaming. Other advantages of the process of this disclosure for the synthesis of mesoporous metal oxides are that $H^+$ is not a concern, in principle the process is applicable to all transition metals, Lanthanide metals, port-transition metals and metalloids, different types of surfactants can be used, gelation is not required, the crystal structure (i.e., for manganese oxides, Hausmannite, Pyrolusite, Bixbyite) can all be formed, thickness of walls can be controlled, fine tuning of magnetic and optical properties is possible, and pore expansion on heat treatment of the mesoporous materials occurs. Highly optically pure glass materials, light sensitive lenses and ultra violet absorbing lenses for plastic or glass materials may be made in accordance with the process of this disclosure.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All reactions in the following examples were performed using as-received starting materials without any purification.

Example 1

Synthesis of Mesoporous Transition Metal Oxides

Various transition metal oxides were synthesized by the following procedure. 0.01 mol $M(NO_3)_x.yH_2O$ (M=Mn, Fe, Co, Cu, Zn), 0.09-0.18 mol n-butanol (7-14 grams), 0.016-0.032 mol $HNO_3$ (1-2 grams) and 1 gram of surfactant (Pluronic® P123 surfactant or Pluronic® F127 surfactant) were mixed in a 50 milliliter beaker and homogenized by stirring at room temperature. The resulting clear solution was directly put in an oven running at 100° C.-120° C. (depending on the particular metal system) and kept at that temperature for 2-7 hours (variations of concentrations, temperature and duration of experiment depend on the particular metal system). Synthesized materials were washed with ethanol several times to remove organic components and dried in an oven running at 60° C. overnight.

Dry powders were heated in an oven at the following temperatures and time intervals; 150° C. (12 hours), 250° C. (4 hours), 350° C. (3 hours), 450° C. (2 hours) and finally at 550° C. (1 hour) (all heating steps applied in this order).

Example 2

Characterization of Nanocomposite Materials

The mesostructure of synthesized and heat treated materials was determined by low angle powder X-ray diffraction (PXRD). The crystal structure of materials was characterized by PXRD techniques. Pore structural properties were determined by nitrogen sorption. Surface areas were determined by BET (Brunauer-Emmett-Teller) methods and pore sizes are determined from the desorption branch of the corresponding isotherm by the BJH (Barret-Joyner-Halenda) method. SEM (scanning electron microscopy) and TEM (transmission electron microscopy) were collected in order to determine particle size, surface morphologies and mesopores respectively.

Figure 2:
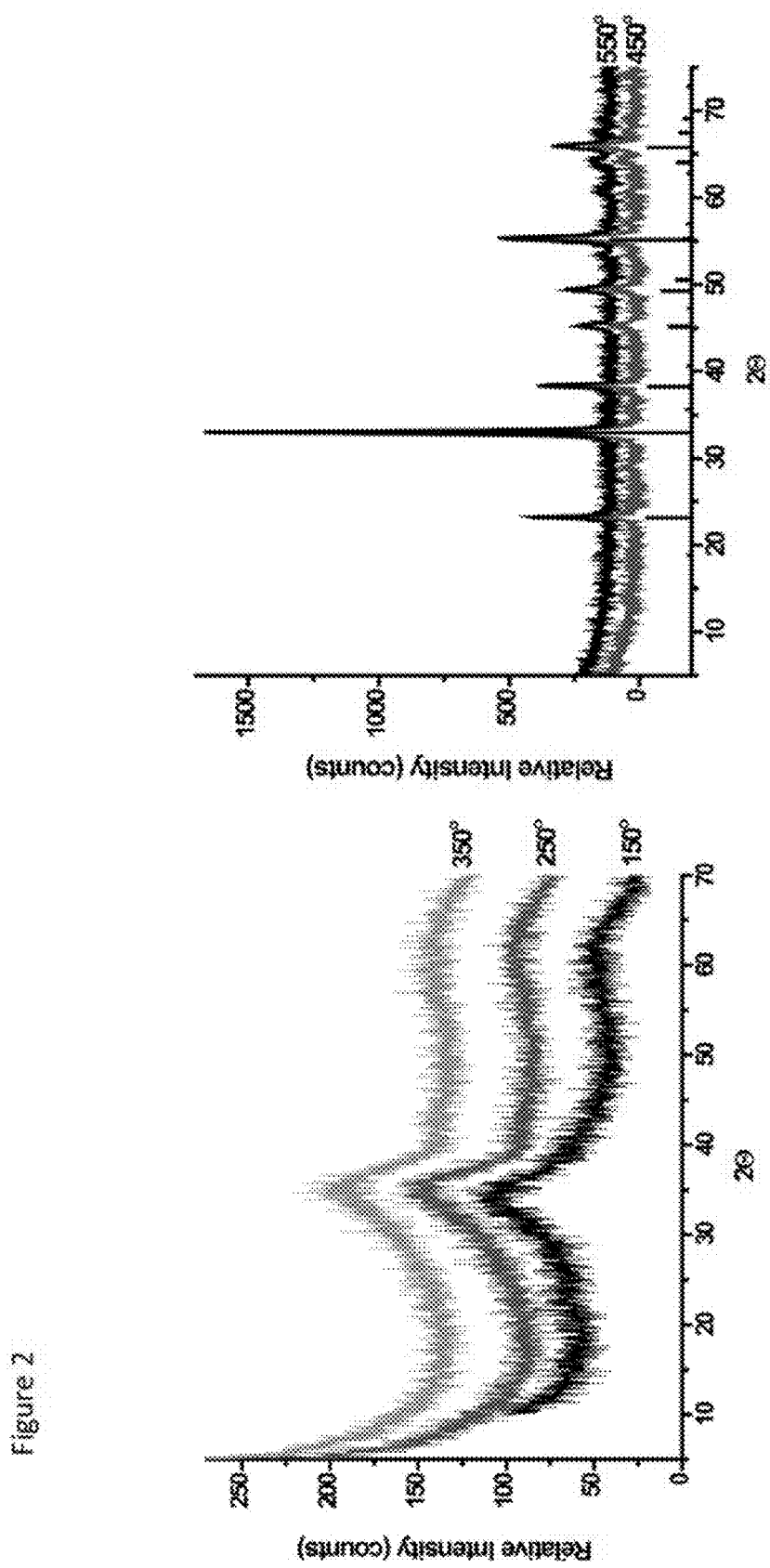
FIG. 2 depicts wide angle PXRD of mesoporous $Mn_2O_3$ samples recorded for powders at different final heat treatment temperatures, as prepared in Examples 1 and 2.
Figure 4:
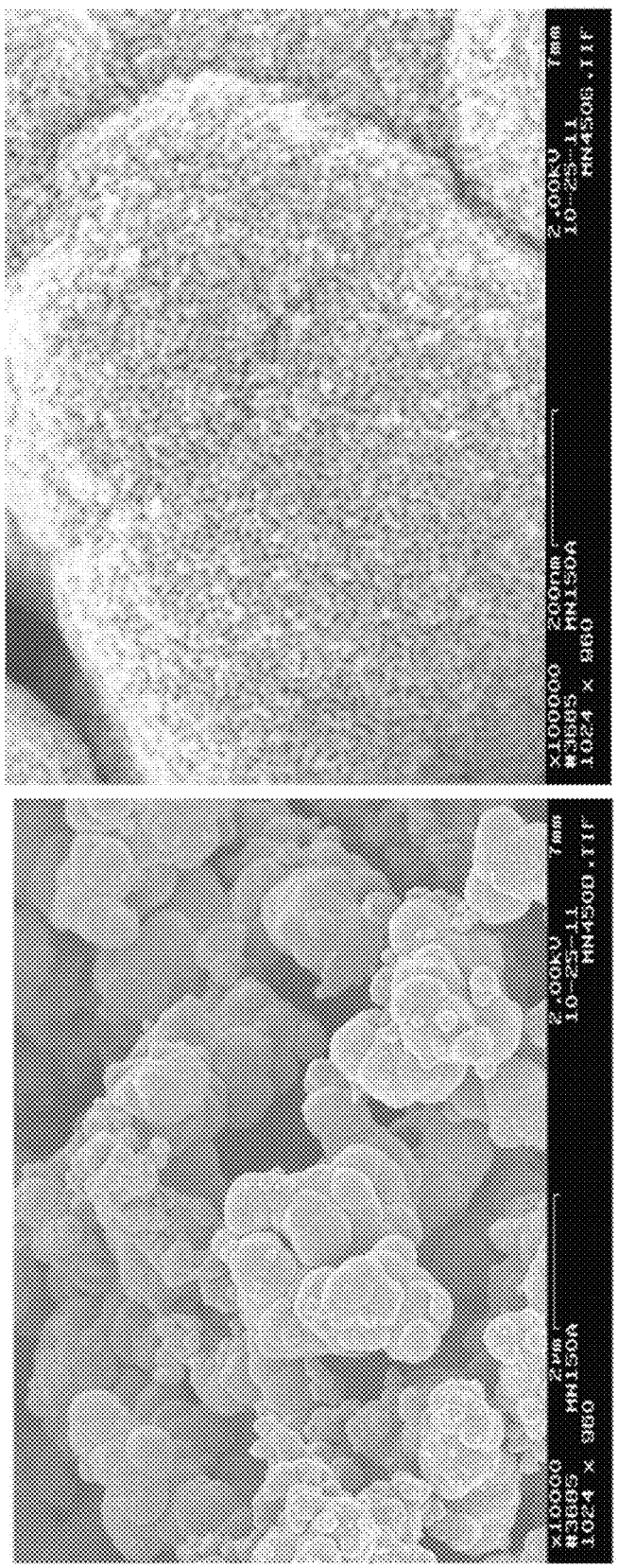
FIG. 4 depicts scanning electron microscope (SEM) images of mesoporous $Mn_2O_3$ samples with final heat treatment temperature of 450° C., as prepared in Examples 1 and 2.

FIG. 1 shows the low angle PXRD data of Mesoporous Manganese Oxide (MMO) and unit cell expansion by heat treatment. As seen from the data, diffraction lines gets sharper and shift to lower angle throughout heat treatment indicating an increase in order of mesoporous material and expansion in unit cell dimensions. FIG. 2 shows the wide angle PXRD patterns of MMO materials treated at different final temperatures. Up to 450° C. diffraction patterns show broad diffraction lines indicating that materials are not well ordered (or amorphous) or consist of nano-sized crystalline domains. However, MMO materials have a well defined crystal structure above this temperature. Diffraction lines for these materials can be indexed to the $Mn_2O_3$ (Bixbyite) crystal structure. FIG. 3 shows nitrogen sorption isotherm of MMO samples with different final heat treatment temperatures and corresponding BJH desorption pore size distributions. All MMO materials have type IV isotherms regardless of the final heat treatment temperature applied. As seen from the pore size distributions, pore size expands constantly with increased temperature. As stated before pore size expansion has not been observed for either heat treated or calcined samples. FIG. 4 shows scanning electron microscope (SEM) images of MMO samples with final heat treatment temperature of 450° C.

The structural parameters of the MMO samples obtained by combining the PXRD and nitrogen sorption data are given in Table 1 below.

TABLE 1

| Δ (max) | SA (BET) | Pore Volume (BJH) | Pore Diameter (BJH des) | Wall thickness* |
|---|---|---|---|---|
| 250 C. ° | 200 m²\g | 0.153 cc\g | 2.8 nm | 4.7 nm |
| 350 C. ° | 191 m²\g | 0.224 cc\g | 3.7 nm | 5.2 nm |
| 450 C. ° | 100 m²\g | 0.200 cc\g | 5.3 nm | 8.0 nm |
| 550 C. ° | 35 m²\g | 0.125 cc\g | 12.3 nm | 7.9 nm |

Wall Thickness = $(2d/\sqrt{3} - PD$, where d is the d-spacing and PD is the pore diameter)

Example 3

Other mesoporous transition metal oxides were prepared in a manner similar to MMO in Example 1. The conditions for the preparation of these mesoporous transition metal oxides are set forth in Table 2 below. As used in Table 2, TEOS is tetraethyl orthosilicate $Si(OC_2H_5)_4$ and $Ti(OCH(CH_3)_2)_4$ is tetra-isopropoxide titanium or titanium isopropoxide.

TABLE 2

| Metal | Metal Amount (mol) | Butanol (g-mol) | $HNO_3$ (g-mol) | P123 (g-mol) | Reaction Temperature T ° C. | Traction time t (h) |
|---|---|---|---|---|---|---|
| Manganese $Mn(NO_3)_2 \cdot 4H_2O$ | 0.01 mol | 7 g-0.094 mol | 1 g-0.016 mol | 1 g-1.7*10⁻⁴ mol | 120° | 4 h |
| Iron $Fe(NO_3)_3 \cdot 6H_2O$ | 0.01 mol | 8.5 g-0.115 mol | 1.2 g-0.019 mol | 1.2 g-2.04*10⁻⁴ mol | 100° | 2-3 h |
| Cobalt $Co(NO_3)_2 \cdot 6H_2O$ | 0.01 mol | 8.5 g-0.115 mol | 1.2 g-0.019 mol | 1.2 g-2.04*10⁻⁴ mol | 120° | 4-6 h |
| Nickel $Ni(NO_2)_3 \cdot 6H_2O$ | 0.01 mol | 10 g-0.135 mol | 1.2 g-0.019 mol | 1.2 g-2.04*10⁻⁴ mol | 120° | 4 h |
| Copper $Cu(NO_3)_2 \cdot XH_2O$ | 2 g-0.01 mol | 7 g-0.094 mol | 1 g-0.016 mol | 1.5 g-2.6*10⁻⁴ mol | 120° | 2-3 h |
| Zinc $Zn(NO_3)_2 \cdot 6H_2O$ | 0.01 mol | 7 g-0.094 mol | 1 g-0.016 mol | 1.5 g-2.6*10⁻⁴ mol | 120° | 5-6 h |
| Ceria $Ce(NO_3)_2 \cdot 6H_2O$ | 0.01 mol | 7 g-0.094 mol | 1 g-0.016 mol | 1.5 g-2.6*10⁻⁴ mol | 120° | 6 h |
| Silica TEOS | 0.0099 mol | 7 g-0.094 mol | 7 g (Butanol)1 + 1 g-0.016 mol ($HNO_3$) | 1 g-1.7*10⁻⁴ mol | 120° | 4-6 h |
| Titanium $Ti(OCH(CH_3)_2)_4$ | 0.0094 mol | 7 g-0.094 mol | 7 g (Butanol)1 + 1 g-0.016 mol ($HNO_3$) | 1 g-1.7*10⁻⁴ mol | 120° | 3-5 h |
| Aluminum Silicate | 0.0099 mol (TEOS) | 7 g-0.094 mol | 7 g (Butanol)1 + 1 g-0.016 mol | 1 g-1.7*10⁻⁴ mol | 120° | 4-6 h |

TABLE 2-continued

| Al:Si = 1:5 TEOS and Al(NO$_3$)$_2$•9H$_2$O | 0.0018 mol (Aluminum nitrate) | (HNO$_3$) | |
|---|---|---|---|
| Metal | Heating Cycles | | Observations |
| Manganese Mn(NO$_3$)$_2$•4H$_2$O | 150° C. (12 h)-250° C. (4 h)-350° C. (3 h)-450° C. (2 h)-550° C. (1 h) | | Yellow gel after 1 h. Exactly 4 h reaction |
| Iron Fe(NO$_3$)$_3$•6H$_2$O | 150° C. (12 h)-250° C. (4 h)-350° C. (3 h)-450° C. (2 h)-550° C. (1 h) | | Red gel after mixing. Dark red gel after 1 h. No longer than 3 h (after nonporous Iron Oxide) |
| Cobalt Co(NO$_3$)$_2$•6H$_2$O | 150° C. (12 h)-250° C. (4 h)-350° C. (3 h)-450° C. (2 h)-550° C. (1 h) | | Low yield, 150° C. yields magnetic Cobalt Oxide (mesostructured) |
| Nickel Ni(NO$_2$)$_3$•6H$_2$O | 150° C. (12 h)-250° C. (4 h)-350° C. (3 h)-450° C. (2 h)-550° C. (1 h) | | Low yield |
| Copper Cu(NO$_3$)$_2$•XH$_2$O | 150° C. (12 h) | | Not Thermally Stable-mesostructured but not porous |
| Zinc Zn(NO$_3$)$_2$•6H$_2$O | 150° C. (12 h) | | Not Thermally Stable-mesostructured but not porous |
| Ceria Ce(NO$_3$)$_2$•6H$_2$O | 150° C. (12 h)-250° C. (4 h)-350° C. (3 h)-450° C. (2 h)-550° C. (1 h) | | Yield depends on the amount of surfactant used. Crystalline solid and particle size is consistent with the crystal size. |
| Silica TEOS | 450° C. (4 h) (1° C./min heating rate) | | Yellow transparent film. Directly calcined @ 450° C. for 4 h (microporous) |
| Titanium Ti(OCH(CH$_3$)$_2$)$_4$ | 400° C., 450° C. or 500° C. (4 h) (1° C./min heating rate) | | Orange transparent film. Directly calcined @450° C. for 4 h |
| Aluminum Silicate Al:Si = 1:5 TEOS and Al(NO$_3$)$_2$•9H$_2$O | 450° C. (4 h) (1° C./min heating rate) | | Microporous, slightly brownish powder |

Mesoporous transition metal oxides were prepared in accordance with the conditions set forth in Table 2. A listing of the prepared mesoporous transition metal oxides is set forth in Table 3 below including properties exhibited by these mesoporous transition metal oxides. FIGS. 5-35 depict properties exhibited by these mesoporous transition metal oxides.

TABLE 3

| Metal | Nomenclature | Max Heat Treatment T (° C.) | Surface Area (m$^2$/g) | BJH Des. Pore Diameter (nm) | Low-Angle XRD peak position (nm) | Crystal Structure |
|---|---|---|---|---|---|---|
| Manganese | UCT-1 | 150 | 255 | 2.0* | 3.1 | Amorphous |
| | | 250 | 200 | 2.8 | 6.7 | Amorphous |
| | | 350 | 191 | 3.7 | 7.7 | Amorphous |
| | UCT-2 | 450 | 100 | 5.3 | 11.5 | Mn$_2$O$_3$ |
| | | 550 | 35 | 12.3 | 17.5 | Mn$_2$O$_3$ |
| Iron | UCT-5 | 150 | 124 | 1.54* | 4.2 | Amorphous |
| | | 250 | 225 | 2.2 | 5.0 | Amorphous |
| | UCT-6 | 350 | 167 | 3.4 | 7.9 | Fe$_2$O$_3$ |
| | | 450 | 46 | 9.6 | 24.5 | Fe$_2$O$_3$ |
| Cobalt | UCT-7 | 150 | 9 | Non-porous | 9.3 | Co$_3$O$_4$ & C$_4$H$_8$Co$_3$O$_4$•4H$_2$O |
| | UCT-8 | 250 | 129 | 5.7 | 12.2 | Co$_3$O$_4$ |
| | | 350 | 110 | 7.8 | 14.5 | Co$_3$O$_4$ |
| Nickel | UCT-9 | 150 | 20 | Non-porous | 6.6 | (H$_3$O)2NiO$_2$ & NiOOH & Ni(OH)$_2$•0.75H$_2$O |
| | UCT-10 | 250 | 195 | 5.5 | 7.4 | Ni$_{15}$O$_{16}$ |
| | | 350 | 81 | 9.7 | 9.6 | Ni$_{15}$O$_{16}$ |
| | | 450 | 60 | 9.7 | 9.8 | Ni$_{15}$O$_{16}$ |
| Copper | UCT-11 | 150 | 48 | Non-porous | 5.4 | Cu$_2$(NO$_3$)(OH)$_3$ |
| | | 250 | 22 | Non-porous | 12.1 | CuO |
| | | 350 | 11 | Non-porous | 6.1 | CuO |
| Zinc | UCT-12 | 150 | 70 | Non-porous | 6.6 | ZnC$_2$O$_4$ |
| Titanium | UCT-13 | 450 | 103 | 3.5 | 8.8 | TiO$_2$ (Anatase) |
| Silica | UCT-14 | 450 | 435 | 1.4* | 4.6 | Amorphous |
| Aluminum silicate (Al:Si = 1:5, 10, 20, 50) | UCT-15 | 450 | 385 (1:5) | 1.2* | 6.5 | Amorphous |
| | | 450 | 326 (1:10) | 1.2* | — | Amorphous |
| | | 450 | 308 (1:20) | 1.2* | — | Amorphous |
| | | 450 | 397 (1:50) | 1.2* | — | Amorphous |
| | | 550 | 325 (1:20) | 1.2* | — | Amorphous |
| | | 550 | 401 (1:50) | 1.2* | — | Amorphous |

TABLE 3-continued

| Metal | Nomenclature | Max Heat Treatment T (° C.) | Surface Area (m²/g) | BJH Des. Pore Diameter (nm) | Low-Angle XRD peak position (nm) | Crystal Structure |
|---|---|---|---|---|---|---|
| Ceria | UCT-16 | 150 | 98 | Non-porous | 2.9 | $CeO_2$ |
| | | 250 | 152 | 1.1* | 3.2 | $CeO_2$ |
| | | 350 | 173 | 1.1* | 3.4 | $CeO_2$ |
| | | 450 | 150 | 1.3* | 3.7 | $CeO_2$ |
| | | 550 | 127 | 1.6 | 5.1 | $CeO_2$ |
| | | 600 | 72 | 1.9 | 7.1 | $CeO_2$ |
| Manganese (F127) | UCT-3 | 350 | 160 | 3.5 | 9.3 | $Mn_2O_3$ |
| | | 450 | 68 | 4.5 | 11.3 | $Mn_2O_3$ |
| Manganese (long reaction time) | UCT-4 | 150 (24 h) | — | — | 7.7 | $Mn_3O_4$ |

*DFT pore size distribution. Cylindrical pore model nitrogen on carbon.
≠Direct calcination to final temperature with 1° C./min heating rate.

Table 3 above describes 16 new families of materials identified with acronyms UCT-#. For example, UCT-1 represents amorphous manganese oxide materials that have controllable pore sizes. One can further delineate these materials from Table 3 as UCT-1-150, UCT-1-250, and UCT-350 representing materials with the same basic amorphous structure but with different pore sizes. UCT-2 represents mesoporous crystalline $Mn_2O_3$ materials. Table 3 shows that UCT-2-450 heated to 450° C. has the $Mn_2O_3$ structure with specific pore diameter of 5.3 nm and surface area of 100 m²/g. UCT-2-550 has the same $Mn_2O_3$ structure but different surface properties. The other materials from UCT-3 through UCT-16 are summarized accordingly in Table 3.

Figure 5:
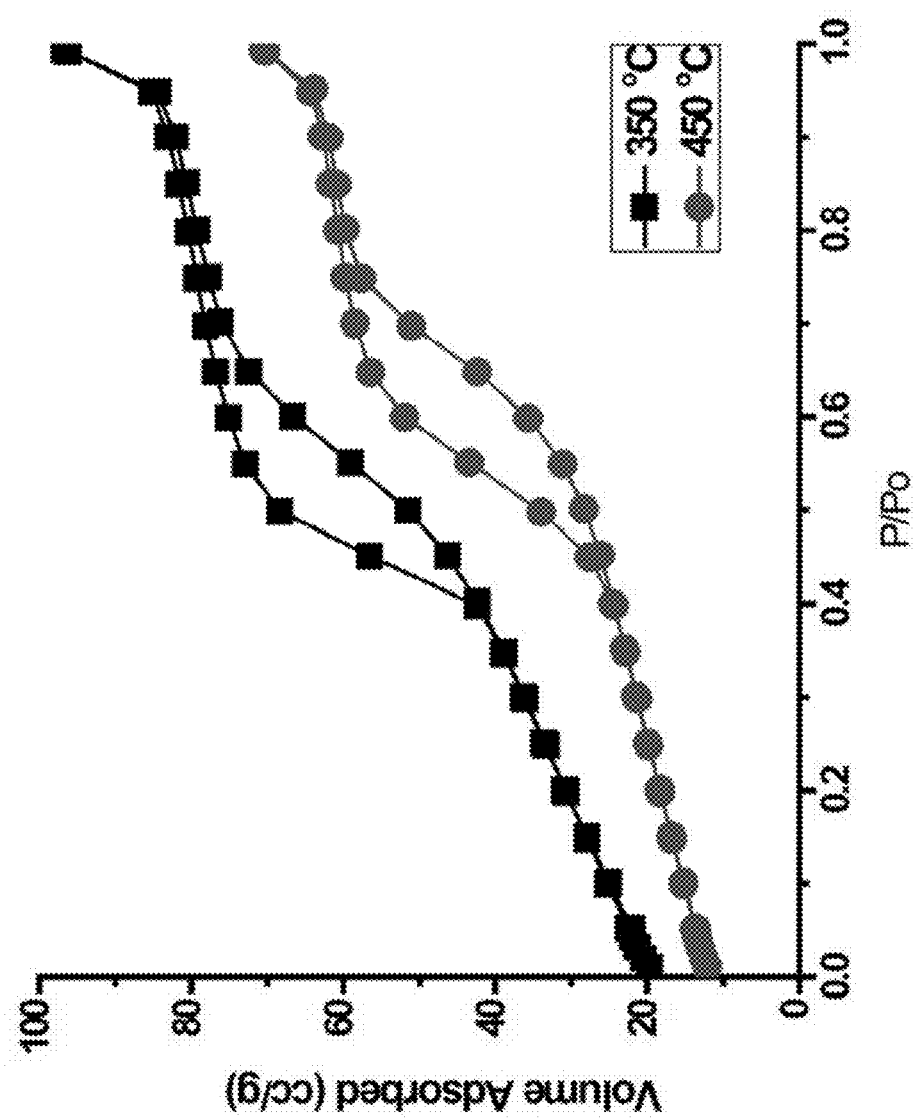
FIG. 5 depicts the nitrogen sorption isotherm of mesoporous $Mn_2O_3$ synthesized with Pluronic® F127 surfactant prepared in Example 3.
Figure 6:
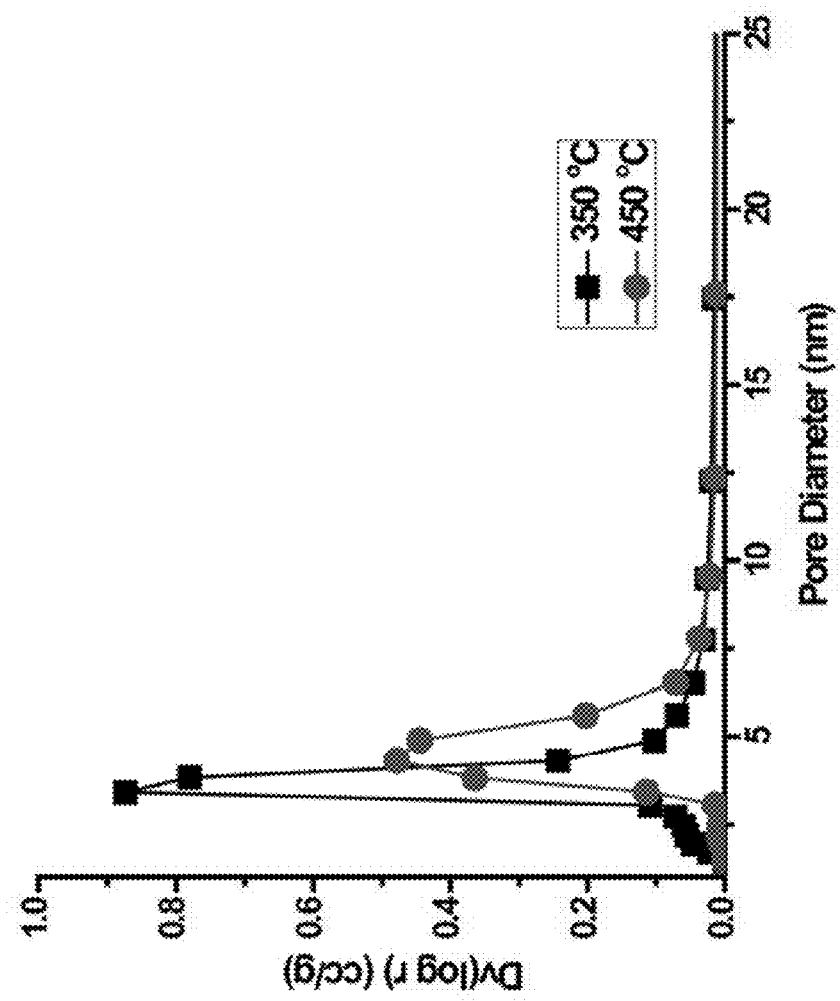
FIG. 6 depicts the Barret-Joyner-Halenda (BJH) desorption pore size distribution of mesoporous $Mn_2O_3$ synthesized with Pluronic® F127 surfactant prepared in Example 3.
Figure 7:
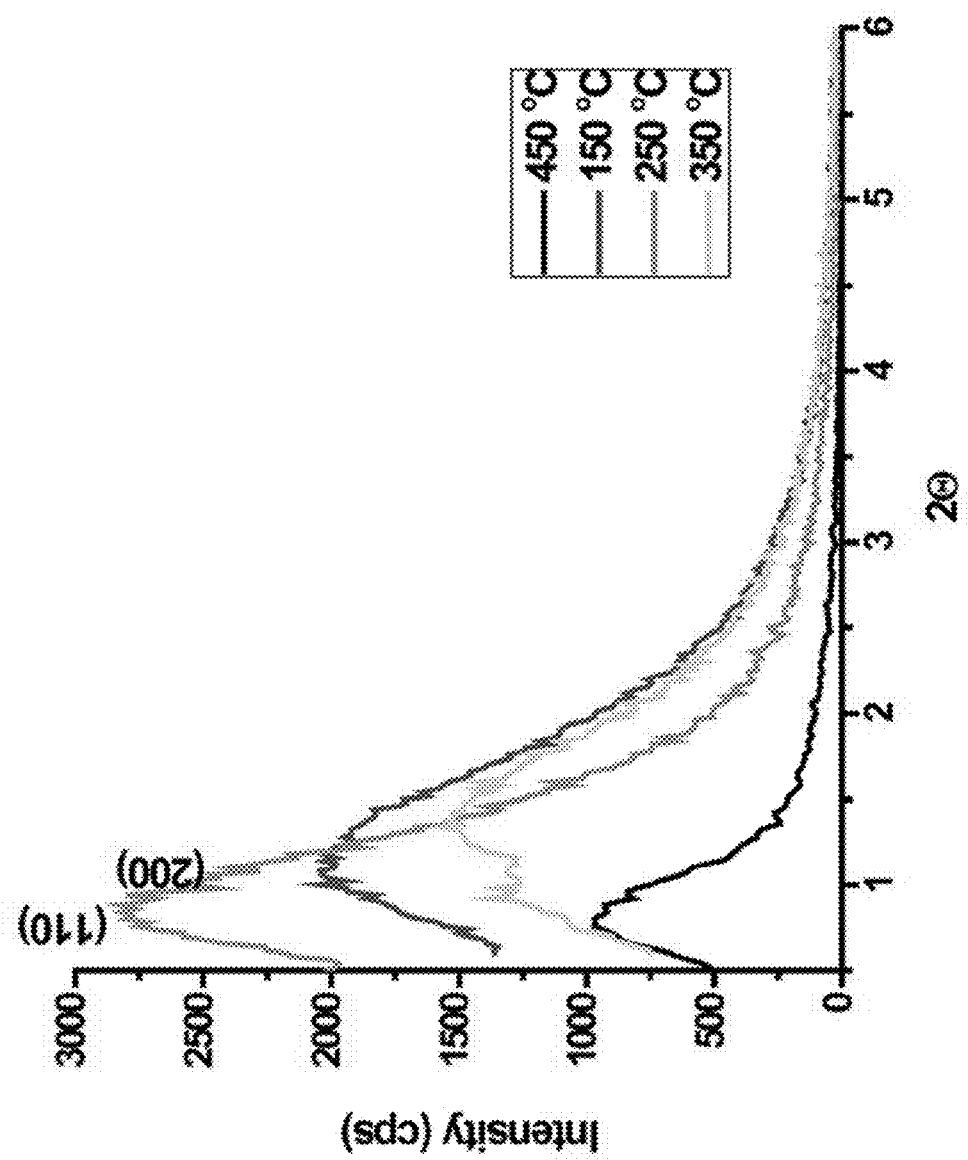
FIG. 7 depicts the low angle powder X-ray diffraction (PXRD) pattern of mesoporous $Mn_2O_3$ synthesized with Pluronic® F127 surfactant prepared in Example 3.
Figure 8:
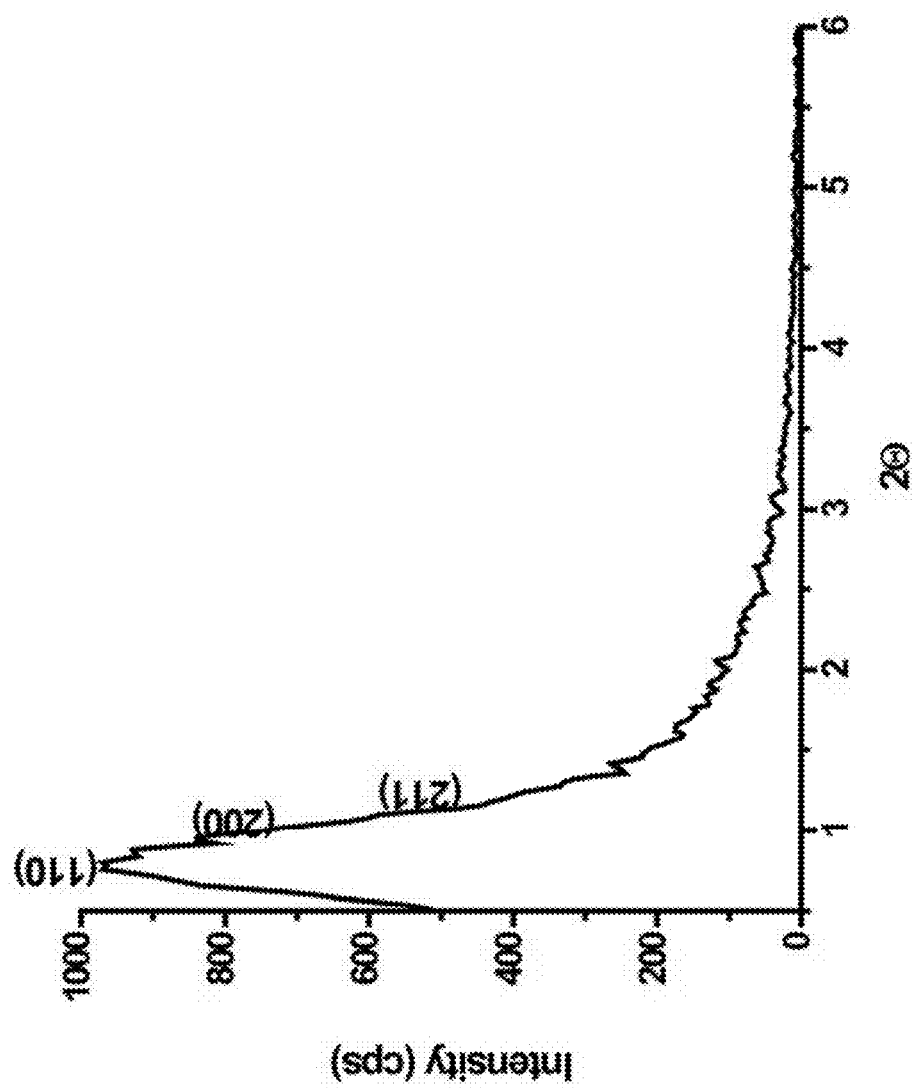
FIG. 8 depicts the low angle powder X-ray diffraction (PXRD) pattern of mesoporous $Mn_2O_3$ synthesized with Pluronic® F127 surfactant prepared in Example 3 (a=162).
Figure 9:
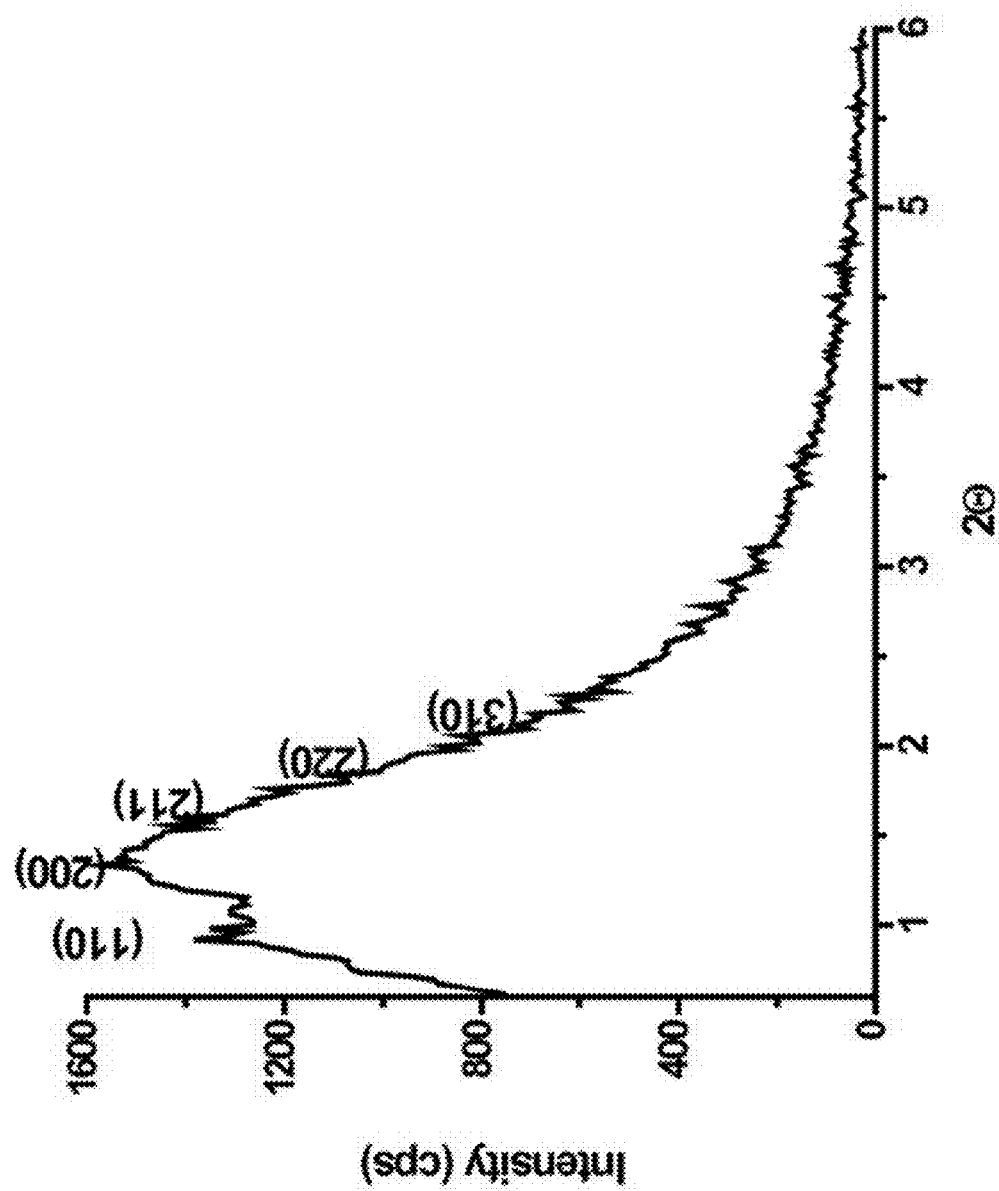
FIG. 9 depicts the low angle powder X-ray diffraction (PXRD) pattern of mesoporous $Mn_2O_3$ synthesized with Pluronic® F127 surfactant prepared in Example 3 (a=130).
Figure 10:
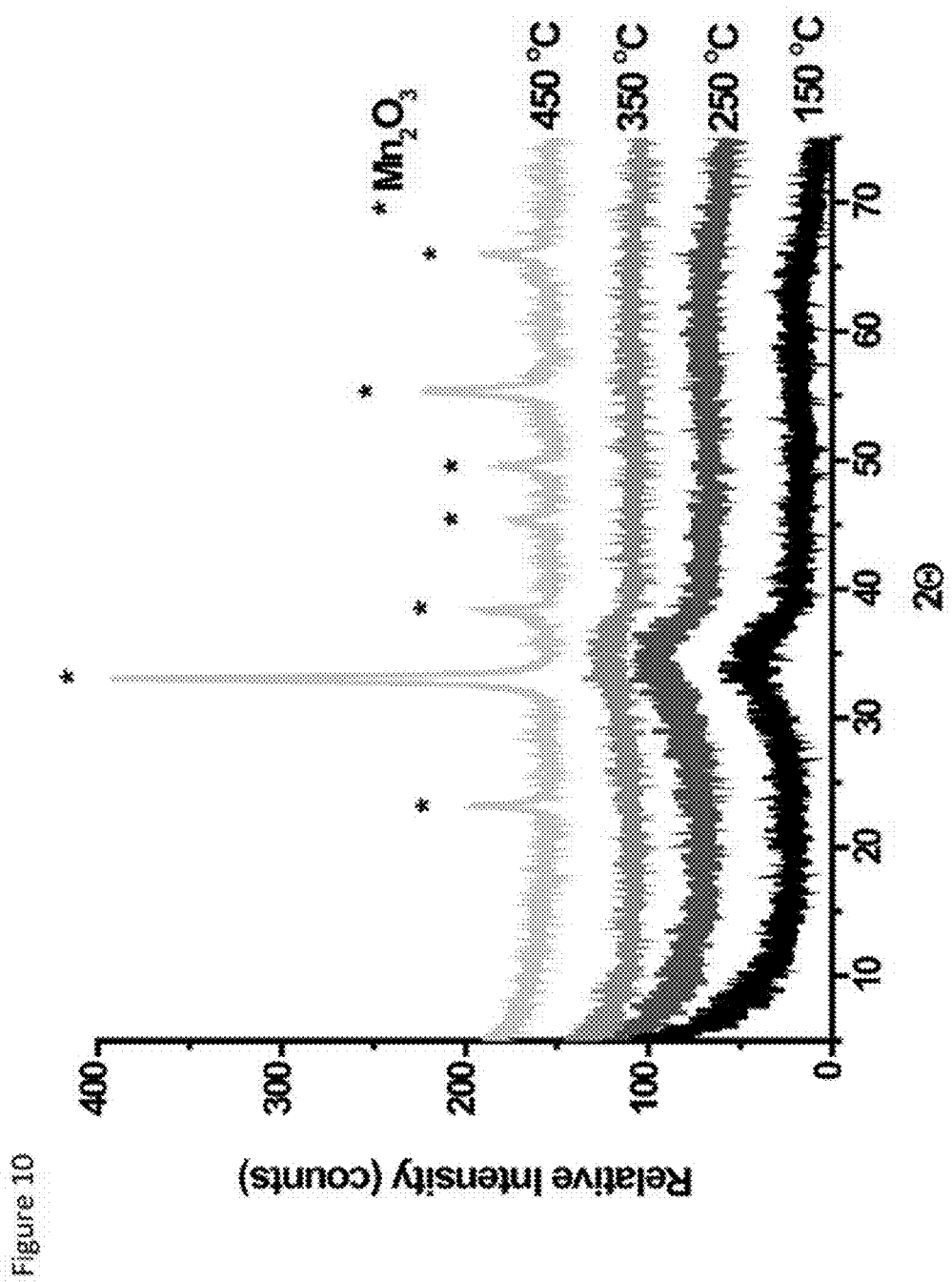
FIG. 10 depicts the powder X-ray diffraction (PXRD) pattern of mesoporous $Mn_2O_3$ synthesized with Pluronic® F127 surfactant prepared in Example 3.
Figure 11:
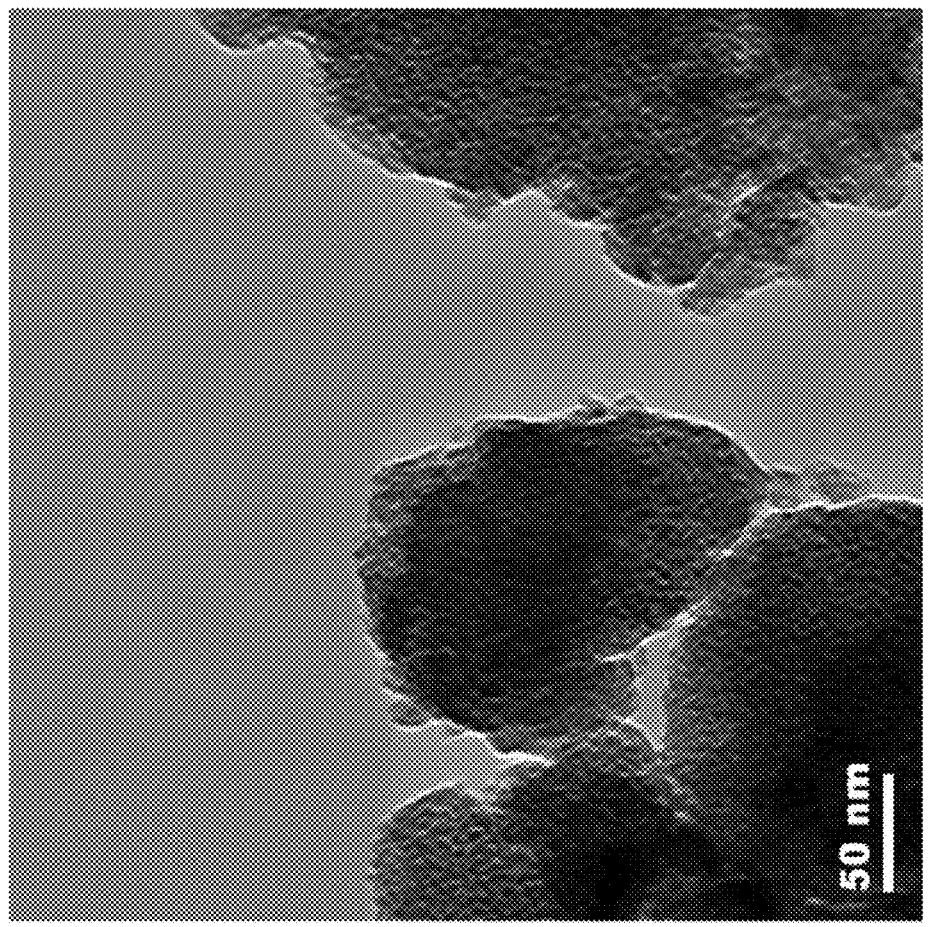
FIG. 11 depicts a high resolution transmission electron microscope (TEM) image of mesoporous $Mn_2O_3$ synthesized with Pluronic® F127 surfactant prepared in Example 3.
Figure 12:
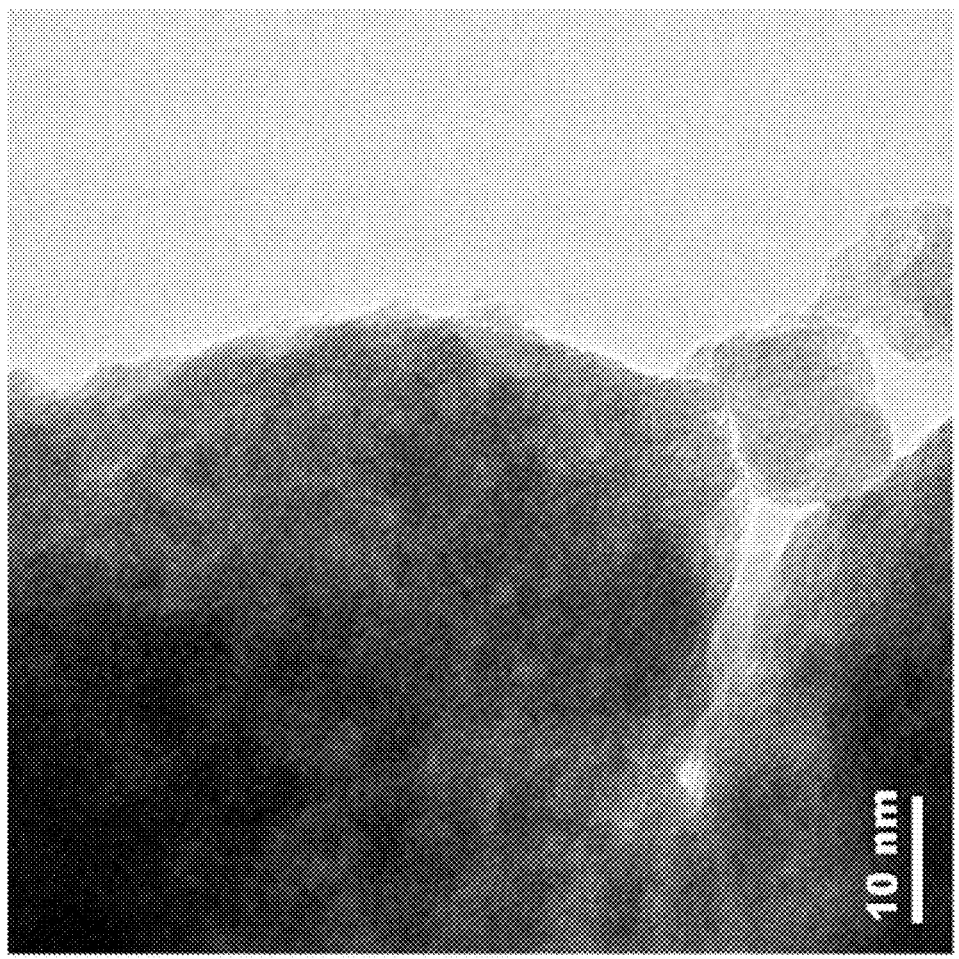
FIG. 12 depicts a high resolution transmission electron microscope (TEM) image of mesoporous $Mn_2O_3$ synthesized with Pluronic® F127 surfactant prepared in Example 3.
Figure 13:
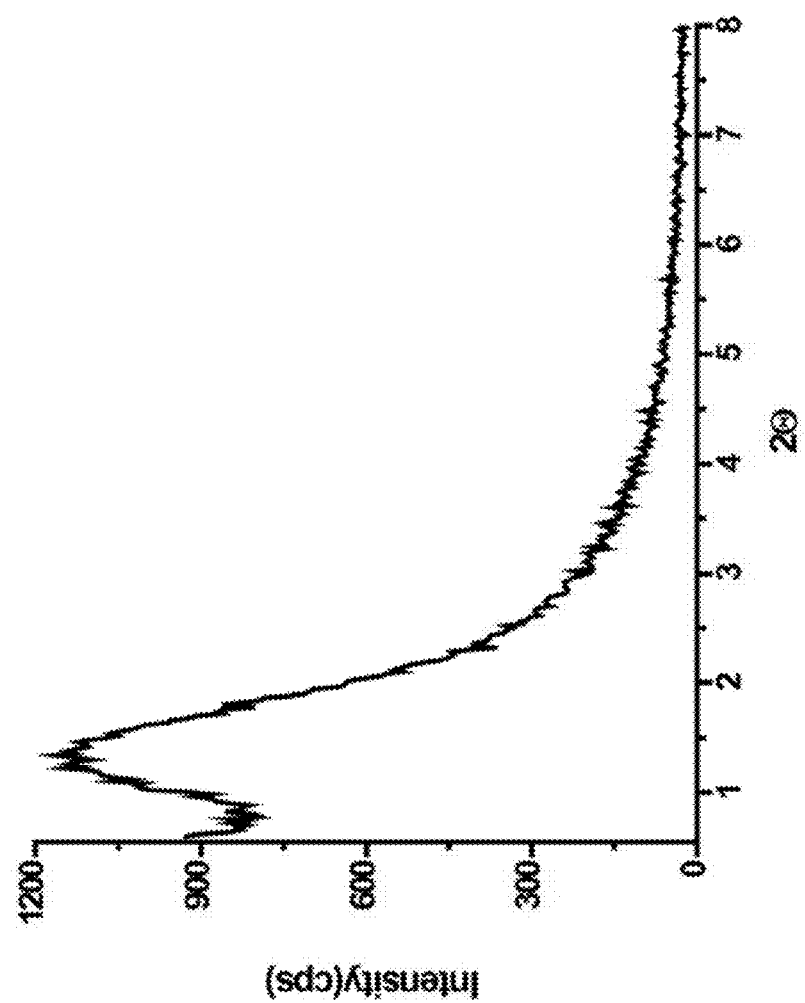
FIG. 13 depicts the low angle powder X-ray diffraction (PXRD) pattern of mesoporous $ZnC_2O_4$ synthesized with Pluronic® P123 surfactant prepared in Example 3 (surface area=70 $m^2/g$).
Figure 14:
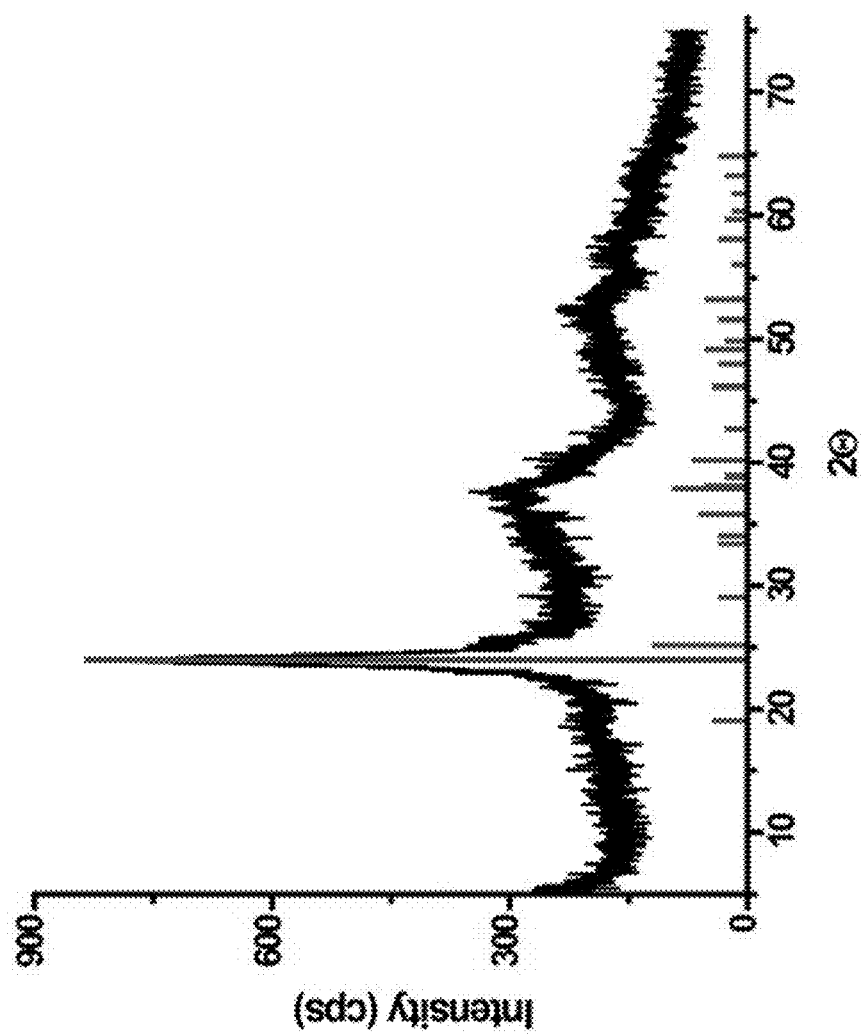
FIG. 14 depicts the powder X-ray diffraction (PXRD) pattern of mesoporous $ZnC_2O_4$ synthesized with Pluronic® P123 surfactant prepared in Example 3 (surface area=70 $m^2/g$).
Figure 15:
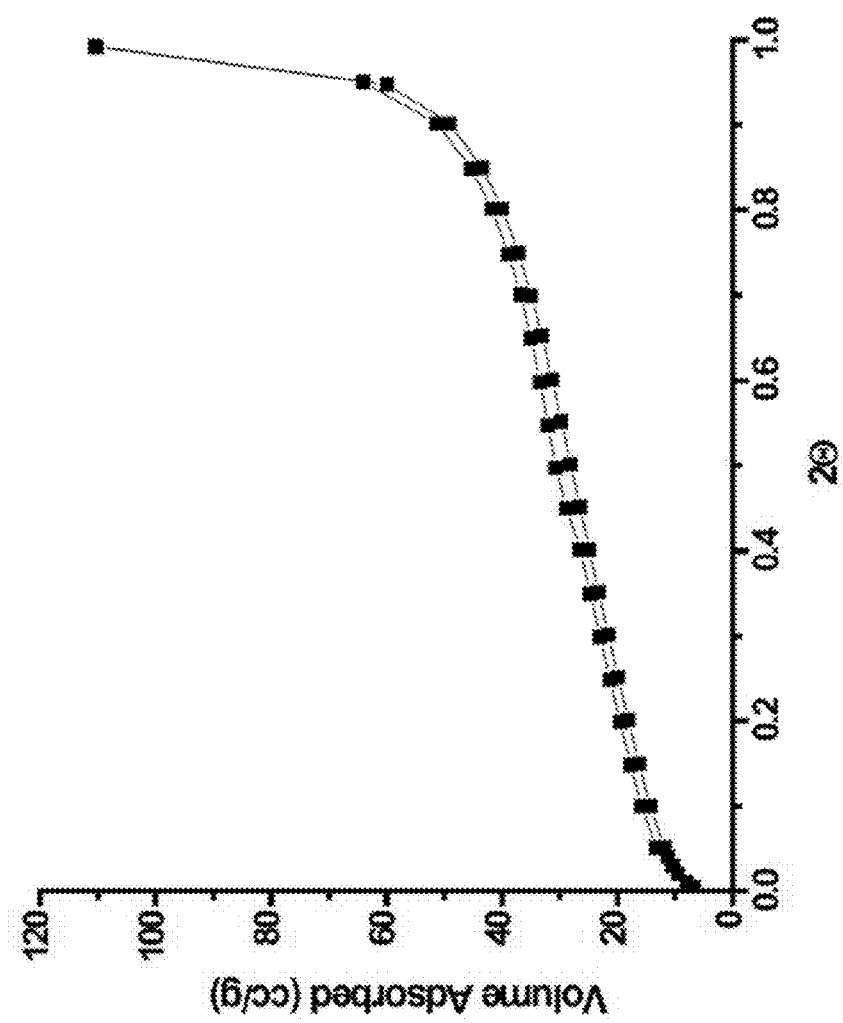
FIG. 15 depicts the nitrogen sorption isotherm of mesoporous $ZnC_2O_4$ synthesized with Pluronic® P123 surfactant prepared in Example 3 (surface area=70 $m^2/g$).

Referring to FIGS. 5 and 6, a comparison of structural parameters of mesoporous $Mn_2O_3$ synthesized with two different Pluronic® surfactants (Pluronic® P123 surfactant or Pluronic® F127 surfactant) is set forth in Table 4 below.

TABLE 4

| | Δ (max) | SA (BET) | Pore Volume (BJH) | Pore Diameter (BJH des) | Wall thickness* |
|---|---|---|---|---|---|
| F127 | 350 C. ° | 160 m²\g | 0.160 cc\g | 3.5 nm | 7.8 nm |
| | 450 C. ° | 68 m²\g | 0.116 cc\g | 4.5 nm | 9.5 nm |
| P123 | 350 C. ° | 191 m²\g | 0.224 cc\g | 3.7 nm | 5.2 nm |
| | 450 C. ° | 100 m²\g | 0.200 cc\g | 5.3 nm | 8.0 nm |

Figure 16:
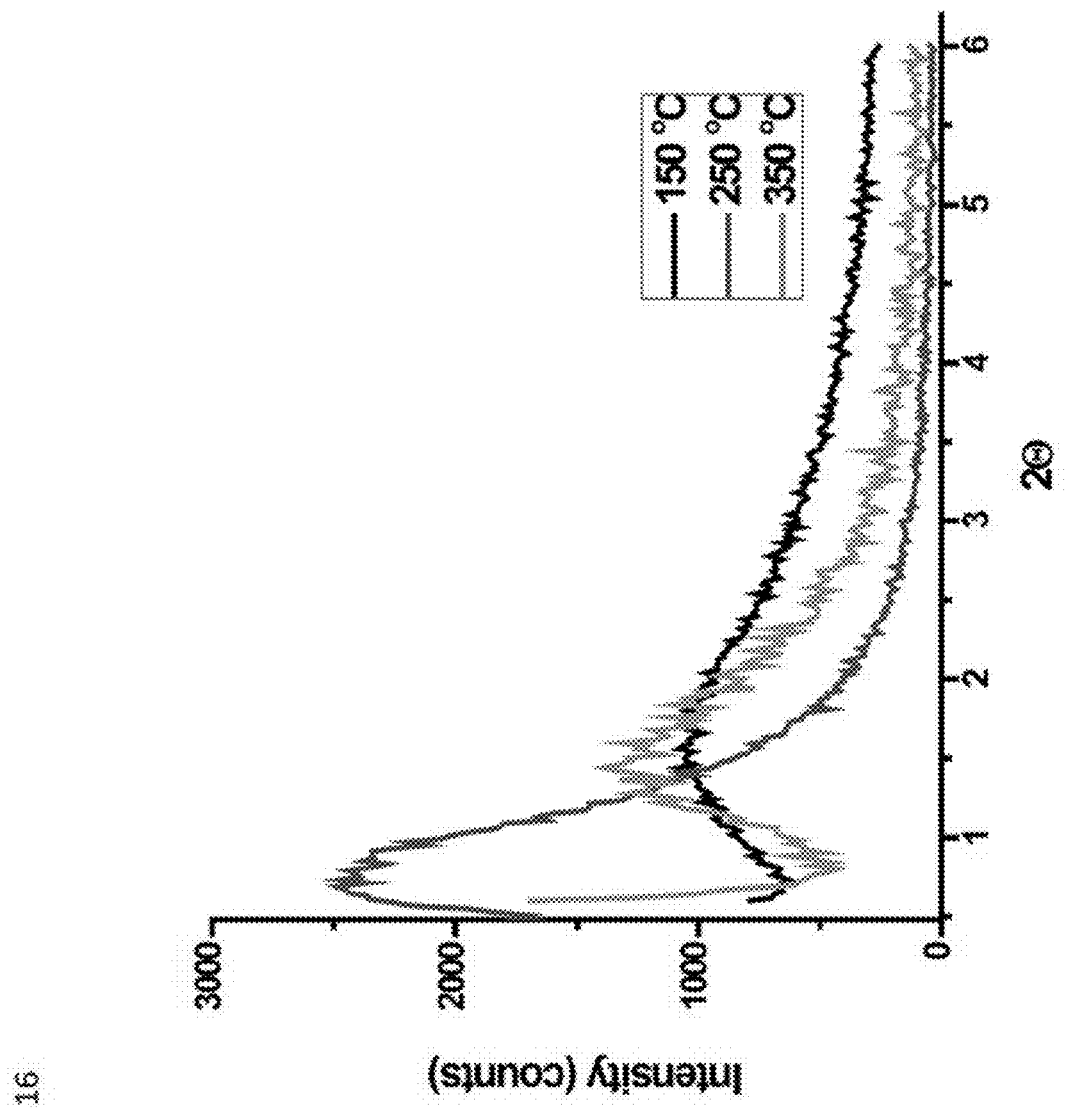
FIG. 16 depicts the low angle powder X-ray diffraction (PXRD) pattern of mesoporous CuO synthesized with Pluronic® P123 surfactant prepared in Example 3. The mesoporous CuO has a surface area (BET) of 47.5 $m^2/g$ at 150° C. and 21.8 $m^2/g$ at 250° C. The CuO is mesostructured but not porous. The pores are likely blocked.
Figure 17:
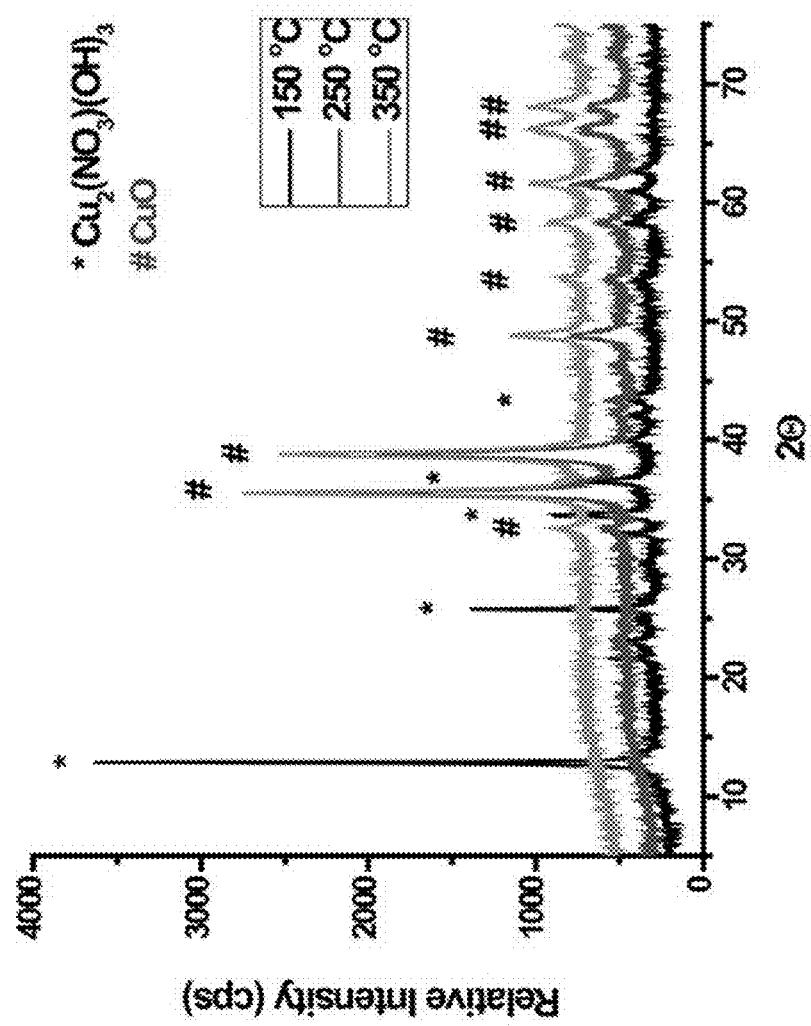
FIG. 17 depicts the powder X-ray diffraction (PXRD) pattern of mesoporous CuO synthesized with Pluronic® P123 surfactant prepared in Example 3. The mesoporous CuO has a surface area (BET) of 47.5 $m^2/g$ at 150° C. and 21.8 $m^2/g$ at 250° C. The CuO is mesostructured but not porous. The pores are likely blocked.
Figure 18:
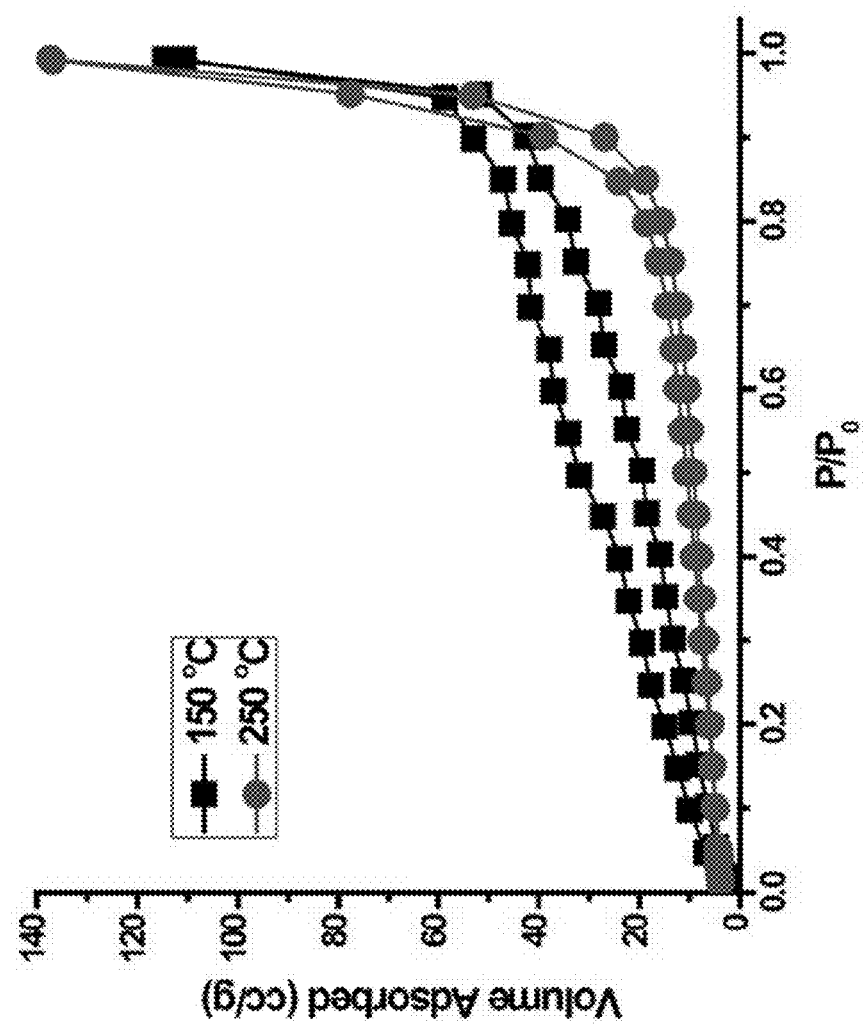
FIG. 18 depicts the nitrogen sorption isotherm of mesoporous CuO synthesized with Pluronic® P123 surfactant prepared in Example 3. The mesoporous CuO has a surface area (BET) of 47.5 $m^2/g$ at 150° C. and 21.8 $m^2/g$ at 250° C. The CuO is mesostructured but not porous. The pores are likely blocked.
Figure 19:
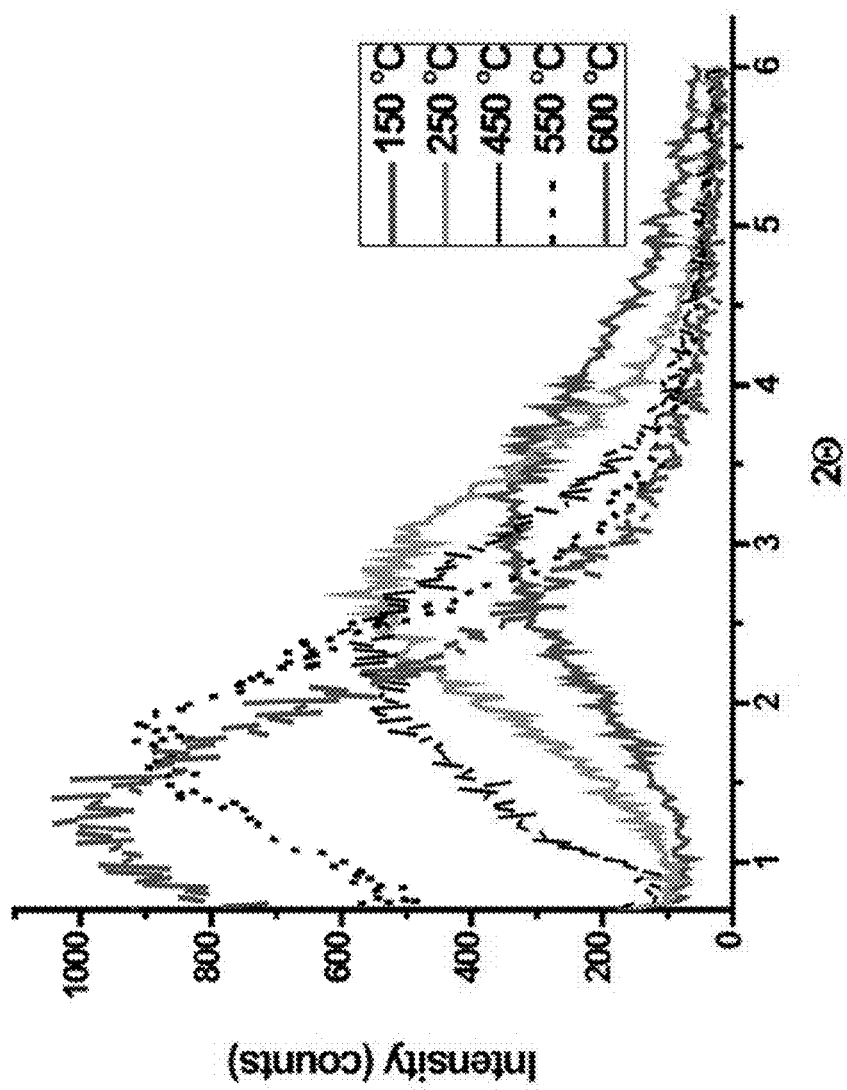
FIG. 19 depicts the low angle powder X-ray diffraction (PXRD) pattern of mesoporous $CeO_2$ synthesized with Pluronic® P123 surfactant prepared in Example 3.
Figure 20:
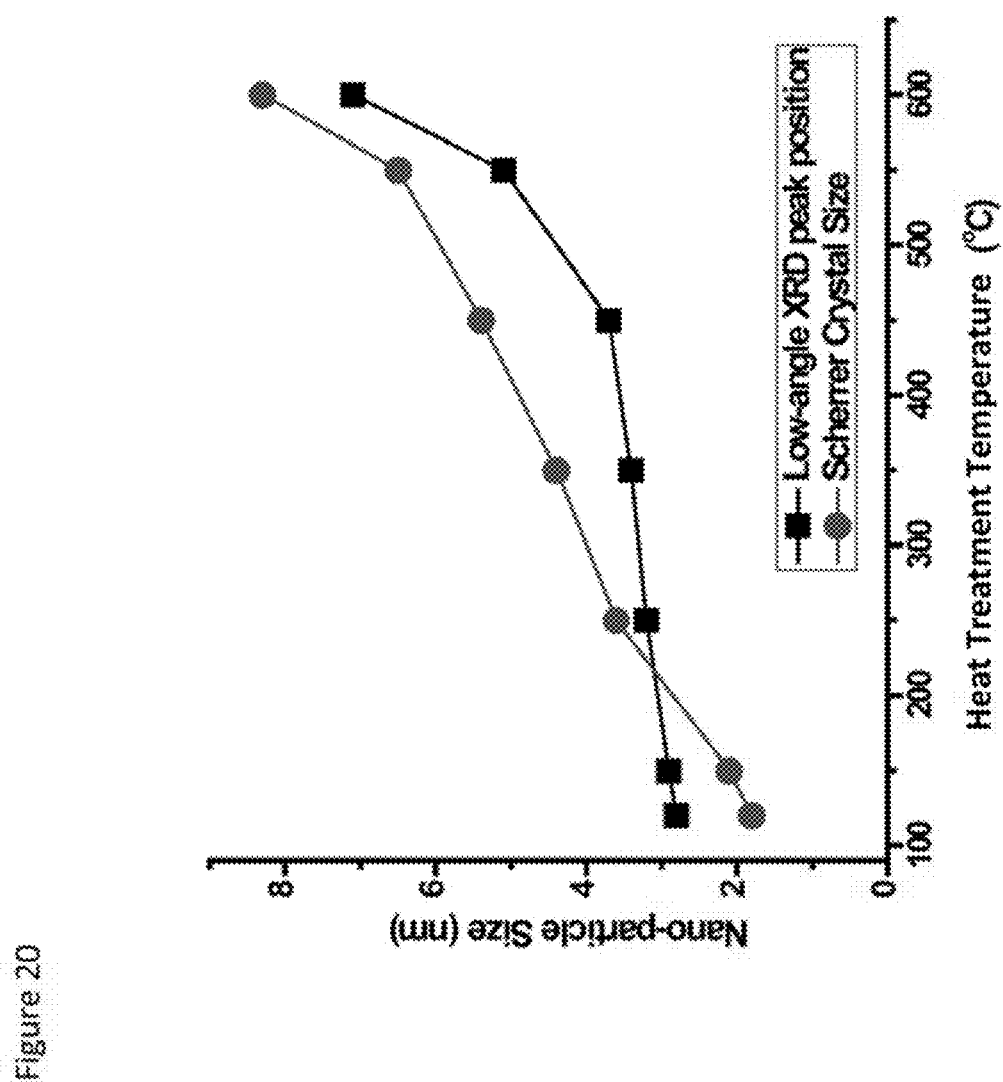
FIG. 20 depicts the nano-particle size of mesoporous $CeO_2$ synthesized with Pluronic® P123 surfactant versus heat treatment prepared in Example 3. The particle size was calculated by the Scherrer equation and the low angle powder X-ray signal position.
Figure 21:
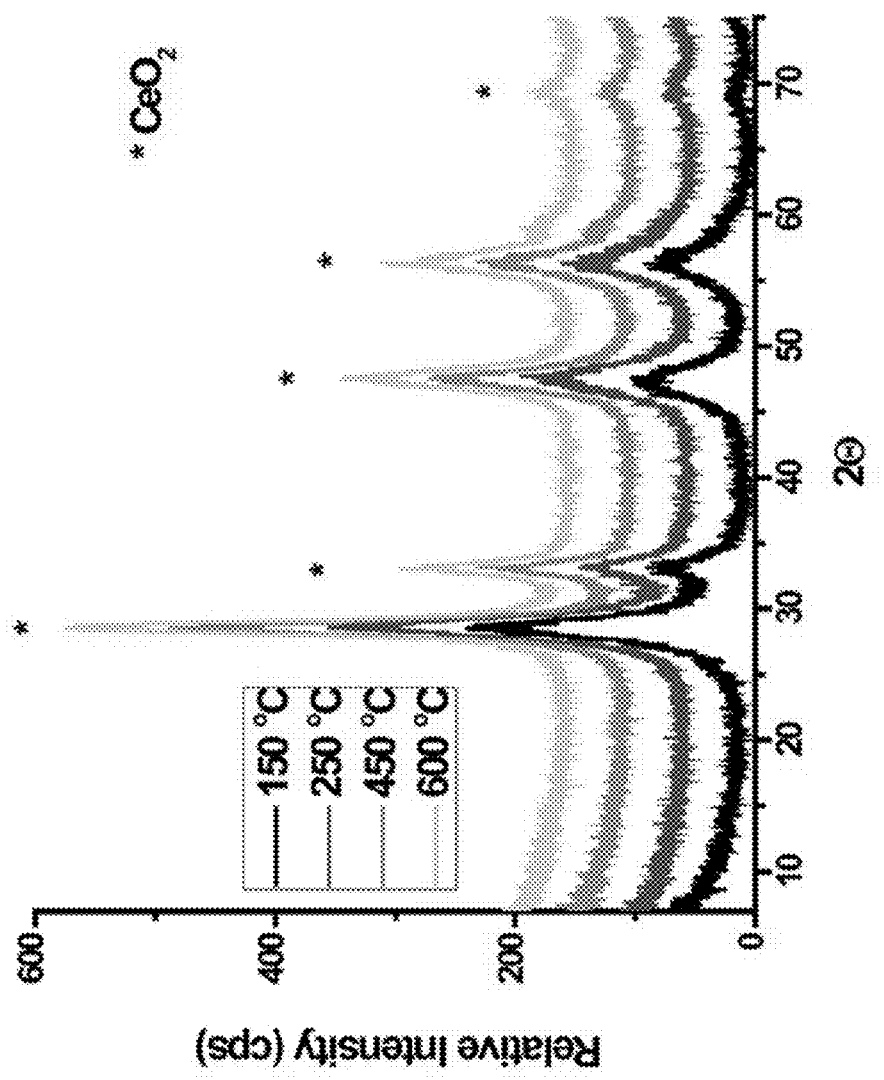
FIG. 21 depicts the powder X-ray diffraction (PXRD) pattern of mesoporous $CeO_2$ synthesized with Pluronic® P123 surfactant prepared in Example 3.

Referring to FIGS. 16-18, a comparison of surface area (BET) of mesoporous CuO at different temperatures is set forth in Table 5 below.

TABLE 5

| Δ (max) | SA (BET) |
|---|---|
| 150 C. ° | 47.5 m²\g |
| 250 C. ° | 21.8 m²\g |

Figure 22:
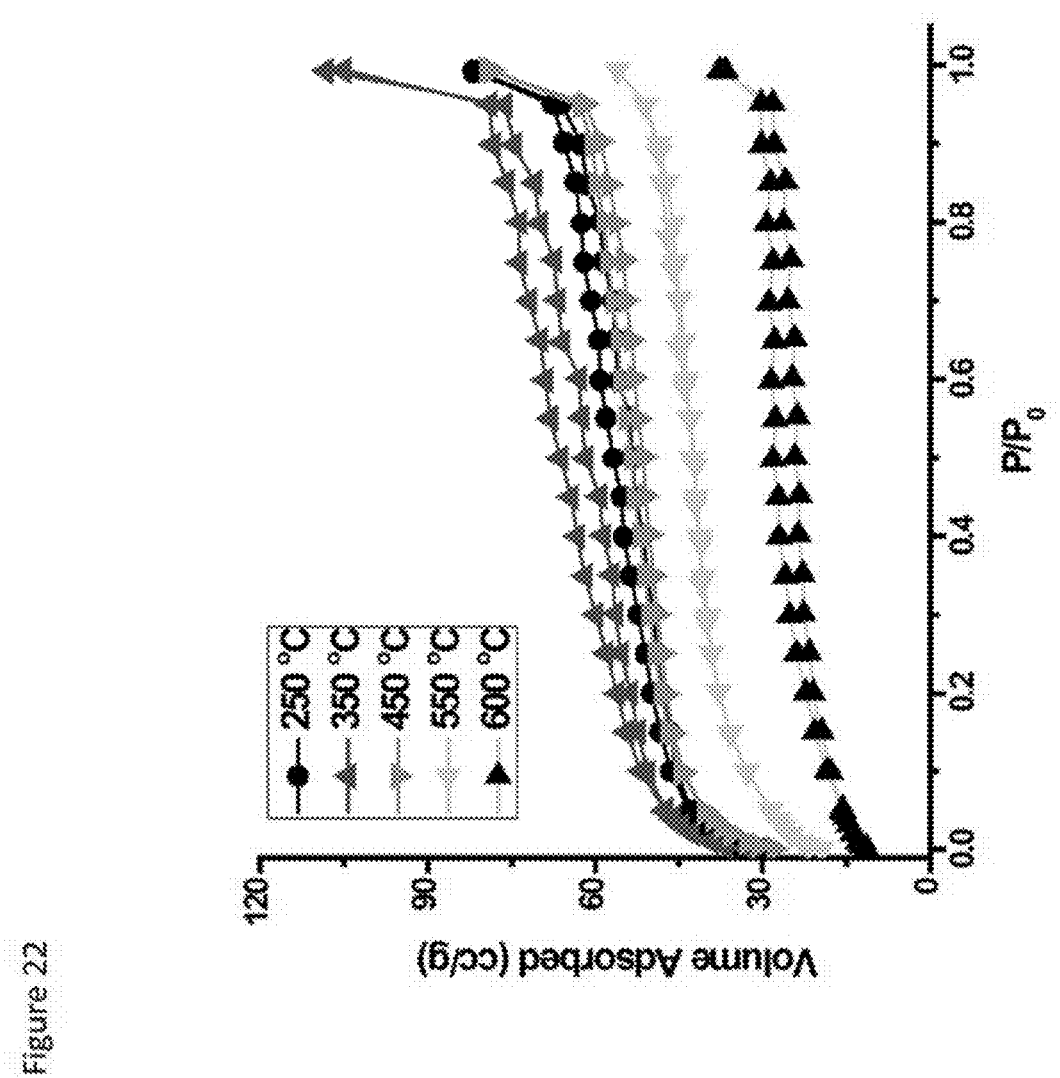
FIG. 22 depicts the nitrogen sorption isotherm of mesoporous $CeO_2$ synthesized with Pluronic® P123 surfactant prepared in Example 3. The mesoporous $CeO_2$ has a surface area (BET) of 97.5 $m^2/g$ at 150° C., 152.3 $m^2/g$ at 250° C., 173.4 $m^2/g$ at 350° C., 149.9 $m^2/g$ at 450° C., 127.3 $m^2/g$ at 550° C., and 71.6 $m^2/g$ at 600° C.
Figure 23:
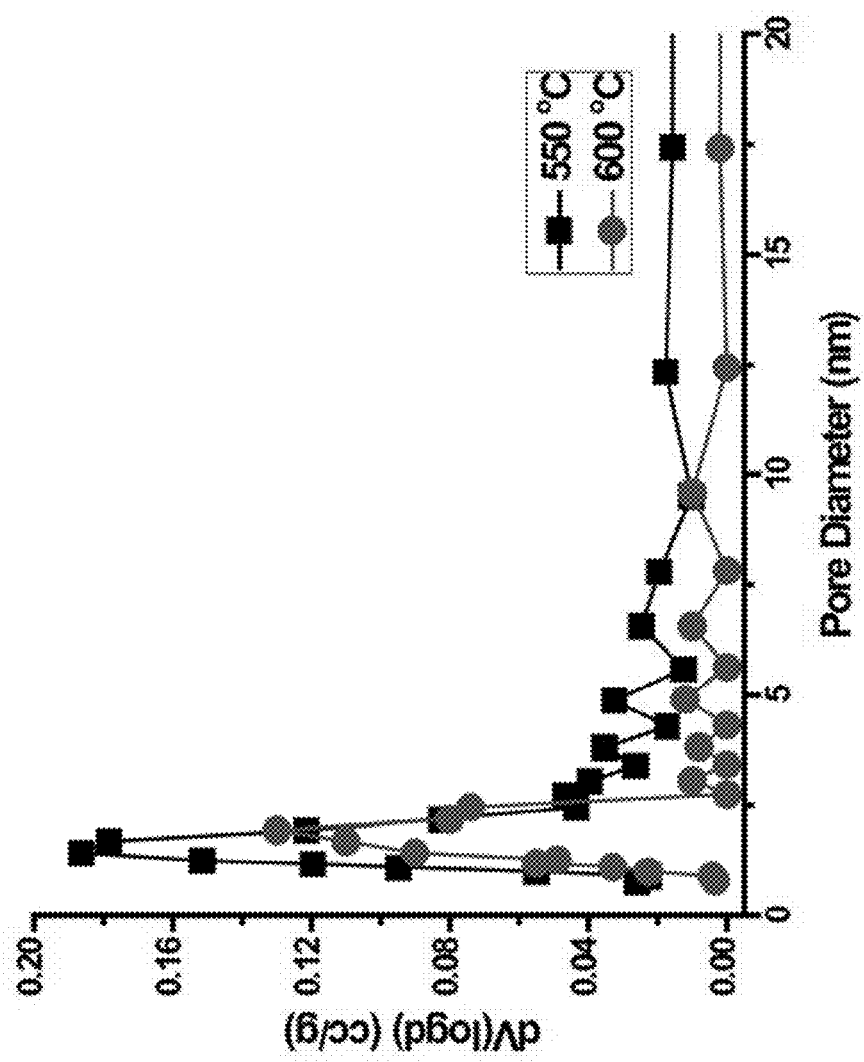
FIG. 23 depicts the Barret-Joyner-Halenda (BJH) desorption pore size distribution of mesoporous $CeO_2$ synthesized with Pluronic® P123 surfactant prepared in Example 3. The mesoporous $CeO_2$ has a surface area (BET) of 97.5 $m^2/g$ at 150° C., 152.3 $m^2/g$ at 250° C., 173.4 $m^2/g$ at 350° C., 149.9 $m^2/g$ at 450° C., 127.3 $m^2/g$ at 550° C., and 71.6 $m^2/g$ at 600° C.
Figure 24:
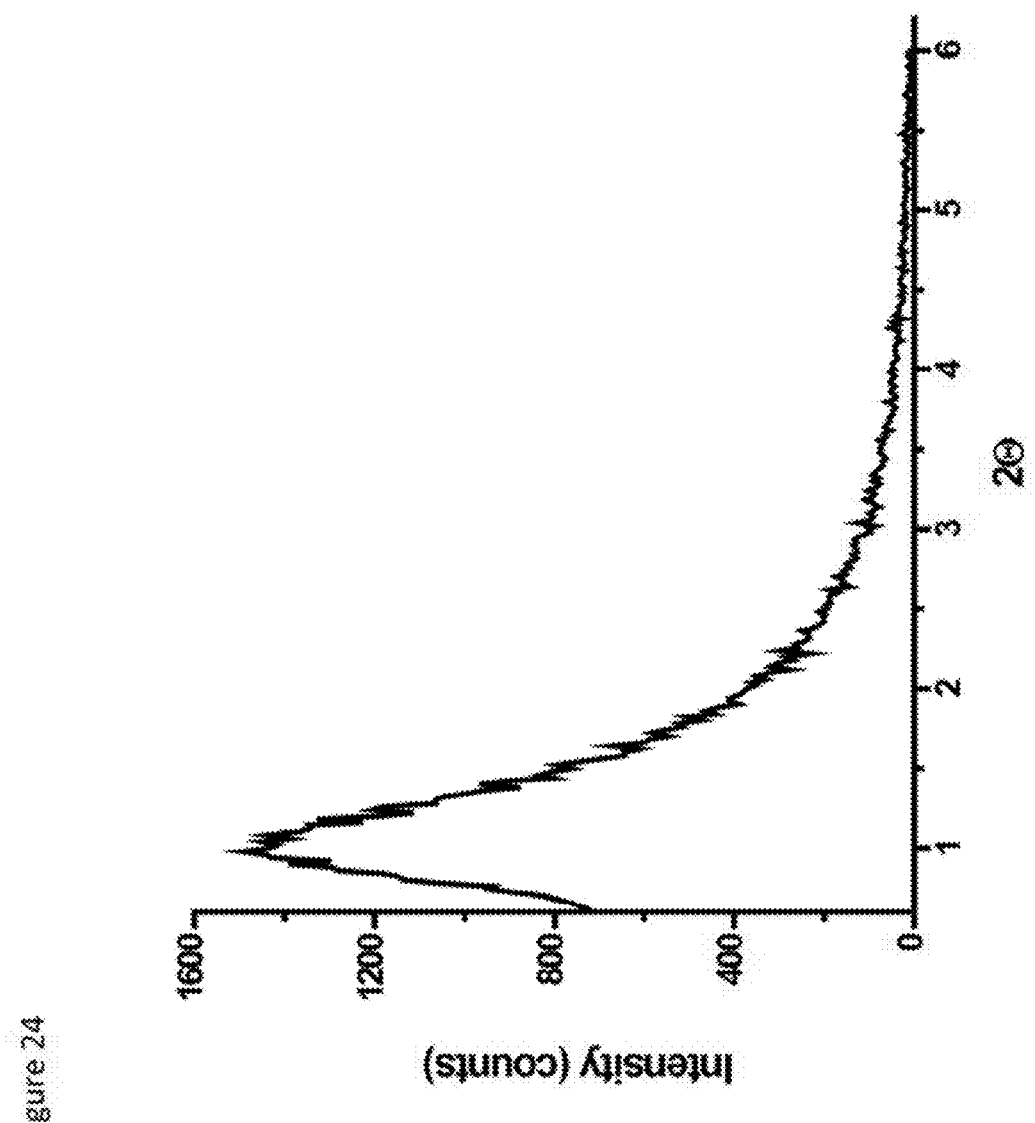
FIG. 24 depicts the low angle powder X-ray diffraction (PXRD) pattern of mesoporous $TiO_2$ synthesized with Pluronic® P123 surfactant prepared in Example 3.
Figure 25:
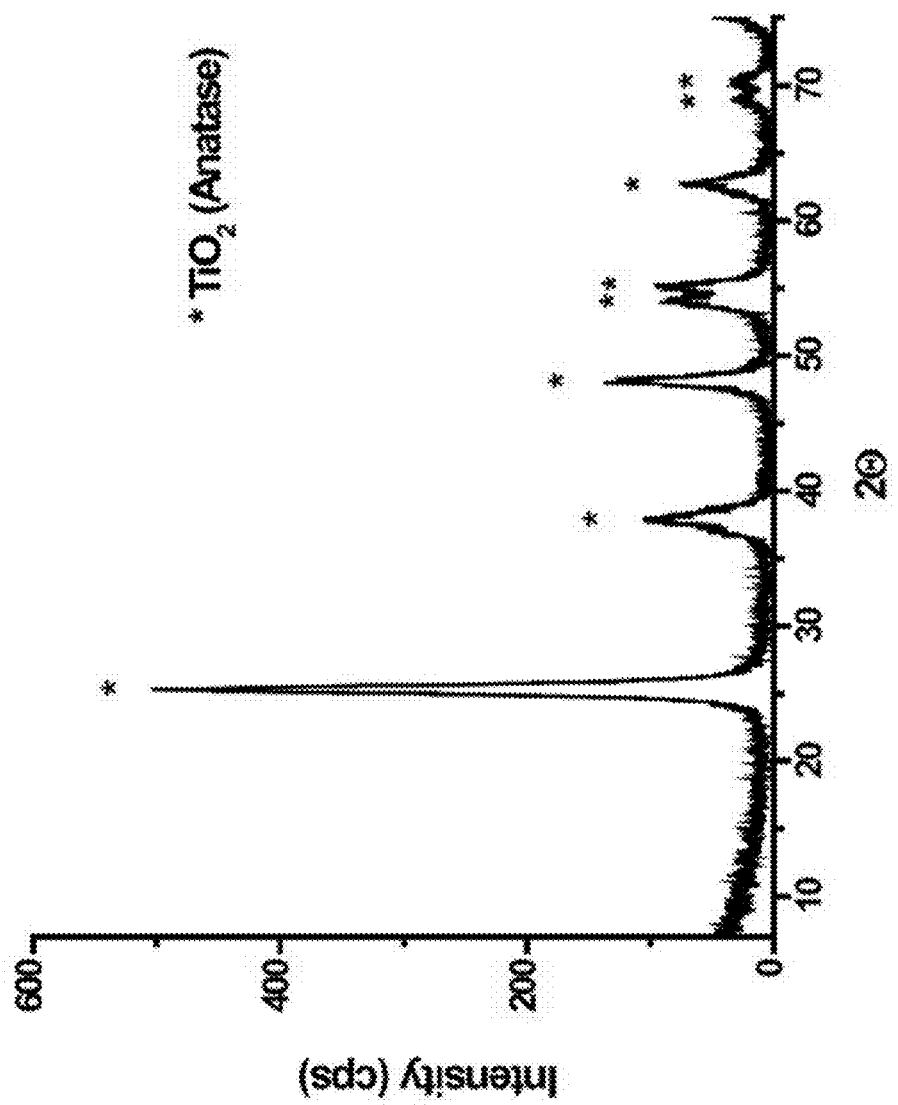
FIG. 25 depicts the powder X-ray diffraction (PXRD) pattern of mesoporous $TiO_2$ synthesized with Pluronic® P123 surfactant prepared in Example 3.
Figure 26:
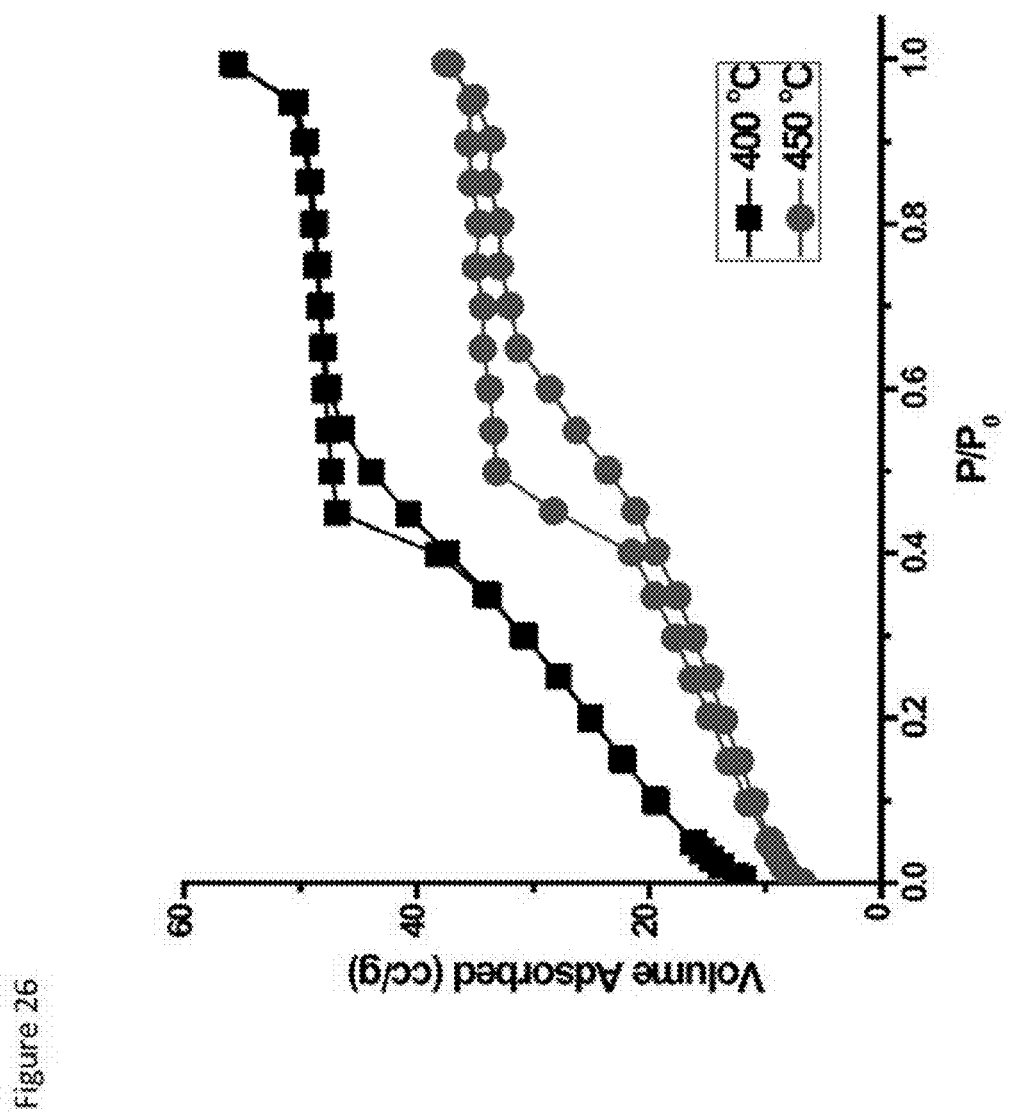
FIG. 26 depicts the nitrogen sorption isotherm of mesoporous $TiO_2$ synthesized with Pluronic® P123 surfactant prepared in Example 3.
Figure 27:
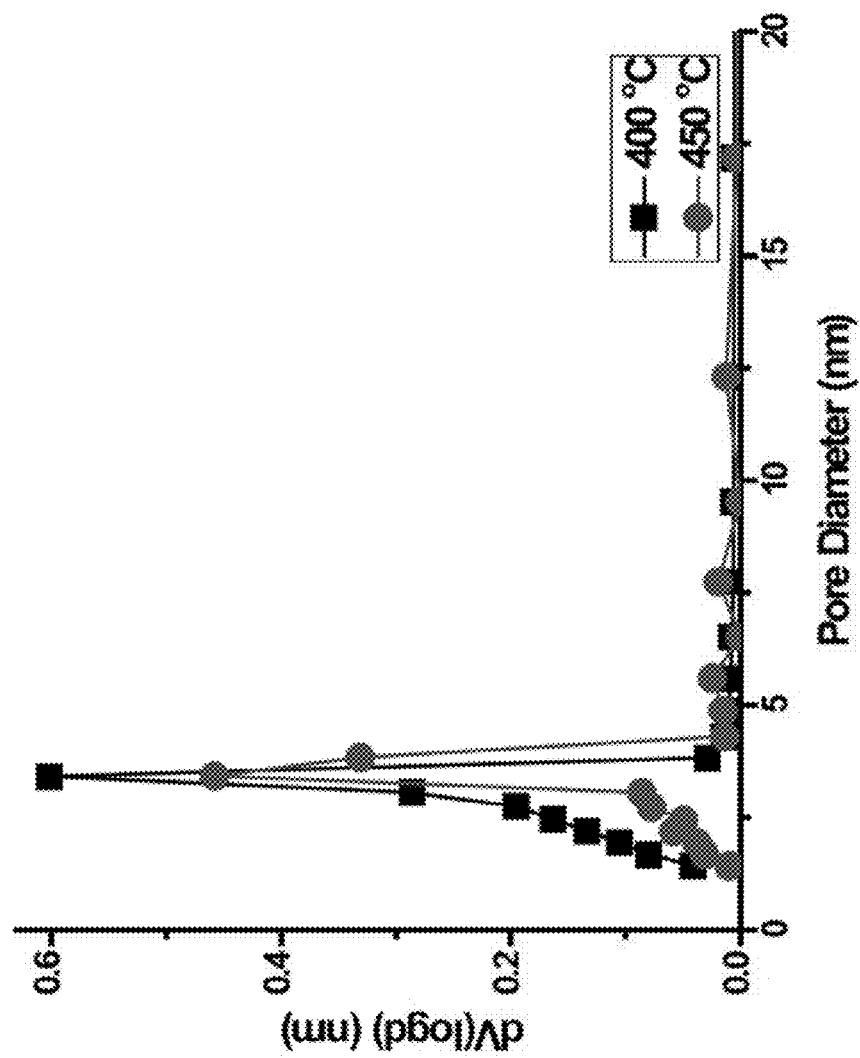
FIG. 27 depicts the Barret-Joyner-Halenda (BJH) desorption pore size distribution of mesoporous $TiO_2$ synthesized with Pluronic® P123 surfactant prepared in Example 3.
Figure 28:
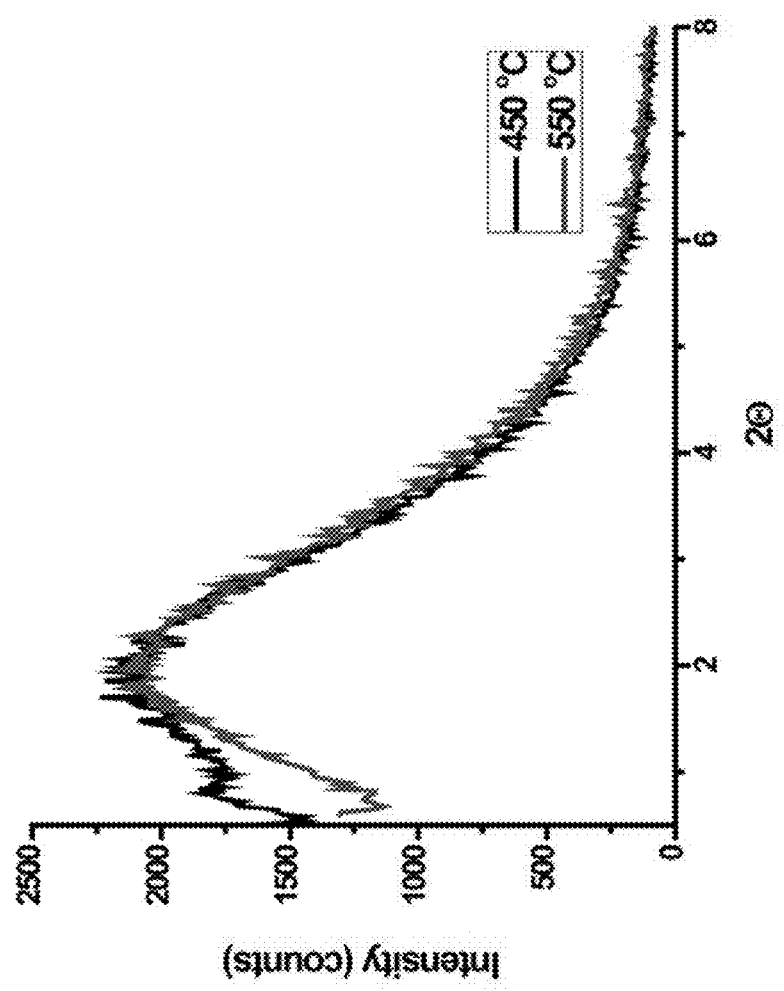
FIG. 28 depicts the low angle powder X-ray diffraction (PXRD) pattern of mesoporous $SiO_2$ synthesized with Pluronic® P123 surfactant prepared in Example 3.
Figure 29:
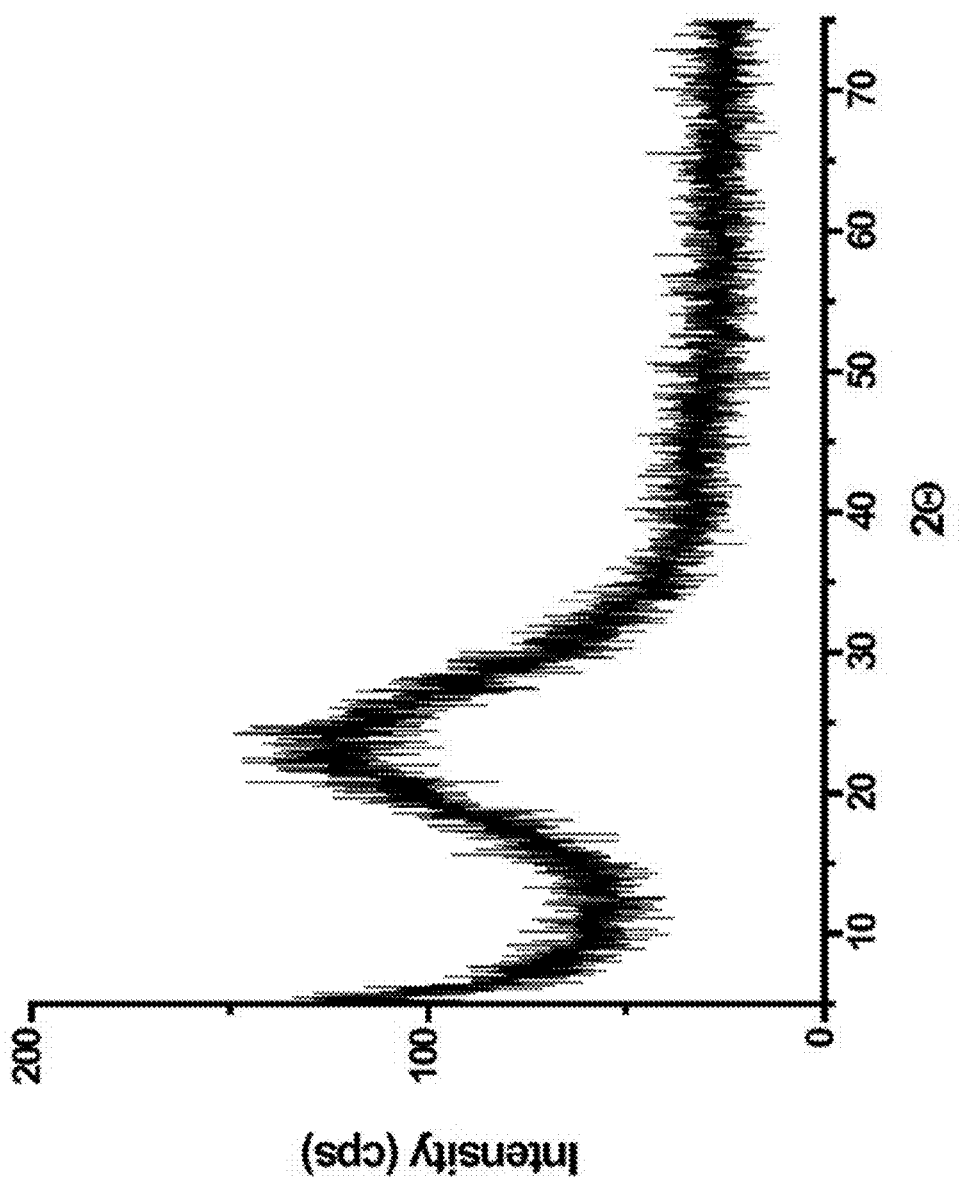
FIG. 29 depicts the powder X-ray diffraction (PXRD) pattern of mesoporous $SiO_2$ synthesized with Pluronic® P123 surfactant prepared in Example 3.
Figure 30:
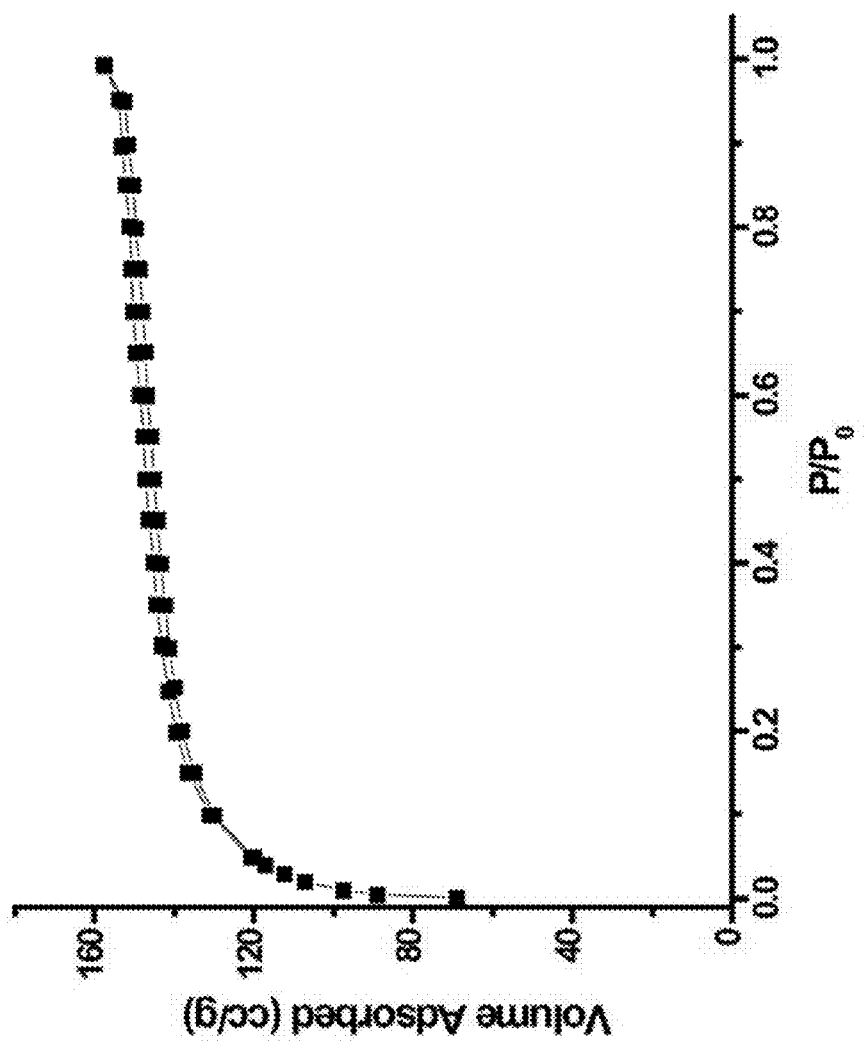
FIG. 30 depicts the nitrogen sorption isotherm of mesoporous $SiO_2$ synthesized with Pluronic® P123 surfactant prepared in Example 3. The mesoporous $SiO_2$ had a surface area of 434.9 $m^2/g$.
Figure 31:
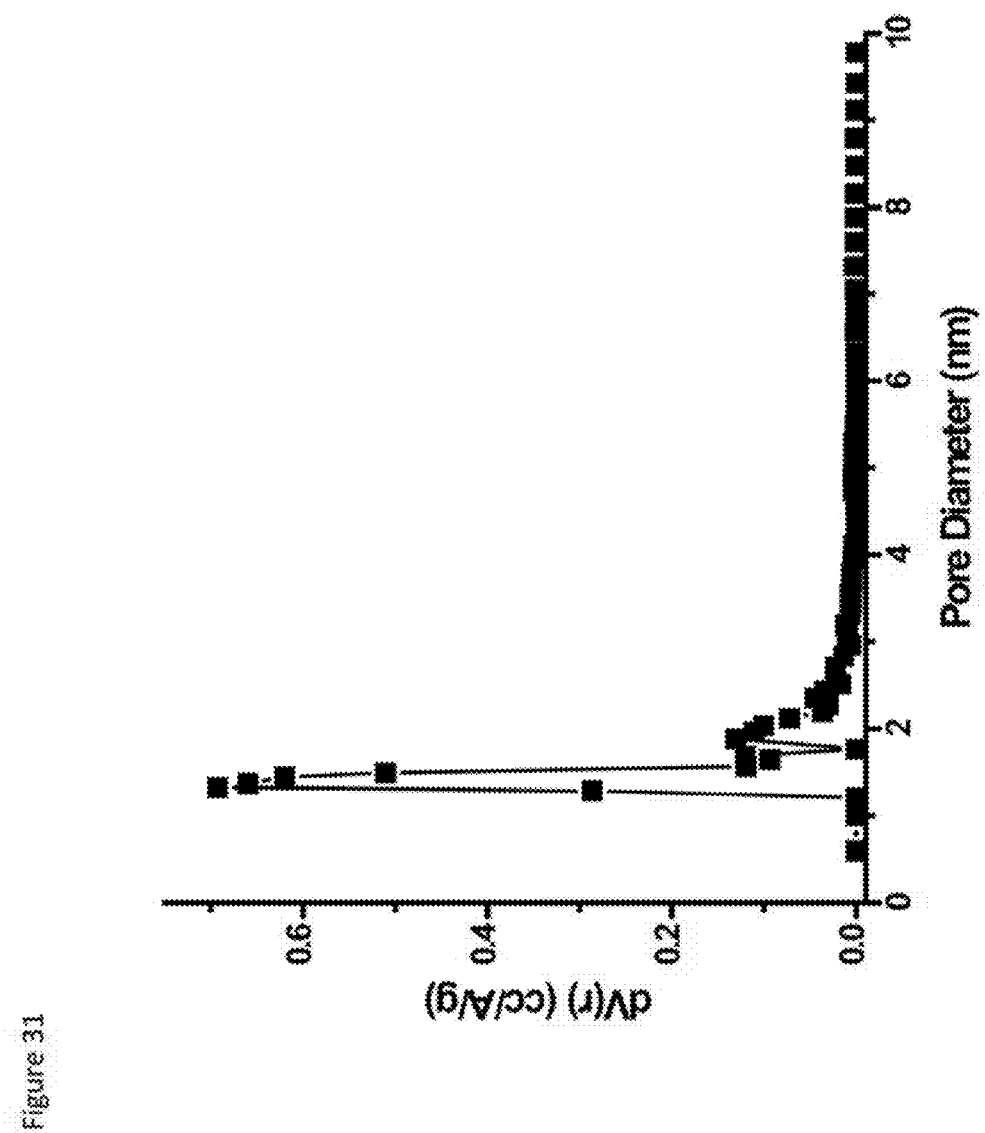
FIG. 31 depicts the density functional theory (DFT) pore size distribution of mesoporous $SiO_2$ synthesized with Pluronic® P123 surfactant prepared in Example 3.
Figure 32:
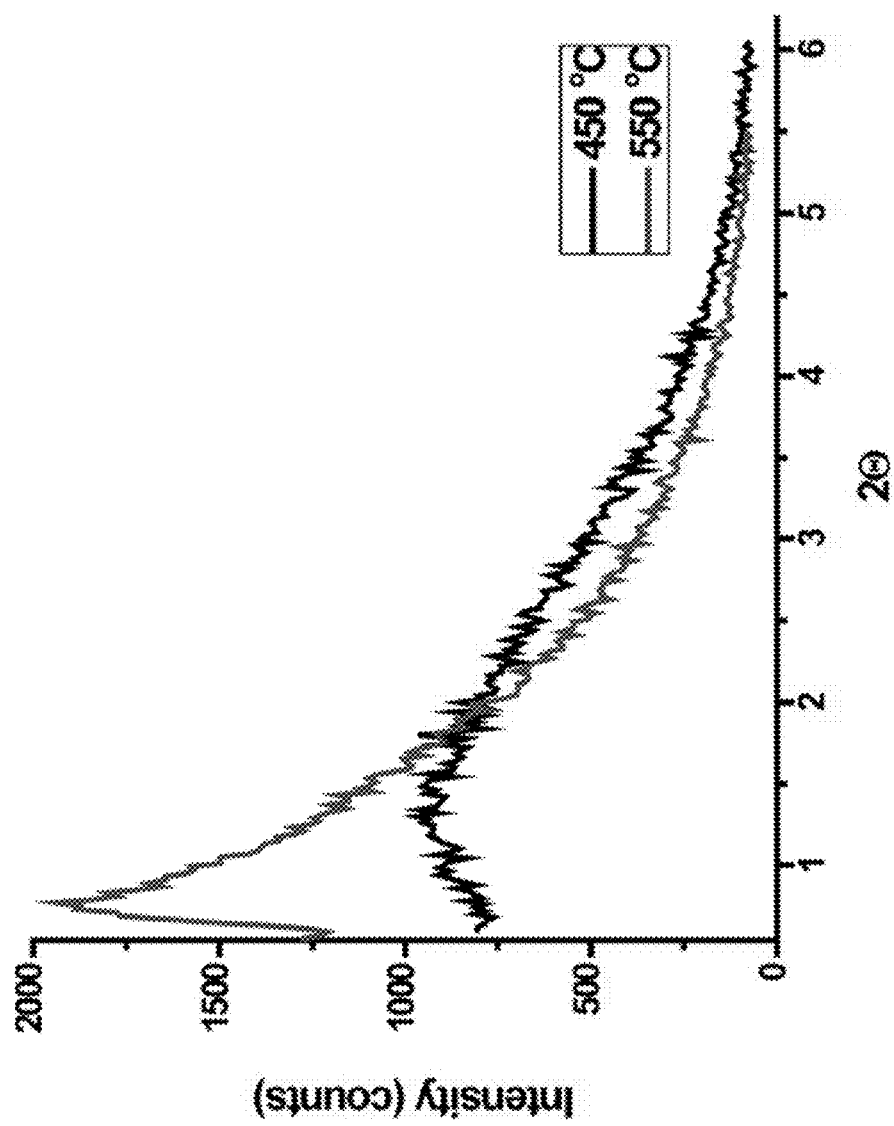
FIG. 32 depicts the low angle powder X-ray diffraction (PXRD) pattern of microporous aluminosilicate (Al:Si=1:5) synthesized with Pluronic® P123 surfactant prepared in Example 3.
Figure 33:
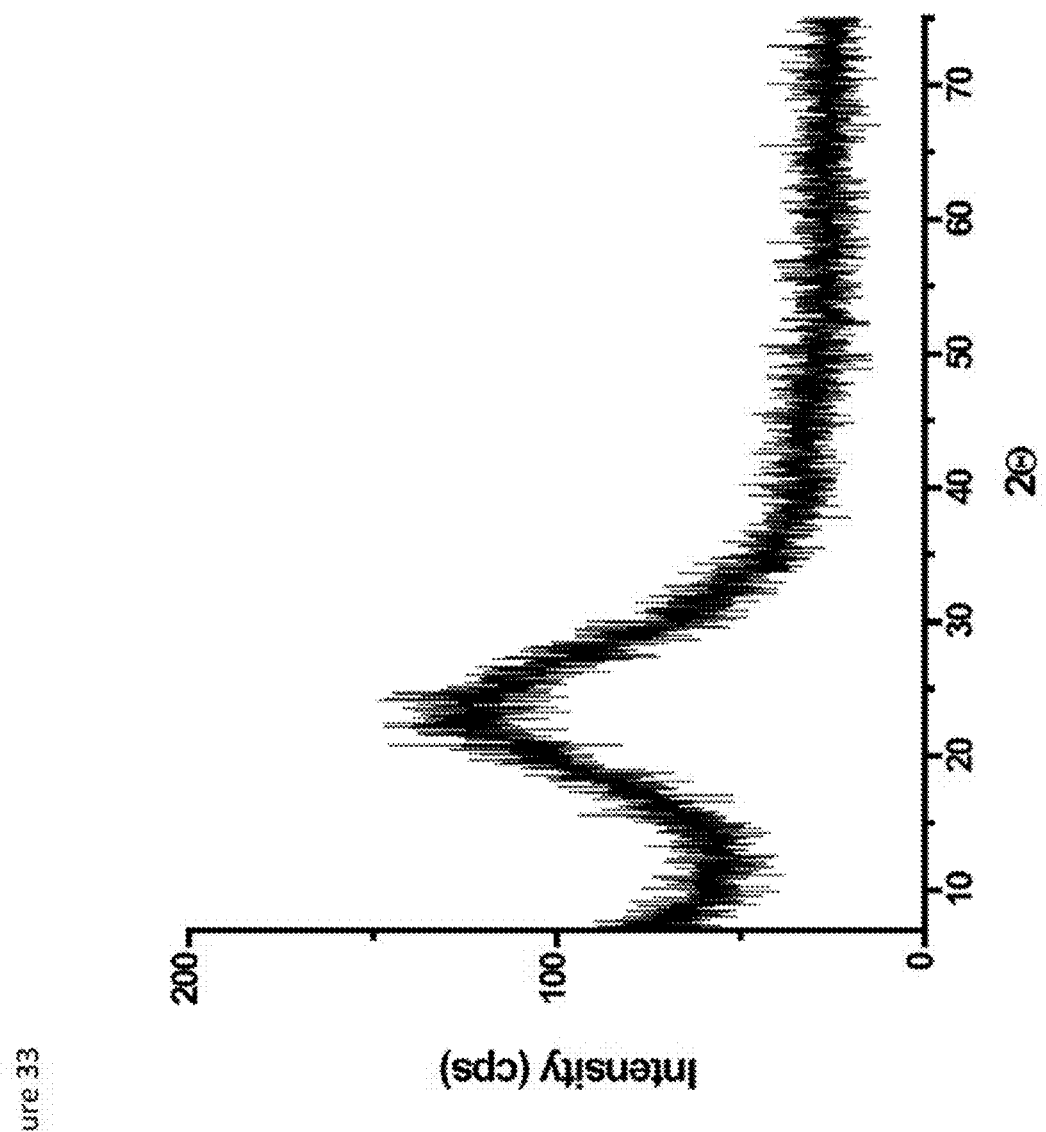
FIG. 33 depicts the powder X-ray diffraction (PXRD) pattern of microporous aluminosilicate (Al:Si=1:5) synthesized with Pluronic® P123 surfactant prepared in Example 3.
Figure 34:
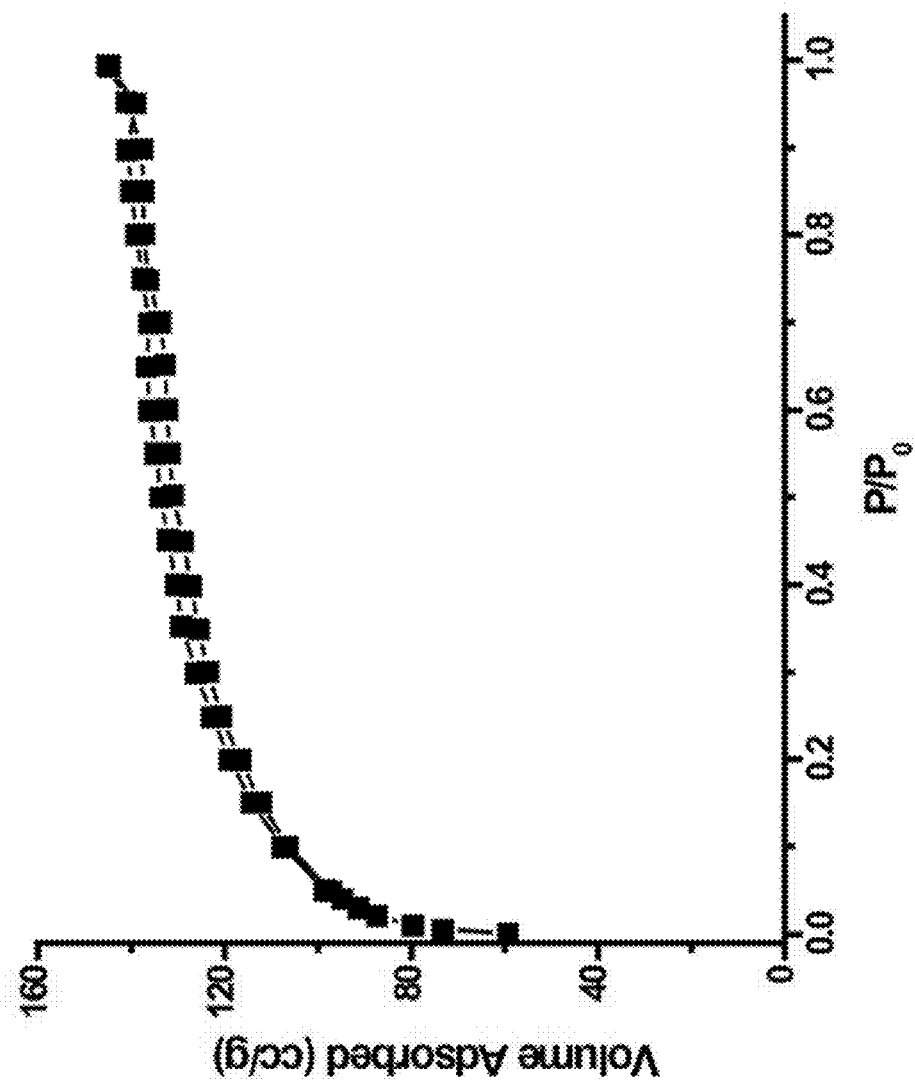
FIG. 34 depicts the nitrogen sorption isotherm of microporous alumiosilicate synthesized with Pluronic® P123 surfactant prepared in Example 3. The microporous aluminosilicate had a surface area of 384.9 m$^2$/g.
Figure 35:
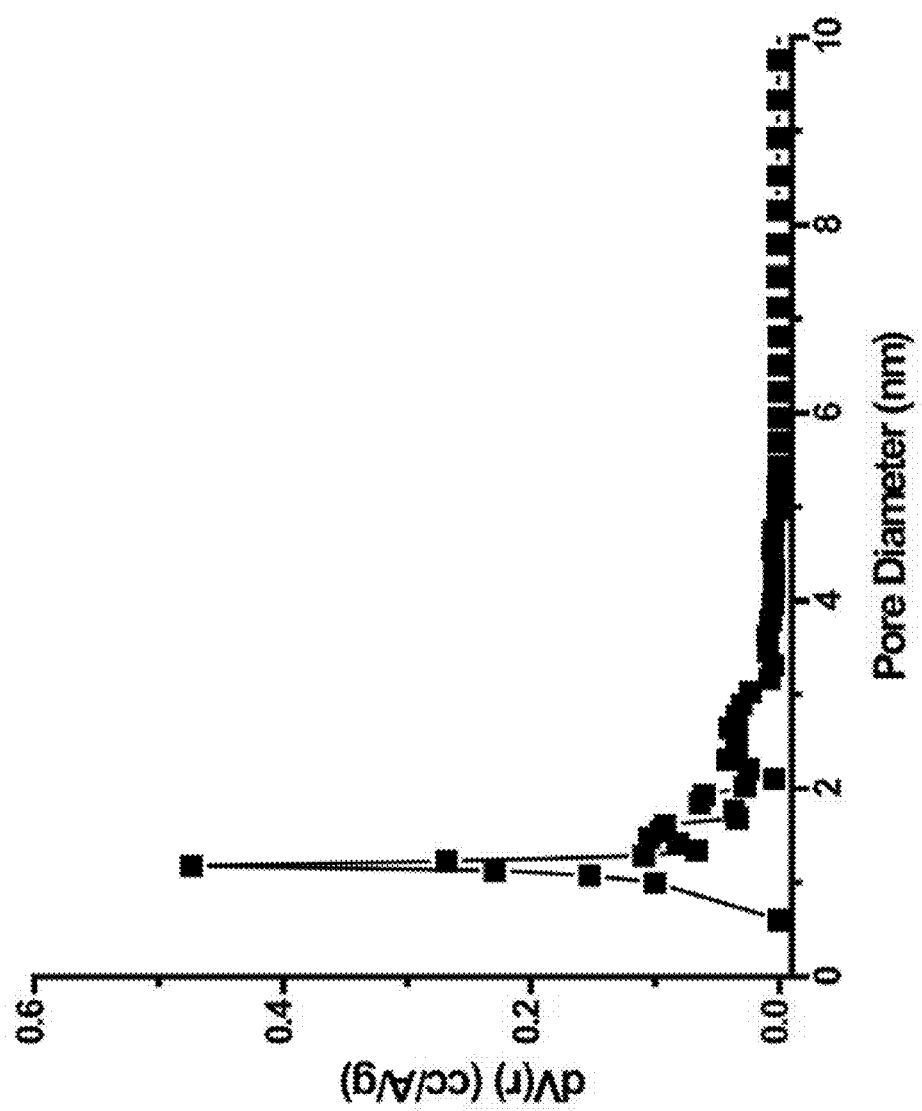
FIG. 35 depicts the density functional theory (DFT) pore size distribution of microporous aluminosilicate synthesized with Pluronic® P123 surfactant prepared in Example 3.
Figure 36:
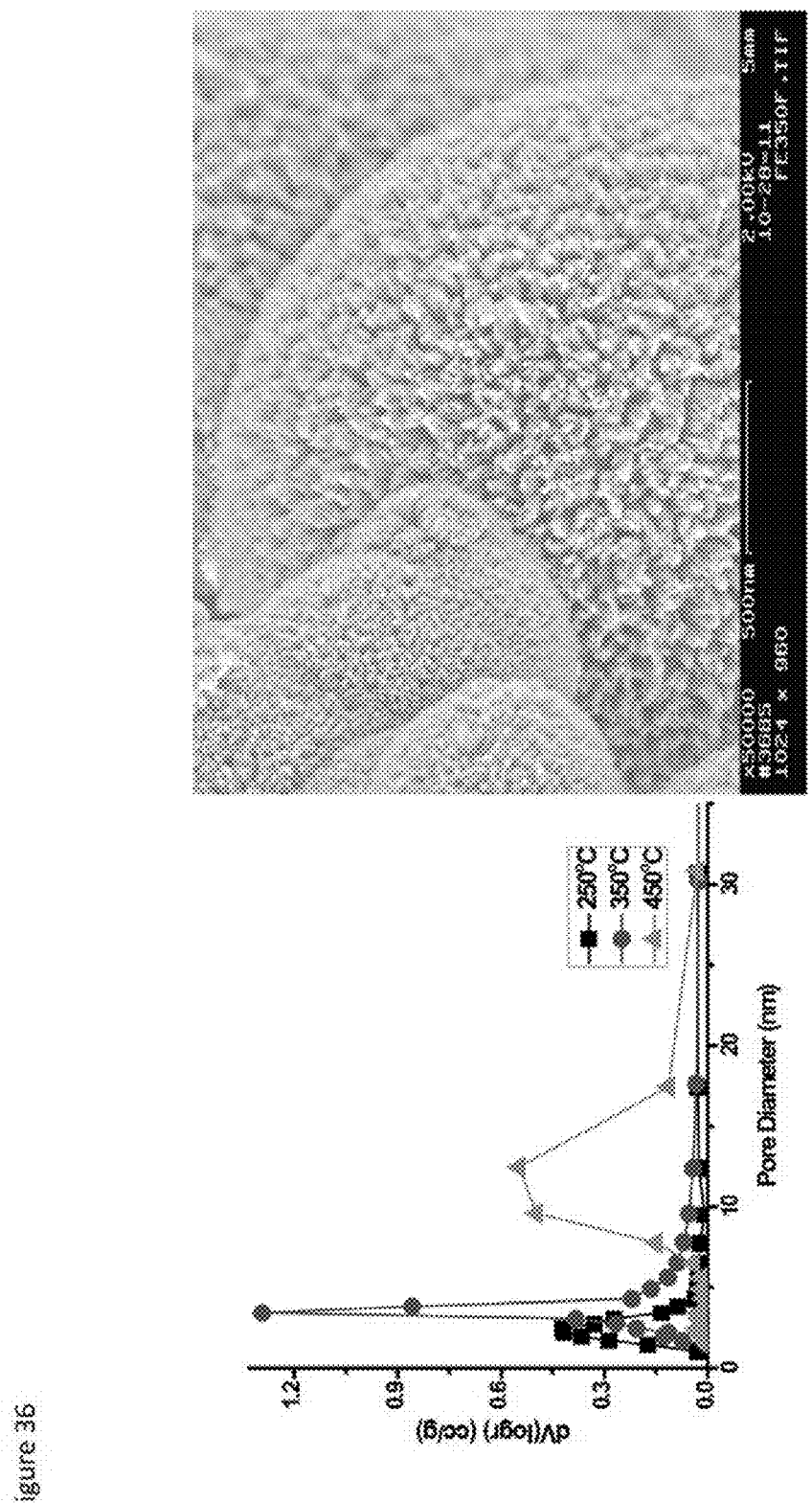
FIG. 36 depicts pore size distribution data (left) and field emission scanning electron microscopy (FESEM) micrograph (right) for mesoporous $Fe_2O_3$ prepared in Example 3.
Figure 37:
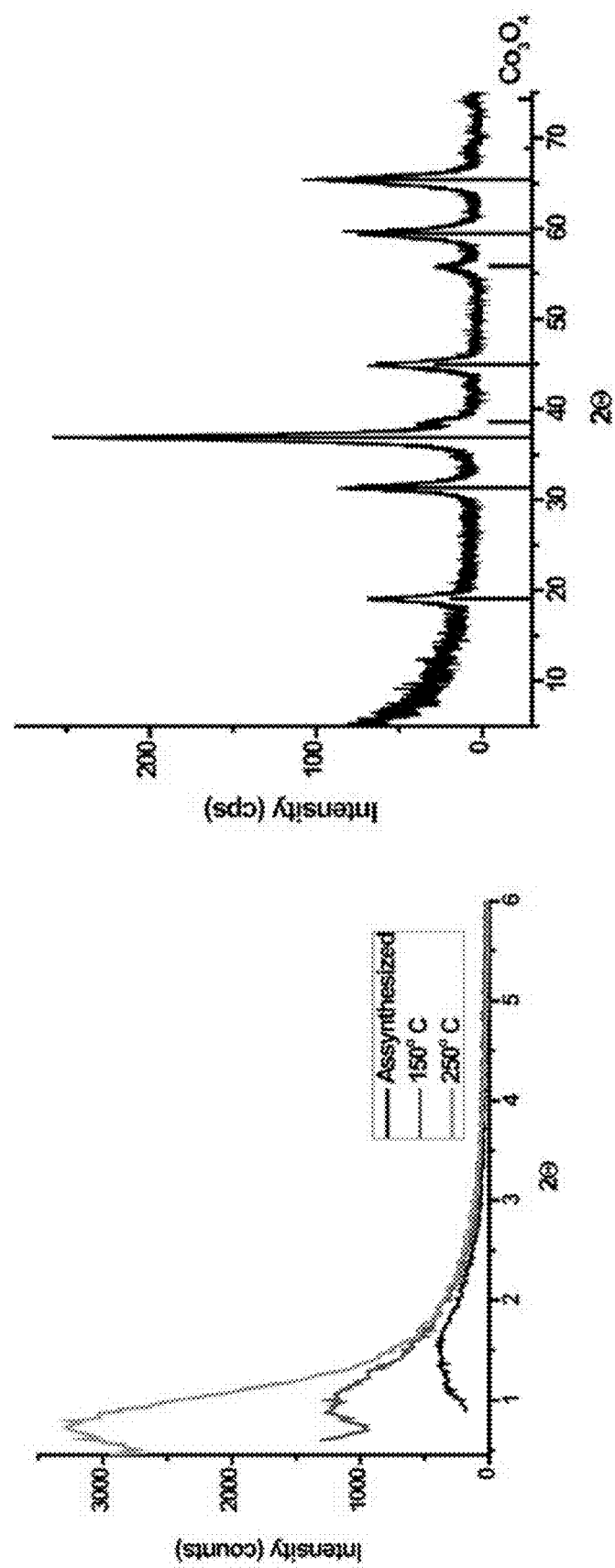
FIG. 37 depicts low angle (left) and high angle (right) X-ray diffraction (XRD) data for mesoporous $Co_3O_4$ prepared in Example 3.

Referring to FIGS. 22 and 23, a comparison of surface area (BET) of mesoporous $CeO_2$ at different temperatures is set forth in Table 6 below.

TABLE 6

| Δ (max) | SA (BET) |
|---|---|
| 150 C. ° | 97.5 m²\g |
| 250 C. ° | 152.3 m²\g |
| 350 C. ° | 173.4 m²\g |
| 450 C. ° | 149.9 m²\g |
| 550 C. ° | 127.3 m²\g |
| 600 C. ° | 71.6 m²\g |

Example 4

Synthesis of Mesoporous Transition Metal Oxides Using Surfactants and Co-Surfactants Various transition metal oxides were synthesized by the following procedure. 0.01 mol $M(NO_3)_x \cdot yH_2O$ (M=Mn, Fe, Co, Ni, Cu, Zn, Ti, Zr, Si, Ce, Gd, Sm, Al), 0.09-0.18 mol n-butanol (7-14 grams), 0.016-0.032 mol $HNO_3$ (1-2 grams), Pluronic® P123 surfactant or Pluronic® F127 surfactant and $1.7 \times 10^{-4}$ mol of co-surfactant identified in Table 7 below were mixed in a 50 milliliter beaker and homogenized by stirring at room temperature. The resulting clear solution was directly put in an oven running at 100° C.-120° C. (depending on the particular metal system) and kept at that temperature for 2-7 hours (variations of concentrations, temperature and duration of experiment depended on the particular metal system). Synthesized materials were washed with ethanol several times to remove organic components and dried in an oven running at 60° C. overnight. UCTs synthesized by co-surfactant are designated UCT-19. The co-surfactant, molecular weight (MW), surfactant:co-surfactant ratio, and amount of co-surfactant are given in Table 7. As used in Table 7, Brij 56® is polyethylene glycol hexadecyl ether or polyethylene [10] cetyl ether. Brij 58® is polyoxyethylene acyl ether.

TABLE 7

| | UCT-19 | | | |
|---|---|---|---|---|
| Sample No: | Co-Surfactant | MW (g/mol) | P123:Co-Surfactant | Co-Surfactant (g) |
| 1 | Brij56 ® | 682 | 1:1 | 0.12 |
| 2 | Brij58 ® | 1122 | 1:1 | 0.19 |
| 3 | CTABr(cetyltrimethyl-ammonium bromide) | 368.5 | 1:1 | 0.06 |

TABLE 7-continued

UCT-19

| Sample No: | Co-Surfactant | MW (g/mol) | P123:Co-Surfactant | Co-Surfactant (g) |
|---|---|---|---|---|
| 4 | AOT (Dioctyl sodium sulfosuccinate) | 444.6 | 1:1 | 0.08 |
| 5 | SDS (sodium dodecyl sulfate) | 288.4 | 1:1 | 0.05 |

Dry powders were heated in an oven at the following temperatures and time intervals; 150° C. (12 hours), 250° C. (4 hours), 350° C. (3 hours), 450° C. (2 hours) and finally at 550° C. (1 hour) (all heating steps applied in this order).

Figure 43:
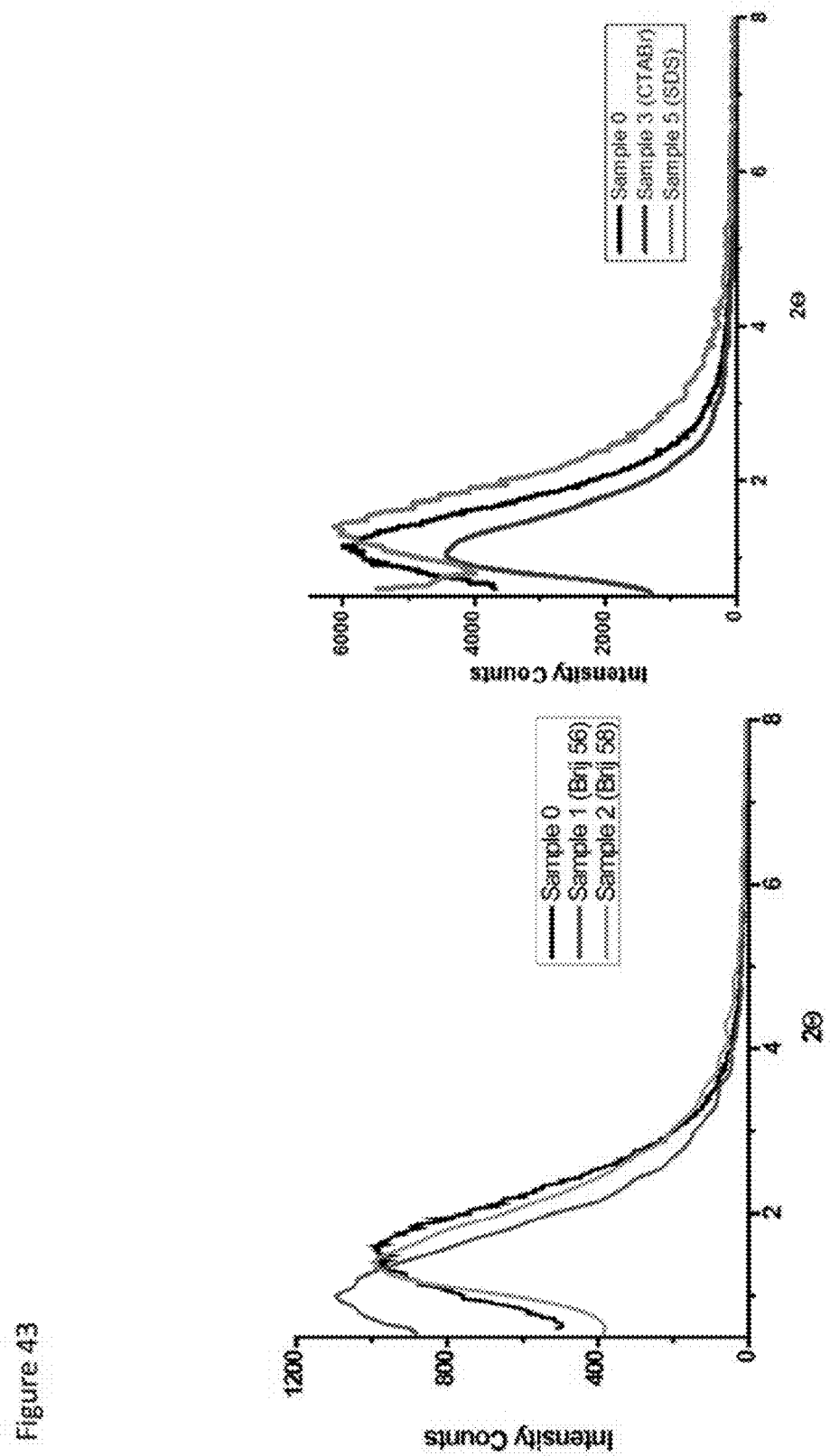
FIG. 43 depicts the low angle powder X-ray diffraction (PXRD) pattern of mesoporous $Mn_2O_3$ materials (UCT-19) synthesized with Pluronic® P123 surfactant:co-surfactant prepared in Example 4.

FIG. 43 shows the low angle PXRD patterns of UCTs synthesized with Pluronic® P123 surfactant-co-surfactant mixtures. Pluronic® P123:co-surfactant mole ratio is 1:1 in all systems. Regardless of the type of the co-surfactant (anionic, cationic, bis-anionic or nonionic), low angle PXRD patterns have a diffraction line which is lower than the Pluronic® P123 surfactant only system (Sample 0 in FIG. 43). In addition, the low angle diffraction peaks obtained by bi-surfactant system are sharper indicating either a more ordered mesostructure or more uniform nano-particle size distribution. All materials have amorphous nature up to 400° C. (not shown).

Figure 44:
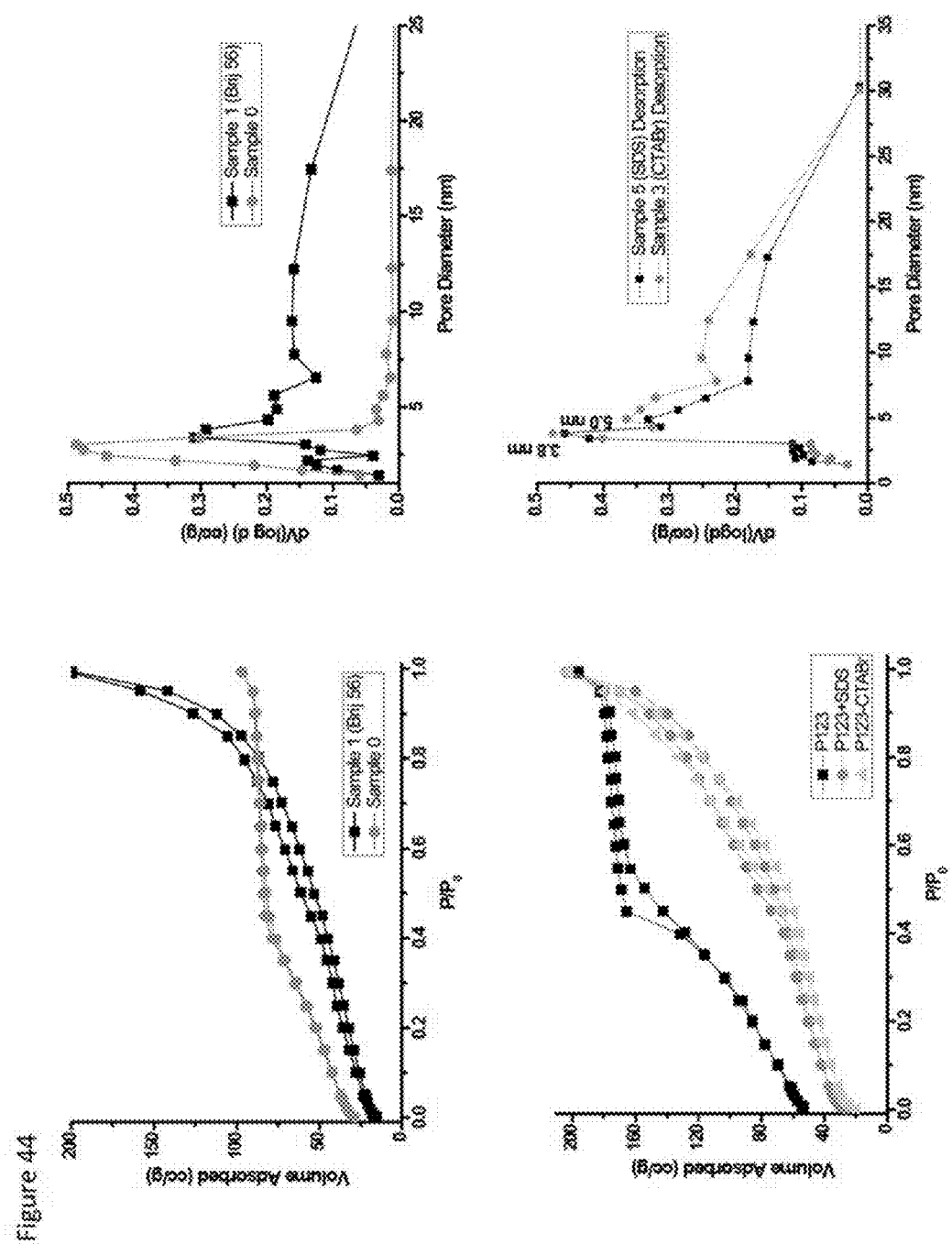
FIG. 44 depicts $N_2$ sorption isotherms and corresponding BJH desorption pore size distributions of mesoporous $Mn_2O_3$ materials (UCT-19) synthesized with Pluronic® P123 surfactant:co-surfactant prepared in Example 4.

$N_2$ sorption isotherms and BJH desorption pore size distributions of mesoporous $Mn_2O_3$ materials (UCT-19) synthesized with Pluronic® P123 surfactant:co-surfactant are given in FIG. 44. Use of co-surfactant transforms the adsorption isotherm from Type IV to Type II and Type I hysteresis loop to Type III. The transformations suggest a change in the nature of micelle assisted nano particles. Type II adsorption isotherms and Type III desorption isotherms for Pluronic® P123 surfactant:co-surfactant systems suggest a slit type pore system, in which two dimensions r1 and r2 are significantly different than each other (see FIG. 44). The change of the pore type from cylindrical to slit like causes a decrease in the surface area, however the pore volumes obtained are almost doubled for the Pluronic® P123 surfactant:co-surfactant systems (see Table 8). Table 8 shows the physicochemical parameters for a Pluronic® P123 surfactant only system and Pluronic® P123 surfactant:co-surfactant systems.

TABLE 8

UCT-19

| Sample No: | Co-Surfactant | BET Surface Area (m²/g) | Pore Volume (cc/g) | BJH Pore Diameter (nm) (Adsorption) | BJH Pore Diameter (nm) (Desorption) |
|---|---|---|---|---|---|
| 0 | P123 only | 200 | 0.16 | 2.9 | 2.8 |
| 1 | Brij56 | 123 | 0.32 | 5.7 | 3.8 |
| 2 | Brij58 | — | — | — | — |
| 3 | CTABr | 154 | 0.33 | 6.0 | 3.7 |
| 4 | AOT | — | — | — | — |
| 5 | SDS | 178 | 0.32 | 5.5 | 3.7 |

Figure 45:
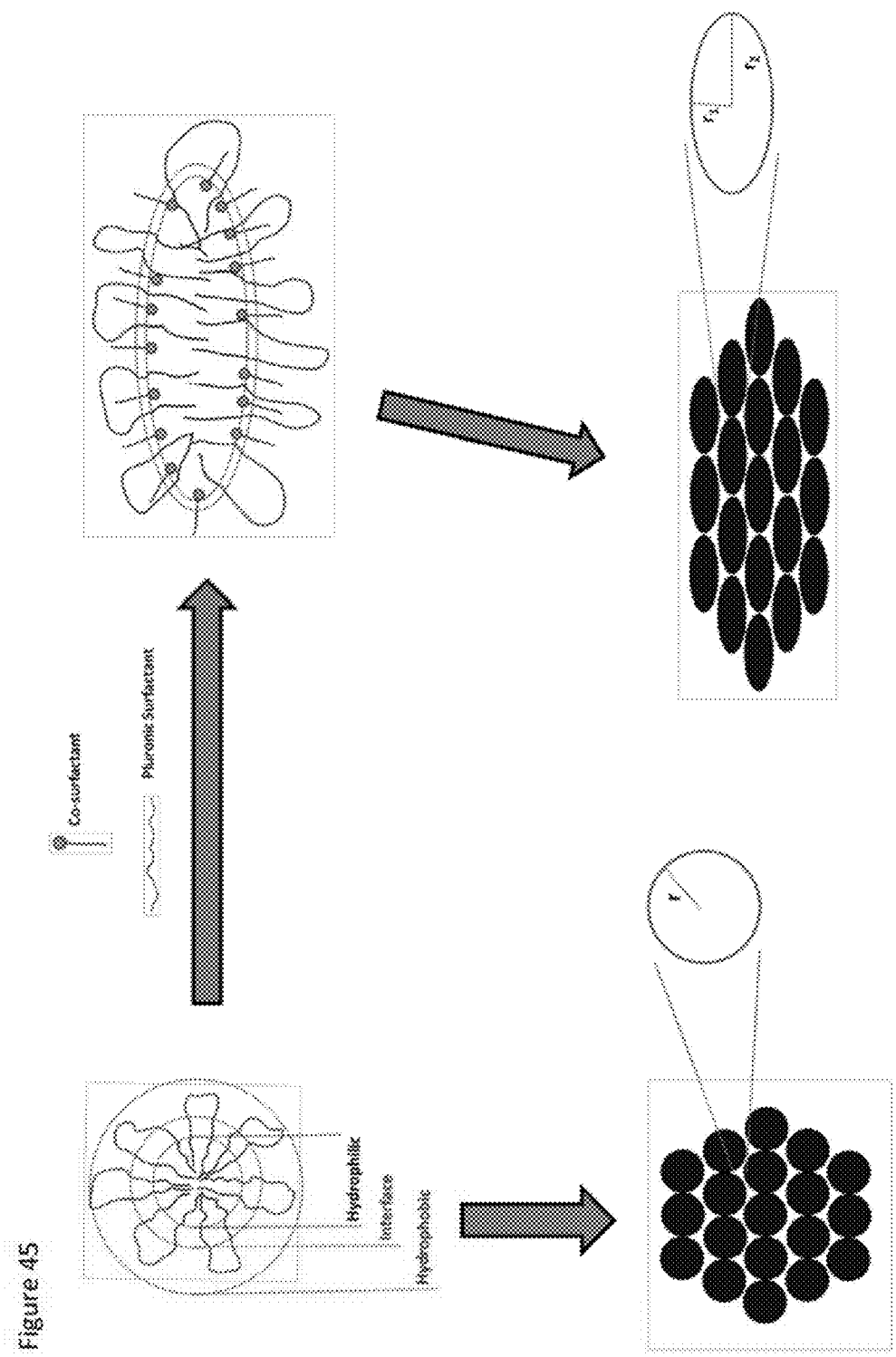
FIG. 45 is a schematic description of the effect of co-surfactant on the micelle formation and pore structure of the mesoporous material.

The use of a co-surfactant in the synthesis of mesoporous $Mn_2O_3$ materials (UCT-19) synthesized with Pluronic® P123 surfactant:co-surfactant significantly affects the inverted micelles obtained as well as the physicochemical properties obtained for the resulting mesoporous materials (see FIG. 45). Addition of a co-surfactant which is smaller than the major surfactant Pluronic® P123 mostly affects the hydrophilic interactions inside the micelle. The increase in the hydrophilic interaction converts the spherical micelles to elongated micelles. The increase in the hydrophilic interaction in the core region is not the only contribution of the co-surfactants. The smaller co-surfactants also satisfy the geometrical requirement and also limit the interfacial volume by increasing the hydrophilic-hydrophobic gradient between the core and outer corona region. Limiting the interfacial volume and swelling the core region results in bigger and monodisperse nano-crystals which can be realized from the position and relative sharpness of the low angle diffraction patterns (see FIG. 43). FIG. 45 is a schematic description of the effect of co-surfactant on the micelle formation and pore structure of the mesoporous material.

Figure 46:
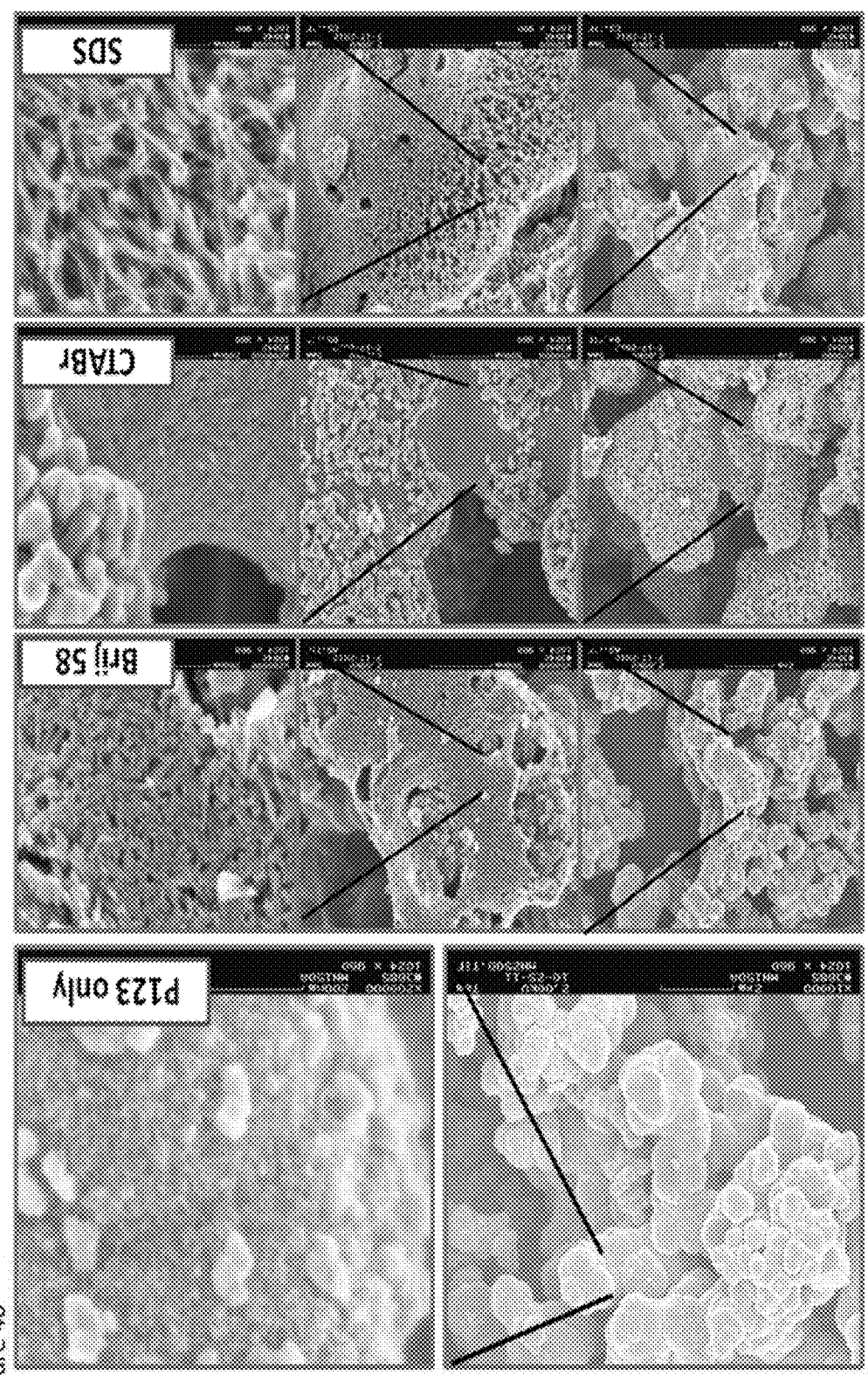
FIG. 46 shows scanning electron microscope (SEM) images of Pluronic® P123 surfactant only system (UCT-1) and Pluronic® P123 surfactant:co-surfactant systems (UCT-19) prepared in Example 4.

Ionic surfactants have been found to be more effective for increasing the hydrophilic interaction since ionic character of the surfactants sucks more water into the core region. With the method of this disclosure, one can easily control the physicochemical parameters and the nano-crystal size and shape by using co-surfactants. Moreover, ionic surfactants also increase the obtained yield for the metal systems such as Fe, Mn, and Co. The increased hydrophilic interaction can be realized from surface morphologies obtained from the high magnification SEM images (see FIG. 46). A Pluronic® P123 surfactant only system shows mostly assembled rounded particles, however addition of non-ionic surfactant Brij 58® yields more elongated aggregates on the micron sized spherical particle surfaces. Use of SDS makes the most observable change on the surface of mesoporous manganese oxides. For SDS samples surfaces are mostly formed by nano-fibers, yielding bigger pore openings. The fibers observed on the surface appear to have identical thickness. FIG. 46 are scanning electron microscope (SEM) images of Pluronic® P123 surfactant only system (UCT-1) and Pluronic® P123 surfactant:co-surfactant systems (UCT-19).

Example 5

Synthesis of Mesoporous Transition Metal Oxides Using Solvents or Solvent Mixtures Various transition metal oxides were synthesized by the following procedure. 0.01 mol $M(NO_3)_x \cdot yH_2O$ (M=Mn, Fe, Co, Ni, Cu, Zn, Ti, Zr, Si, Ce, Gd, Sm, Al), 14 grams of alcohol identified in Table 9 below, $1.3 \times 10^{-2}$-$6.7 \times 10^{-2}$ mol n-butanol (1-5 grams), 0.016-0.032 mol $HNO_3$ (1-2 grams), Pluronic® P123 surfactant or Pluronic® F127 surfactant and $1.7 \times 10^{-4}$ mol of co-surfactant were mixed in a 50 milliliter beaker and homogenized by stirring at room temperature. The resulting clear solution was directly put in an oven running at 100° C.-120° C. (depending on the particular metal system) and kept at that temperature for 2-7 hours (variations of concentrations, temperature and duration of experiment depended on the particular metal system). Synthesized materials were washed with ethanol several times to remove organic components and dried in an oven running at 60° C. overnight. UCTs synthesized by solvent and co-surfactant are designated UCT-20, UCT-21 and UCT-22. The solvent, co-surfactant, and amount of solvent and co-surfactant are given in Table 9.

TABLE 9

| Nomenclature | Sample No: | Solvent | Solvent Amount (g) | Butanol (g) (Co-Surfactant) |
|---|---|---|---|---|
| UCT-20 | 6 | Pentanol | 14 | 1 |
|  | 7 | Pentanol | 14 | 4 |
| UCT-21 | 8 | Hexanol | 14 | 3 |
|  | 9 | Hexanol | 14 | 5 |
| UCT-22 | 10 | Benzyl Alcohol | 14 | 4 |

Dry powders were heated in an oven at the following temperatures and time intervals; 150° C. (12 hours), 250° C. (4 hours), 350° C. (3 hours), 450° C. (2 hours) and finally at 550° C. (1 hour) (all heating steps applied in this order).

Using higher order alcohols than ethanol yields formation of inverse micelles for the Pluronic® type surfactants. Considering that the inverse micelle formation is essential for mesoporous metal oxide materials of this disclosure, one can use higher order alcohols or alcohol mixtures as solvents for the synthesis of the mesoporous metal oxide materials. In theory, one can chose any organic solvent or solvent mixture or modified solvents yielding Pluronic® inverse micelles to synthesize the mesoporous metal oxide materials of this disclosure. The additives can be both inorganic (such as soluble or micelle solublized inorganic salts) or organic (such as benzene and benzene derivatives) and can also be included in solvent preparation.

Figure 51:
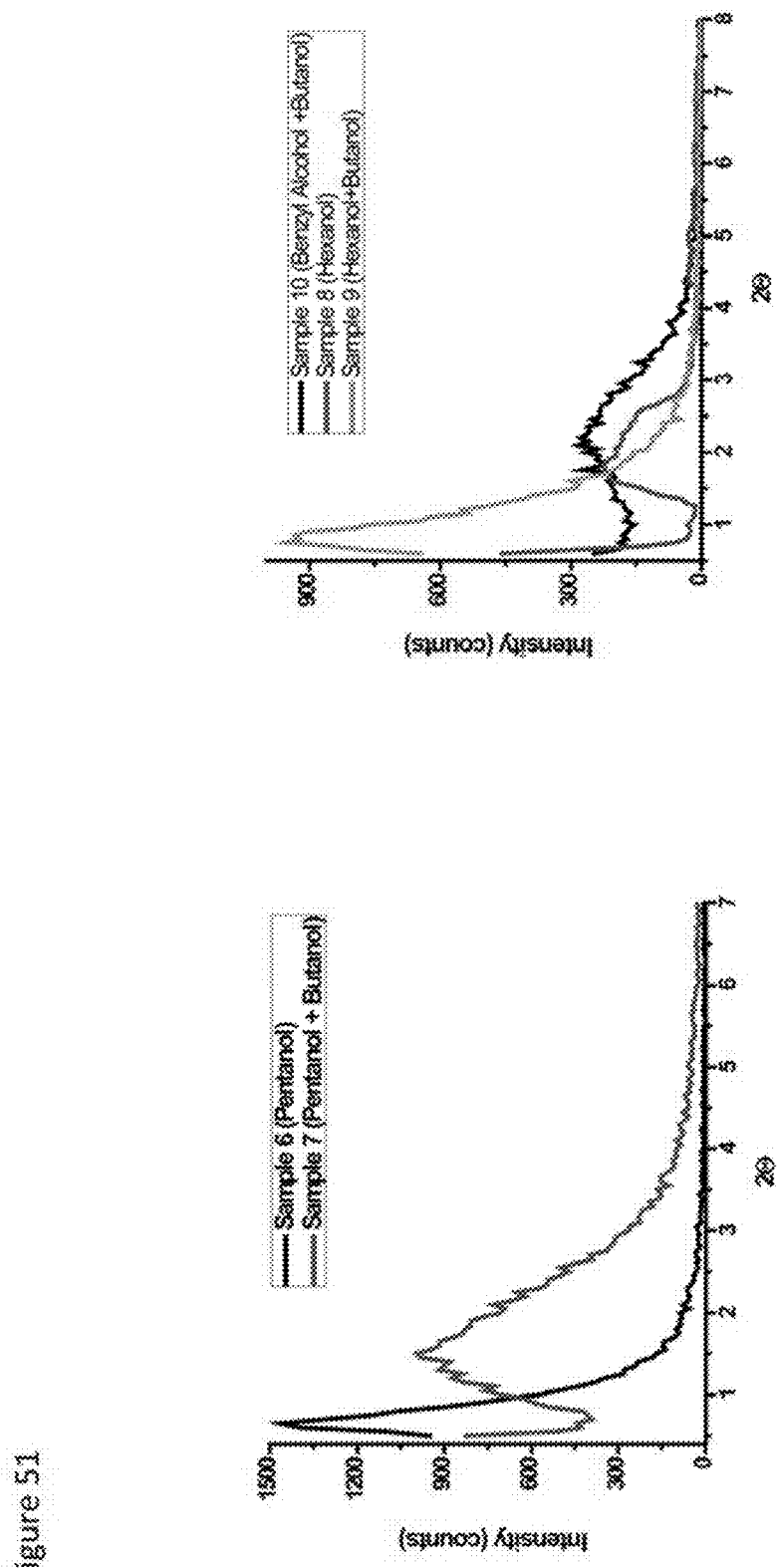
FIG. 51 depicts the low angle powder X-ray diffraction (PXRD) pattern of mesoporous $Mn_2O_3$ materials (UCT-20, UCT-21 and UCT-22) synthesized with Pluronic® P123 surfactant:co-surfactant and different solvent and solvent mixtures prepared in Example 5. The final heating temperature was 150° C.

FIG. 51 shows the low angle PXRD patterns of mesoporous manganese oxide samples synthesized in Example 5 with different alcohol and alcohol mixtures and heated for 12 hours at 150° C. In Example 5, the butanol amount is also varied and used as a co-surfactant. The use of butanol as a co-surfactant helps all Pluronic® surfactants to be in uniform inverse micellar form by increasing its solubility. It is also possible to replace butanol by either charged or neutral co-surfactants in various solvent systems to increase Pluronic® surfactant solubility. See Example 4 for more details about the role of co-surfactant. Replacing butanol with pentanol shifts the low angle diffraction peak to a lower angle and the line shape gets sharper indicating that pentanol can also occupy the interface and swells the relatively hydrophilic core part. Addition of more butanol to the system reverses the effect of pentanol since butanol is thermodynamically more stable in the interface (FIG. 51). However, use of a higher order alcohol hexanol results in a relatively poorly ordered structure, because hexanol cannot mimic the dual role of butanol in the Pluronic® system of Example 5. For a different Pluronic® system, hexanol can play a dual role and one can obtain well ordered mesostructures.

The necessity of the co-surfactant role can be satisfied by adding more butanol into the hexanol system. Butanol-hexanol mixtures can be considered as a pentanolic solution meaning that in a certain ratio mixing butanol and hexanol the solution behaves like pentanol. Therefore, Sample 9 (hexanol-butanol) in Table 9 has a very similar diffraction pattern with Sample 6 in Table 9 (see FIG. 51). More different types of solvents can also be used in the synthesis of UCTs in the presence of a co-surfactant such as butanol. Therefore, an aromatic alcohol (benzyl alcohol) was used as solvent and butanol was also added to the same system as a co-surfactant (Sample 10 in FIG. 51). A strong interaction exists between aromatic rings with the hydrophobic part of the polypropylene oxide (PPO) group of the Pluronic® surfactant. FIG. 51 depicts the low angle powder X-ray diffraction (PXRD) pattern of mesoporous $Mn_2O_3$ materials (UCT-20, UCT-21 and UCT-22) synthesized with Pluronic® P123 surfactant:co-surfactant and different solvent and solvent mixtures prepared in Example 5. The final heating temperature was 150° C.

Figure 52:
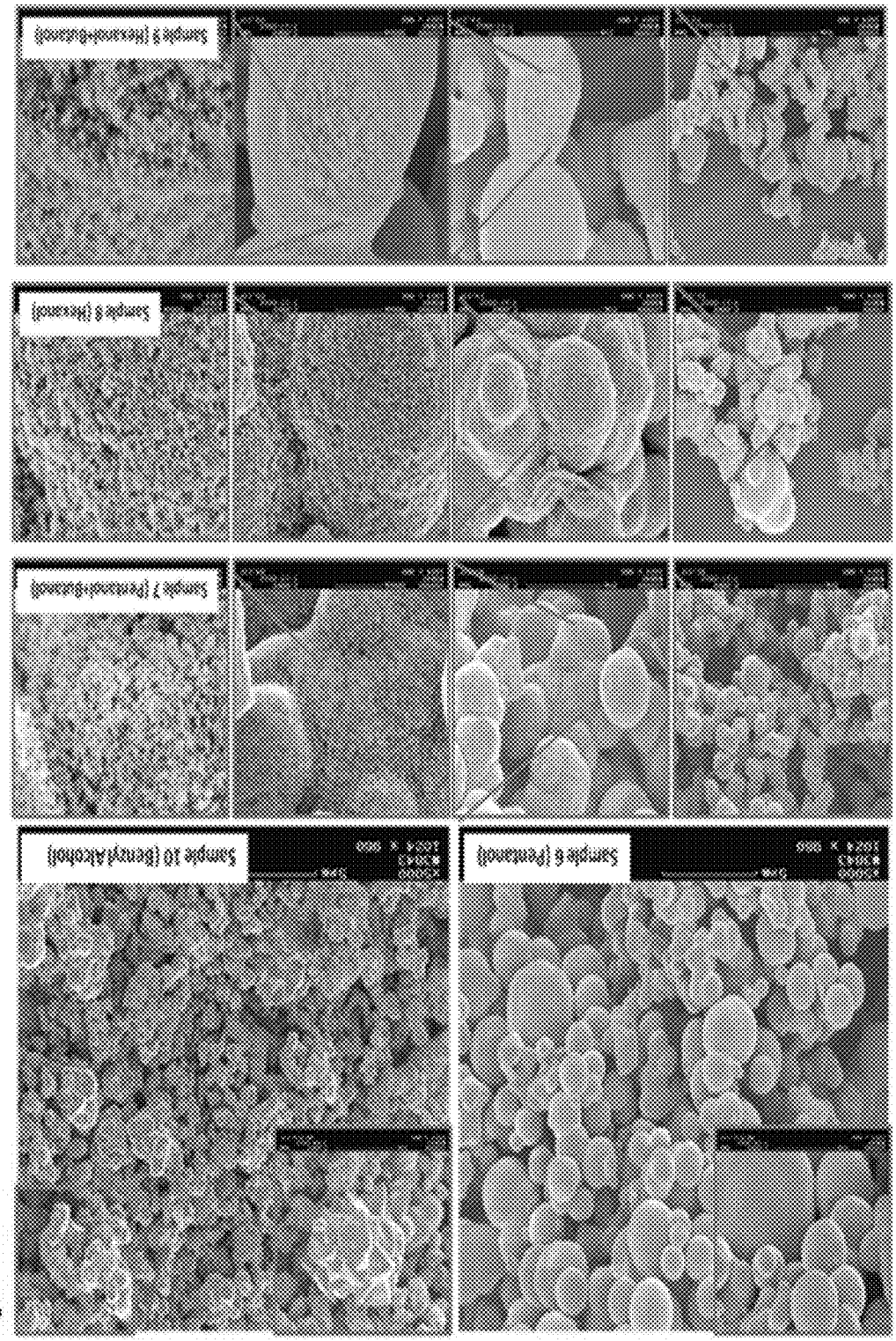
FIG. 52 depicts scanning electron microscope (SEM) images of mesoporous $Mn_2O_3$ samples as prepared using different solvent systems in Example 5.

The effect of using different solvents and solvent mixtures can also be realized from the morphology of the synthesized micron sized particles and surface morphology of these particles. Morphological effects of different solvent systems were investigated by scanning electron microscopy (see FIG. 52). Use of pentanol as a solvent (Samples 6 and 7 of this Example 5) results in formation of perfectly spherical particles with a smooth surface morphology. Higher magnification images of these samples suggest that these micron sized perfectly spherical samples are formed by regular packing of monodispersed nano particles. On the other hand, use of hexanol as a solvent (Samples 8 and 9 of this Example 5) results in aggregated or sintered spherical particles despite high magnification images of these samples showing similarities to the pentanol system. Different from the small carbon chain alcohols, the aromatic alcohol (benzyl alcohol) gives significantly different particle morphology. The micron size particles obtained from the benzyl alcohol system have sharp corners (Sample 10 of this Example 5). FIG. 52 depicts scanning electron microscope (SEM) images of mesoporous $Mn_2O_3$ samples as prepared using different solvent systems in Example 5.

Example 6

Synthesis of Mesoporous Transition Metal Oxides Using Mixed Metal Oxides

Various transition metal oxides were synthesized by the following procedure. Multiple metal nitrate salts $M(NO_3)_x \cdot yH_2O$ (M=Mn, Fe, Co, Ni, Cu, Zn, Ti, Zr, Si, Ce, Gd, Sm, Al) mixed in the metal ratios given in Table 10 below (0.01-100 mol %) and keeping the total amount of metal constant (0.01 mol), 14 grams of 1-butanol, $1.3*10^{-2}$-$6.7*10^{-2}$ mol n-butanol (1-5 grams), 0.016-0.032 mol $HNO_3$ (1-2 grams), Pluronic® P123 surfactant or Pluronic® F127 surfactant and $1.7*10^{-4}$ mol of co-surfactant were mixed in a 50 milliliter beaker and homogenized by stirring at room temperature. The resulting clear solution was directly put in an oven running at 100° C.-120° C. (depending on the particular metal system) and kept at that temperature for 2-7 hours (variations of concentrations, temperature and duration of experiment depended on the particular metal system). Synthesized materials were washed with ethanol several times to remove organic components and dried in an oven running at 60° C. overnight. UCTs synthesized by solvent and co-surfactant are designated UCT-23, UCT-24 and UCT-25. The metal mixtures, metal ratios and co-surfactant are given in Table 10. SDS is sodium dodecyl sulfate.

TABLE 10

| Nomenclature | Sample No: | Metal Mixtures | Metal Ratios | Co-Surfactant |
|---|---|---|---|---|
| UCT-23 | 11 | Mn:Fe | 80:20 | SDS |
|  | 12 | Mn:Fe | 50:50 | SDS |
| UCT-24 | 13 | Mn:Fe:Co | 33:33:33 | SDS |
| UCT-25 | 14 | Mn:Fe:Co:Ti | 25:25:25:25 | SDS |

Dry powders were heated in an oven at the following temperatures and time intervals; 150° C. (12 hours), 250° C. (4 hours), 350° C. (3 hours), 450° C. (2 hours) and finally at 550° C. (1 hour) (all heating steps applied in this order).

Figure 53:
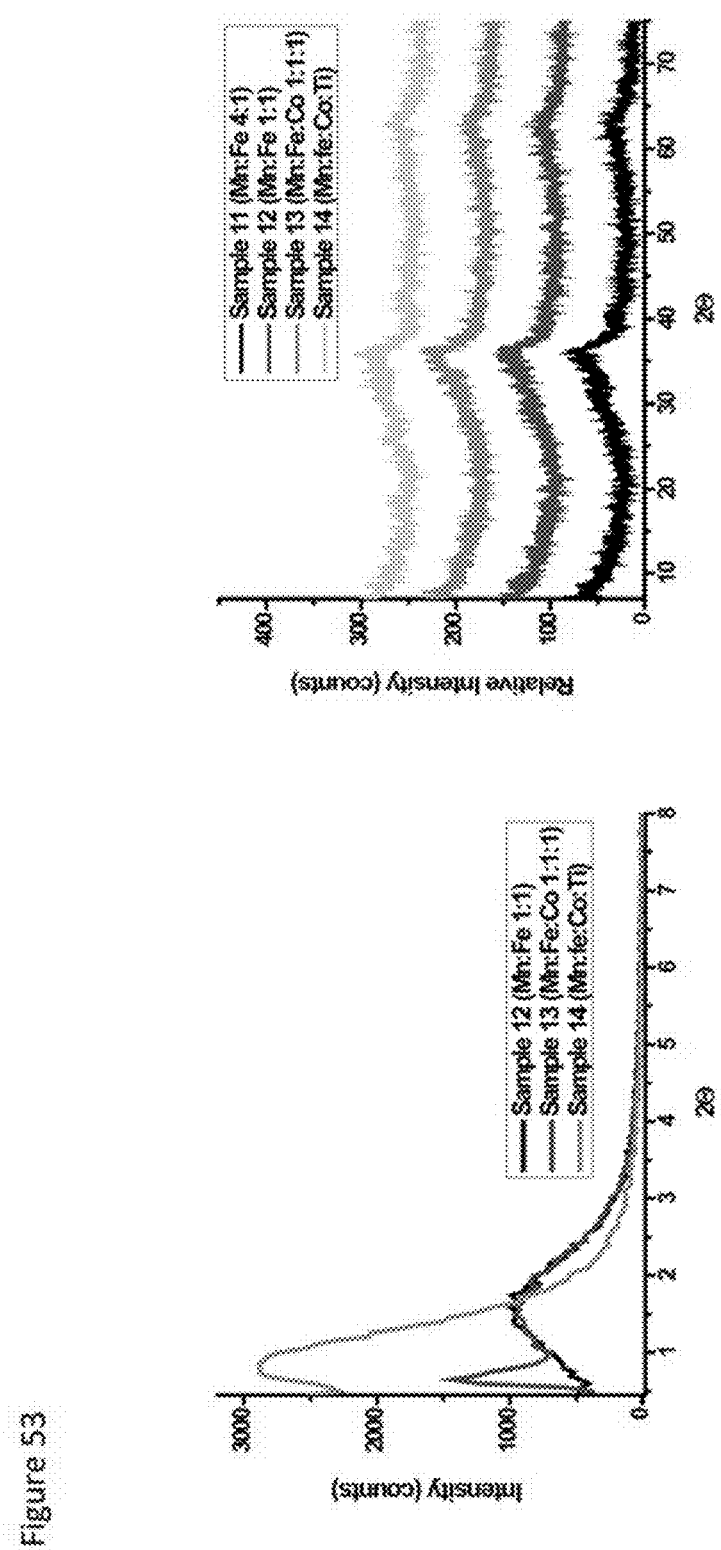
FIG. 53(a) depicts the low angle powder X-ray diffraction (PXRD) pattern of mesoporous mixed metal materials (UCT-23, UCT-24 and UCT-25) prepared in Example 6. The final heating temperature was 250° C.
FIG. 53(b) depicts the high angle powder X-ray diffraction (PXRD) pattern of mesoporous mixed metal materials (UCT-23, UCT-24 and UCT-25) prepared in Example 6.

FIG. 53(a) shows the low angle PXRD diffractions of mixed metal mesoporous materials of this disclosure. All materials show one low angle diffraction except Sample 13 (Mn:Fe:Co). Sample 13 shows two low angle diffraction lines indicating either a mixed phase material or a mesostructure different than hexagonal packing. The high angle PXRD diffraction patterns of mixed metal systems do not show any distinct diffraction lines suggesting an amorphous nature of the mixed metal systems which can be accepted as further evidence for homogeneous dispersion of metals (see FIG. 53(b)). Further heating of these samples can yield either a phase separation by the ion migration or a crystalline mixed metal oxide structure depending on the mixing ratio and the heat treatment temperature. In either chase, desired materials for specific applications can be synthesized. Low temperature catalytic reactions with amorphous materials exist. Unlike traditional mesoporous systems, the mesoporous metal oxide materials of this disclosure can be prepared by mixing any number of metals in any ratio. In traditional methods, due to the different rate of hydrolysis-condensation rates of the metals used and different metal-surfactant interaction, the mixed metal systems are limited to low % doping of a metal in a host system. Even low amounts have been achieved in various systems. Generally these materials have lower meso-order and porosity than the host material.

The metals used in the synthesis of the mesoporous mixed metal materials of this disclosure have different optimum reaction temperatures and times when they are synthesized as single metal systems. Therefore, in the synthesis of mixed metal systems SDS is used as a co-surfactant which helps the metals to form oxides at the same time. FIG. 53(a) depicts the low angle powder X-ray diffraction (PXRD) pattern of mesoporous mixed metal materials (UCT-23, UCT-24 and UCT-25) prepared in this Example 6. The final heating temperature was 250° C. FIG. 53(b) depicts the high angle powder X-ray diffraction (PXRD) pattern of mesoporous mixed metal materials (UCT-23, UCT-24 and UCT-25) prepared in this Example 6.

Figure 54:
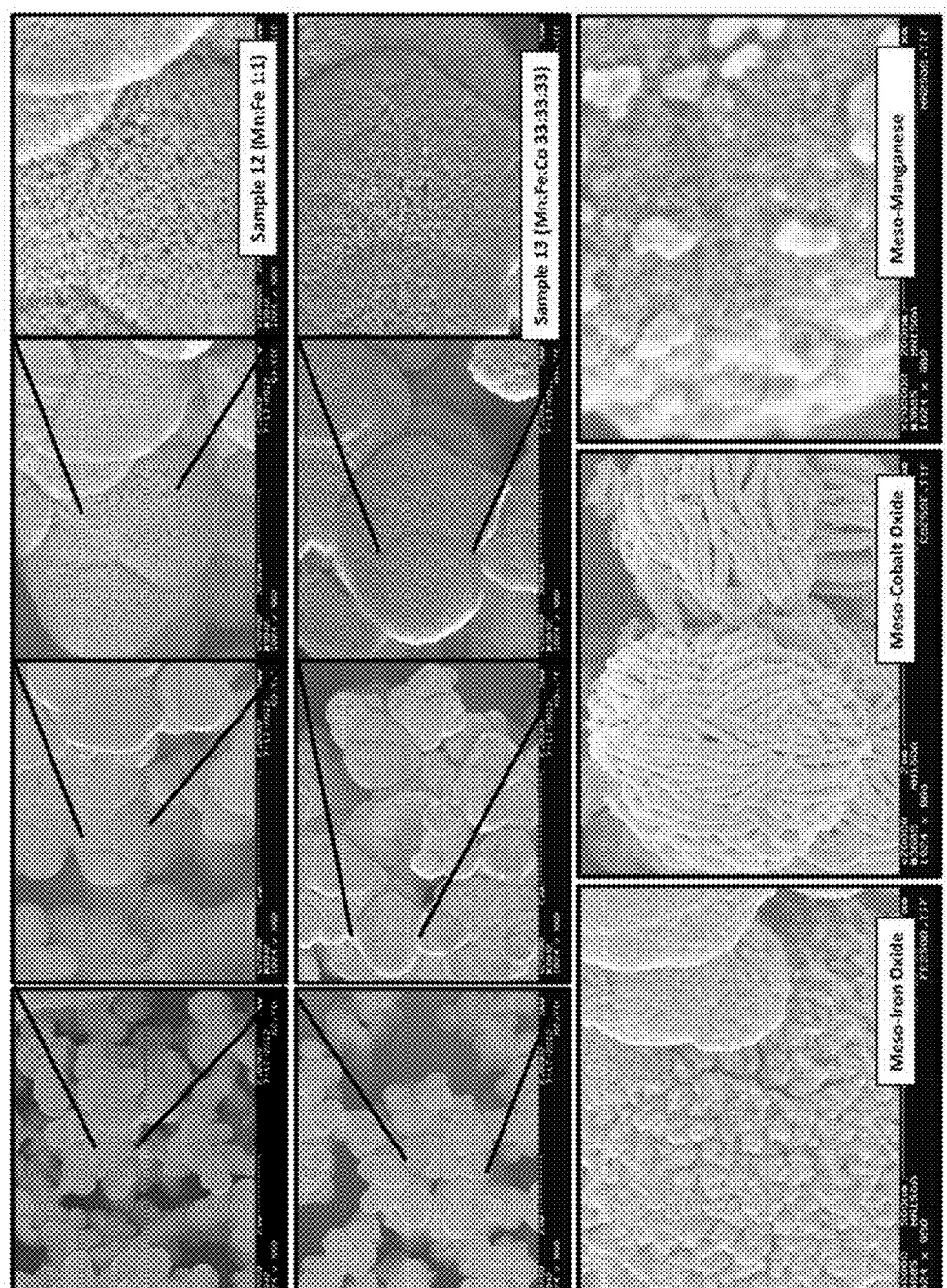
FIG. 54 shows SEM images of mesoporous metal oxides having mixed metal systems of this disclosure with a final heating temperature of 250° C., as prepared in Example 6.

The scanning electron microscope (SEM) images of mixed metal mesoporous materials prepared in this Example 6 have totally different surface morphologies than the surface morphologies of the individual single metal mesoporous oxide materials. Fe—Mn (Sample 12) and Mn—Fe—Co (Sample 13) have needle like surface morphology which is significantly different than the mesoporous surface morphology of Mn, Co, and Fe oxides (see FIG. 54). FIG. 54 shows SEM images of mesoporous metal oxides having mixed metal systems of this disclosure. The final heating was 250° C.

Example 7

Synthesis of Mesoporous Transition Metal Oxides Using Acid Mixtures

Various transition metal oxides were synthesized by following procedure. 0.01 mol $M(NO_3)_x \cdot yH_2O$ (M=Mn, Fe, Co, Ni, Cu, Zn, Ti, Zr, Si, Ce, Gd, Sm, Al), 14 grams of 1-butanol, $1.3*10^{-2}$-$6.7*10^{-2}$ mol n-butanol (1-5 grams), 0.016-0.032 mol $HNO_3$ and acid mixtures shown in Table 11 below (1 mil-3 mils), Pluronic® P123 surfactant or Pluronic® F127 surfactant and $1.7*10^{-4}$ mol of SDS co-surfactant were mixed in a 50 milliliter beaker and homogenized by stirring at room temperature. The resulting clear solution was directly put in an oven running at 100° C.-120° C. (depending on the particular metal system) and kept at that temperature for 2-7 hours (variations of concentrations, temperature and duration of experiment depended on the particular metal system). Synthesized materials were washed with ethanol several times to remove organic components and dried in an oven running at 60° C. overnight. UCTs synthesized by acid mixtures are designated UCT-26. The acid source, acid source ratio and metal system are given in Table 11.

TABLE 11

| Nomenclature | Sample No: | Acid-Source | Acid Source Ratio (mL) | Metal System |
| --- | --- | --- | --- | --- |
| UCT-26 | 15 | $NO_3$ | 1 | Manganese |
| | 16 | $NO_3$:HCl | 0.5:1.5 (Aqua Regia) | Manganese |
| | 17 | $NO_3$:HCl | 1:1 | Manganese |
| | 18 | $NO_3$:HCl | 1.5:0.5 | Manganese |

Dry powders were heated in an oven at the following temperatures and time intervals; 150° C. (12 hours), 250° C. (4 hours), 350° C. (3 hours), 450° C. (2 hours) and finally at 550° C. (1 hour) (all heating steps applied in this order).

Figure 55:
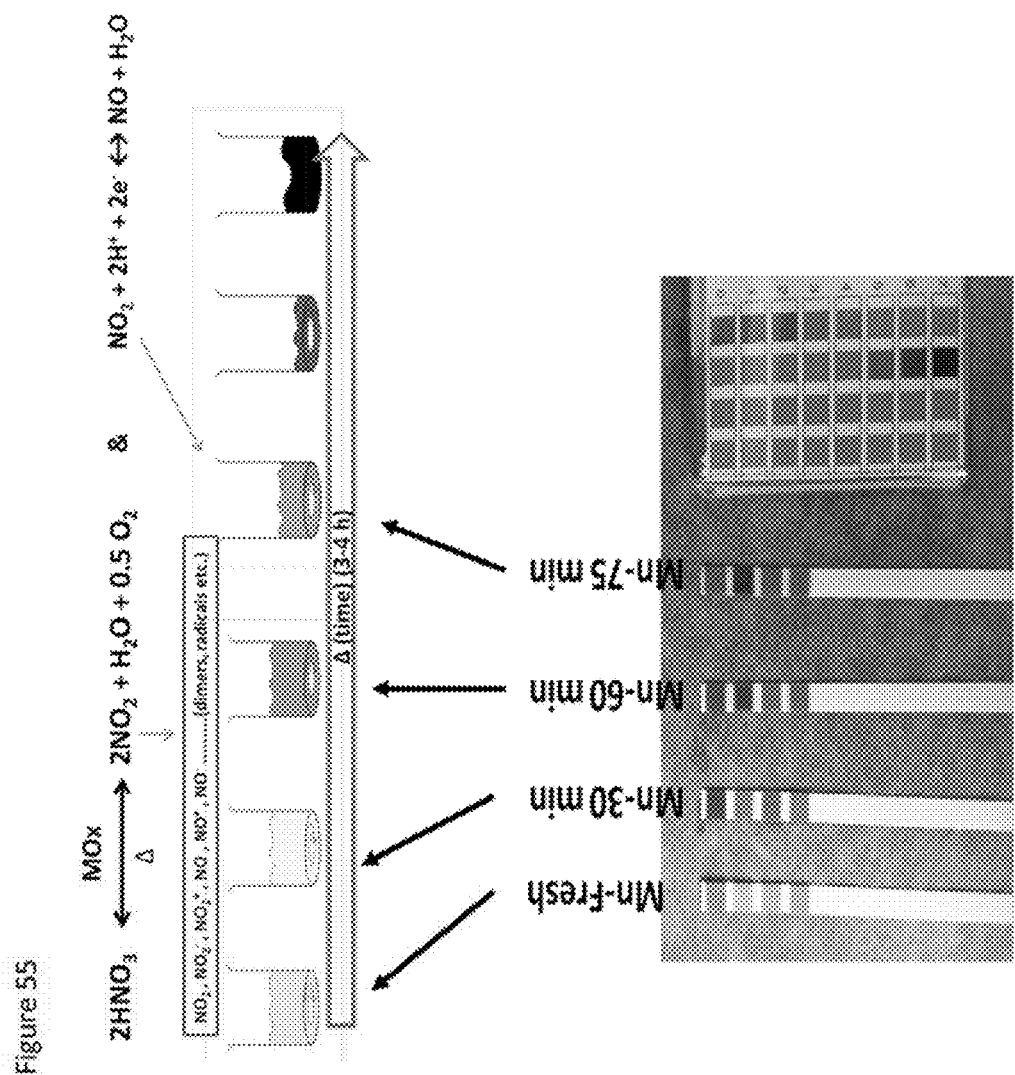
FIG. 55 shows nitrate decomposition and $H^+$ consumption reactions along with the color change and pH change diagrams for the reaction sequences of Example 7.

Nitrate ion is another important and essential component of the method for the synthesis of mesoporous metal oxide materials of this disclosure. Nitrate has multiple roles in the synthesis. The first role is the hydrotropic nature of this ion. Hydrotropic nitrate ions increase the surfactant solubility by hydrating the core of the inverted Pluronic® surfactant so the metal precursors use this water rich environment in the core either satisfying its water coordination or enhancing solvation of the oxo-metal clusters. The use of other metal sources with different counter anions rather than nitrate decreases the surfactant solubility and destroys the micelles. However, the use of more soluble smaller surfactants may allow one to use other metal salts. The second role of nitrate is to adjust the pH of the reaction media. FIG. 55 illustrates the reaction sequences and visual observations during the reaction. Decomposition of nitrate by heat yields the formation of NOxs which can be realized easily from the deep yellow color. Further heating causes the further decomposition of NOx by consuming the $H^+$ in the environment. FIG. 55 shows nitrate decomposition and $H^+$ consumption reactions along with the color change and pH change diagrams for the reaction sequences of Example 7.

Figure 56:
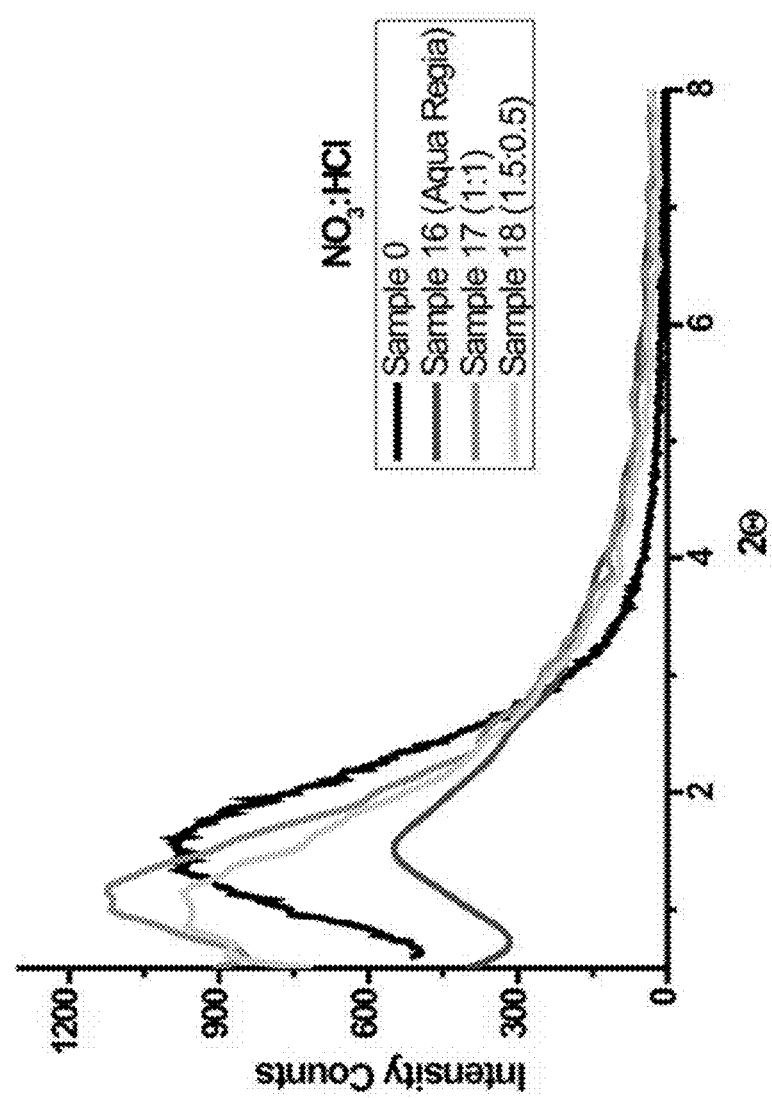
FIG. 56 shows the low angle powder X-ray diffraction (PXRD) patterns of mesoporous metal oxide materials of this disclosure (UCT-26) synthesized with different $HNO_3$: HCl volume ratios prepared in Example 7.
Figure 57:
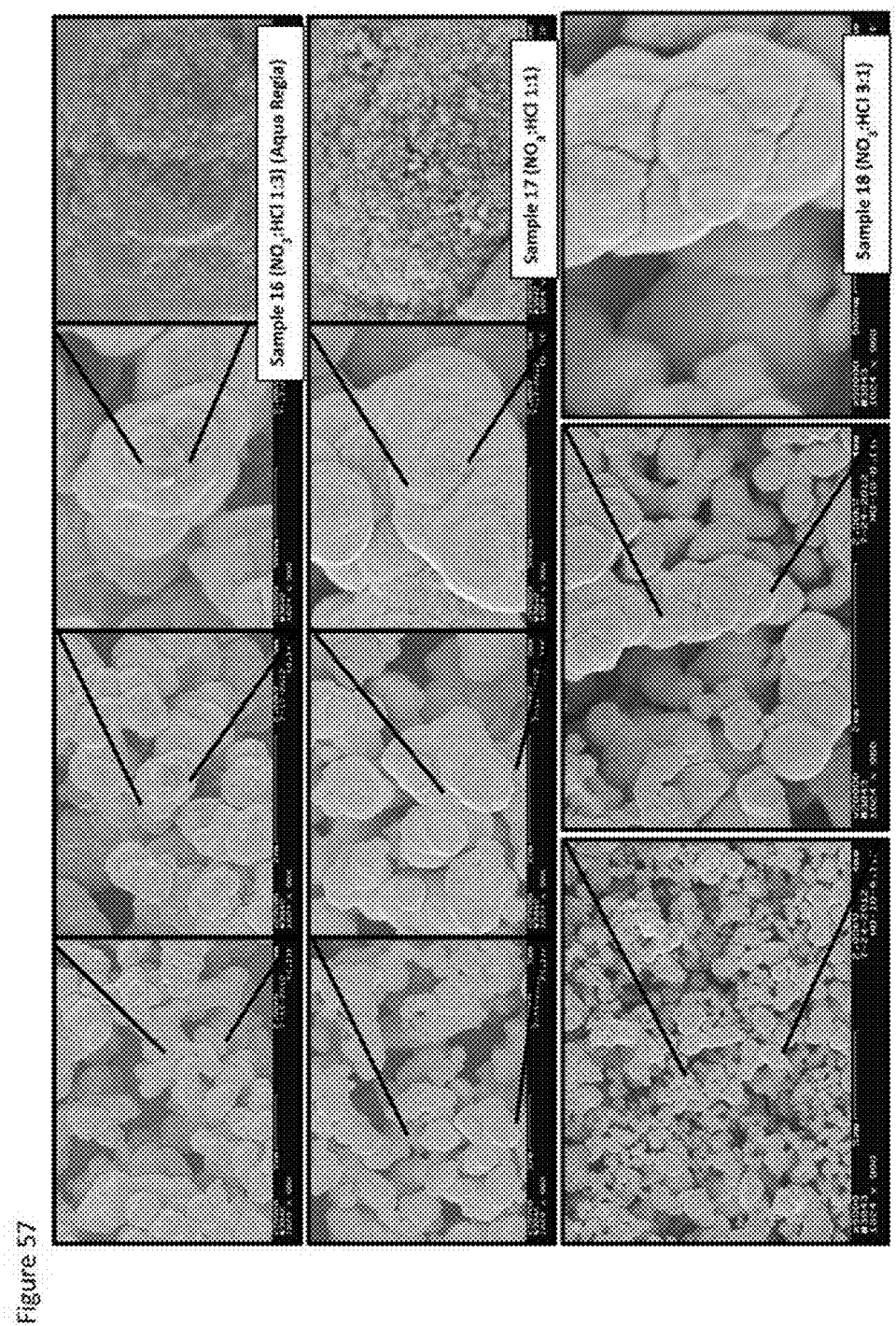
FIG. 57 shows SEM images of mesoporous metal oxides having mixed acid systems of this disclosure with a final heating temperature of 250° C., as prepared in Example 7.

FIG. 56 shows the low angle PXRD patterns of mesoporous metal oxide materials of this disclosure synthesized with different $HNO_3$:HCl volume ratios. Regardless of the acid ratio (from 1:0 to 1:3 $HNO_3$:HCl) all materials give similar low angle diffraction patterns with small shifts in the peak position. The availability of various acid types and mixtures suggests the use of other acids. The system is not sensitive to the acid type used. Moreover, this acid type insensitivity to the nature of the current synthetic approach is further confirmed by SEM data (see FIG. 57). No observable change is seen from both low angle high magnification SEM images. The general morphology consists of rounded micron sized particles. The preparation of the mesoporous metal oxide materials of this disclosure with various acids or acids mixtures can effect of counter anion of the acid source on the solubility and the micellization of the surfactant systems. FIG. 57 depicts SEM images of mesoporous metal oxides having mixed acid systems. The final heating was 250° C.

Example 8

Synthesis of Mesoporous Transition Metal Oxides Using Organic Additives

Various transition metal oxides were synthesized by following procedure. 0.01 mol $M(NO_3)_x \cdot yH_2O$ (M=Mn, Fe, Co, Ni, Cu, Zn, Ti, Zr, Si, Ce, Gd, Sm, Al), 0.09-0.18 mol n-butanol (7-14 grams), 0.016-0.032 mol $HNO_3$, Pluronic® P123 surfactant or Pluronic® F127 surfactant (1-2 grams), $8.3\text{-}16.6 \times 10^{-4}$ mol of co-surfactant, and (0.1-0.2 grams) mesitylene (1,3,5-trimethylbenzene) (TMB) were mixed in a 50 milliliter beaker and homogenized by stirring at room temperature. The resulting clear solution was directly put in an oven running at 100° C.-120° C. (depending on the particular metal system) and kept at that temperature for 2-7 hours (variations of concentrations, temperature and duration of experiment depended on the particular metal system). Synthesized materials were washed with ethanol several times to remove organic components and dried in an oven running at 60° C. overnight. UCTs synthesized by organic additives are designated UCT-27. The organic additive, organic additive amount and metal system are given in Table 12.

TABLE 12

| Nomenclature | Organic Additive | Additive Amount (g) | Metal System |
|---|---|---|---|
| UCT-27 | TMB | 0.1 | Manganese |
| UCT-27 | TMB | 0.2 | Manganese |

Dry powders were heated in an oven at the following temperatures and time intervals; 150° C. (12 hours), 250° C. (4 hours), 350° C. (3 hours), 450° C. (2 hours) and finally at 550° C. (1 hour) (all heating steps applied in this order).

FIG. 58(a) shows the low angle PXRD patterns of as synthesized UCT-1 and UCT-27 (TMB). UCT-1 shows only one symmetric diffraction line centered around 3 degrees. This is believed to give the nano-particle size under the circumstances of random hexagonal packing. However UCT-27 (TMB) shows two distinct low angle diffraction lines in the same region suggesting a change in the mesostructure upon use of TMB. The formed mesostructure preserves its structure after several consecutive heating cycles (FIG. 58(b)). In addition, UCT-27 (TMB) also preserves one of the unique features of the mesoporous metal oxide materials of this disclosure, which is mesostructure and mesopore expansion upon heat treatments. This suggests that the use of an organic additive to the mesoporous metal oxide material synthesis results in a different member of the same family.

Figure 58:
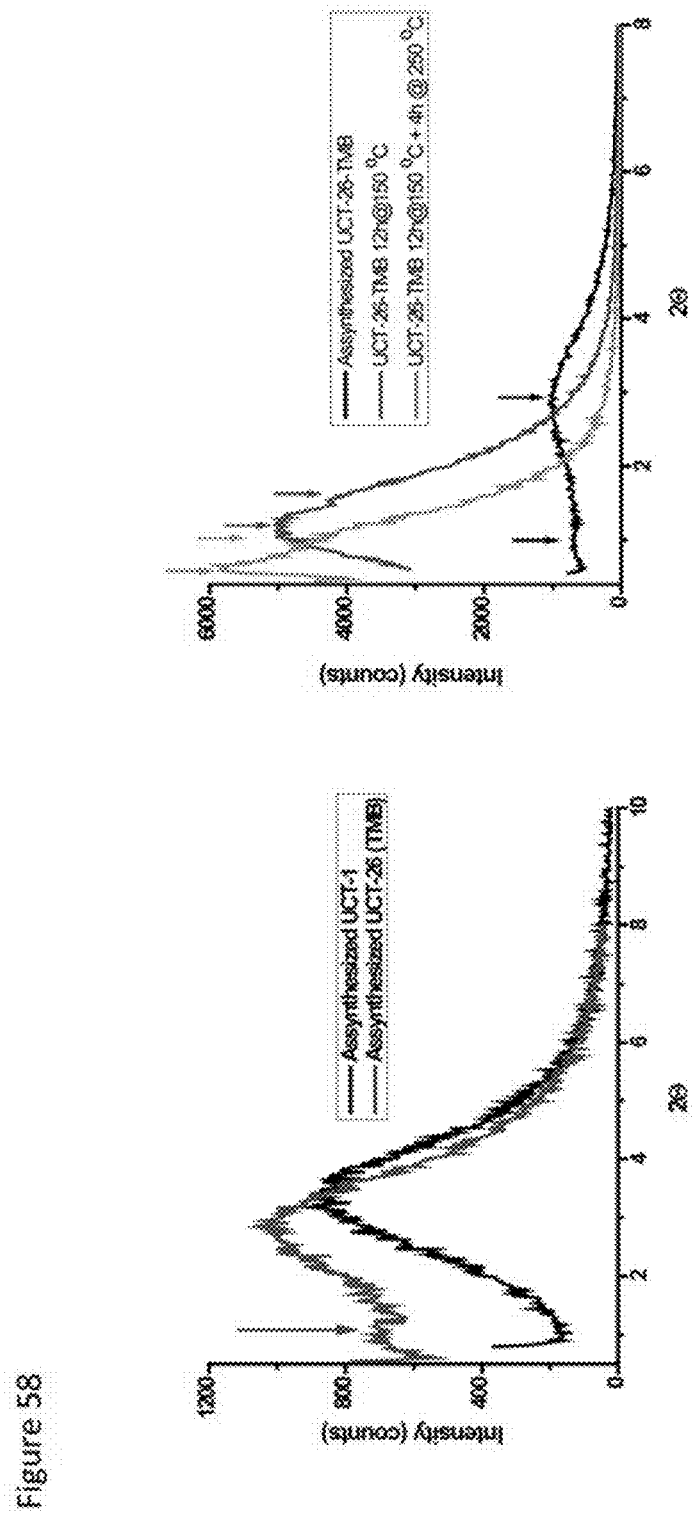
FIG. 58 shows the low angle powder X-ray diffraction (PXRD) patterns of mesoporous metal oxide materials of this disclosure (UCT-27) synthesized with organic additives prepared in Example 8.

Referring to FIG. 58, in the absence of TMB, one symmetric low angle diffraction can be attributed to random hexagonal packing (rhp) which is one of the thermodynamically stable phases in packing of nano sized rounded particles. The existence of TMB causes two observable, distinct low angle diffractions. The observed diffraction pattern for UCT-27 (TMB) samples is attributed to the body centered cubic (bcc) mesostructure, which is the thermodynamically most stable phase in packing of monodispersed spherical particles. Ideally, two identical systems having rhp and bcc mesostructures should have similar surface area values but different mesopore volumes. Since, the close packed spherical particles touches the neighboring particles in one infinite small point, the way the monodispersed spherical particles pack should not be affecting the obtained surface area.

Figure 59:
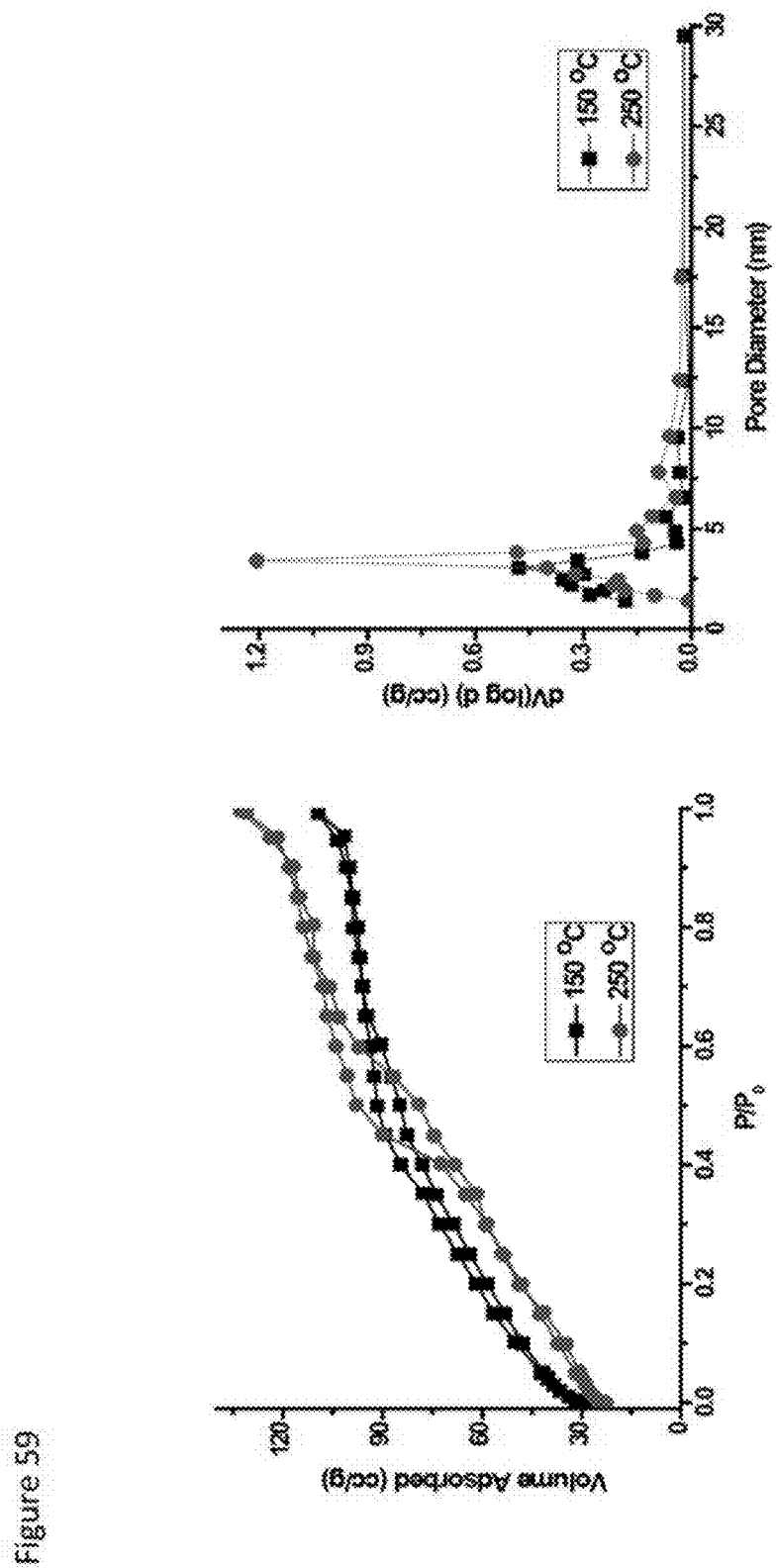
FIG. 59 depicts $N_2$ sorption isotherms and corresponding BJH desorption pore size distributions of mesoporous $Mn_2O_3$ materials (UCT-27) synthesized with TMB prepared in Example 8.

For further confirmation of the existence of a mesophase transition, $N_2$ sorption experiments were conducted (see FIG. 59). FIG. 59(a) shows $N_2$ sorption isotherms for UCT-27 (TMB) samples heated to two different final temperatures. Both materials show type IV adsorption isotherms which are characteristic of mesoporous materials. The adsorption step is shifted to higher relative pressure for the sample heated up to 250° C. indicating a pore expansion. The mesopore size distributions of this material are further examined by plotting BJH desorption size distributions for these samples (see FIG. 59(b)). Heating the UCT-27 (TMB) sample from 150° C. to 250° C. increases the mesopore diameter by 1 nm. Despite UCT-1 and UCT-27 (TMB) having similar surface areas and pore sizes, the pore volumes of the UCT-27 (TMB) samples are significantly higher than the TMB free counterpart (see Table 13).

TABLE 13

| Meso-Manganese Oxide | SA ($m^2/g$) | BJH Des. Pore Size (nm) | BJH Pore Volume (cc/g) |
|---|---|---|---|
| UCT-1 (150° C.) | 250 | 2.0 | 0.140 |
| UCT-2 (250° C.) | 200 | 2.8 | 0.153 |
| UCT-27 (TMB)-150° C. | 220 | 2.5 | 0.176 |
| UCT-27 (TMB)-250° C. | 167 | 3.2 | 0.226 |

Figure 60:
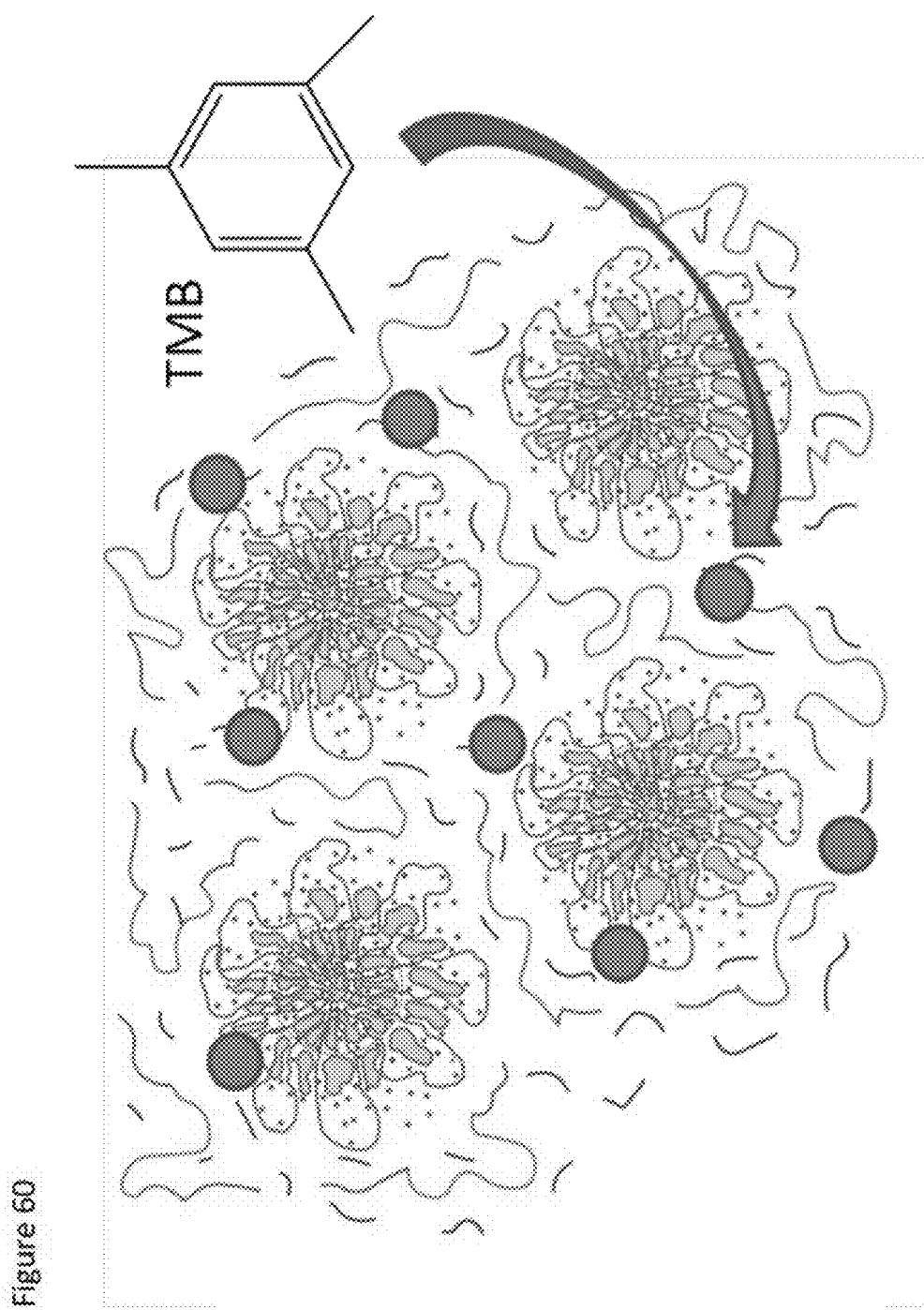
FIG. 60 is a schematic depiction of the effect of TMB on micelle assembly.

FIG. 60 illustrates the effect of addition of TMB in an inverse micelle containing a liquid crystal phase. TMB is positioned in intermicellar spacing mainly occupied by hydrophobic PPO groups of Pluronic® surfactants. TMB increases the hydrophobic volume in the system (system is formed by hydrophilic and hydrophobic volumes) and forces micelles to get organized in a cubic mesostructure.

Figure 61:
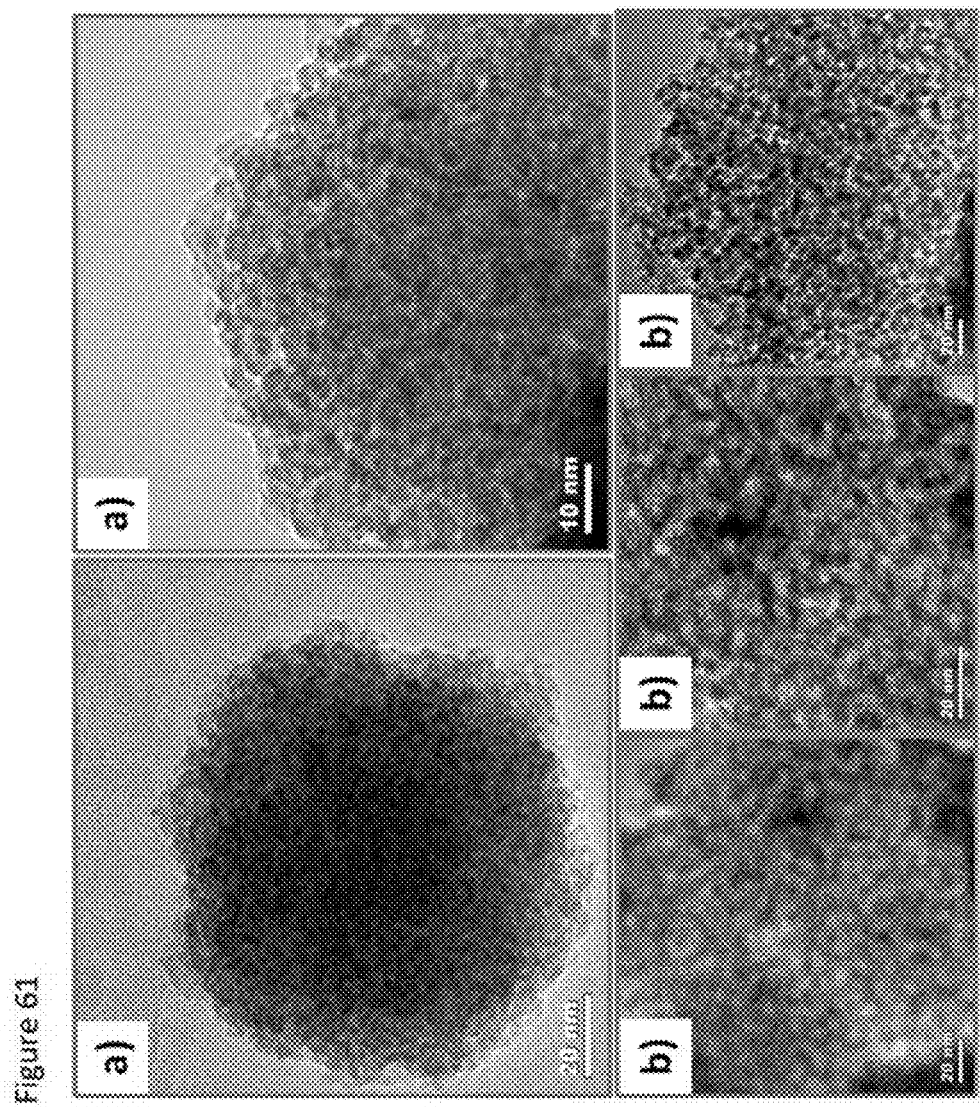
FIG. 61 shows high resolution transmission electron microscopy (TEM) images of manganese oxide TMB based mesoporous materials heated to two different final temperatures.

FIG. 61 shows the high resolution transmission electron microscopy (TEM) images of manganese oxide TMB based mesoporous materials heated to two different final temperatures. FIG. 61(a) shows TEM images of manganese oxide TMB based mesoporous materials heated to 150° C. FIG. 61(b) shows TEM images of manganese oxide TMB based mesoporous materials heated to 250° C. From the images, the materials are formed by assembly of nano-particles. The mesopores of the sample heated to 250° C. can easily be realized (see FIG. 61(b)).

Table 14 below lists the ingredients for the mesoporous metal oxide materials prepared in the Examples.

TABLE 14

| | Surfactants | Acids | Metal Source | Solvents |
|---|---|---|---|---|
| UCT-19 | Brij 56 - P123 | $HNO_3$ | $Mn(NO_3)_2 \cdot 4H_2O$ | 1-butanol |
| | Brij 58 - P123 | $HNO_3$ | $Mn(NO_3)_2 \cdot 4H_2O$ | 1-butanol |
| | CTABr - P123 | $HNO_3$ | $Mn(NO_3)_2 \cdot 4H_2O$ | 1-butanol |
| | SDS - P123 | $HNO_3$ | $Mn(NO_3)_2 \cdot 4H_2O$ | 1-butanol |
| | AOT - P123 | $HNO_3$ | $Mn(NO_3)_2 \cdot 4H_2O$ | 1-butanol |
| UCT-20 | 1-butanol- P123 | $HNO_3$ | $Mn(NO_3)_2 \cdot 4H_2O$ | 1-pentanol |
| UCT-21 | 1-butanol- P123 | $HNO_3$ | $Mn(NO_3)_2 \cdot 4H_2O$ | 1-hexanol |

TABLE 14-continued

| | Surfactants | Acids | Metal Source | Solvents |
|---|---|---|---|---|
| UCT-22 | 1-butanol- P123 | HNO$_3$ | Mn(NO$_3$)$_2$•4H$_2$O | Benzyl alcohol |
| UCT-23 | SDS - P123 | HNO$_3$ | Mn(NO$_3$)$_2$•4H$_2$O—Fe(NO$_3$)$_3$•9H$_2$O | 1-butanol |
| UCT-24 | SDS - P123 | HNO$_3$ | Mn(NO$_3$)$_2$•4H$_2$O—Fe(NO$_3$)$_3$•9H$_2$O—Co(NO$_3$)$_2$•6H$_2$O— | 1-butanol |
| UCT-25 | SDS - P123 | HNO$_3$ | Mn(NO$_3$)$_2$•4H$_2$O—Fe(NO$_3$)$_3$•9H$_2$O—Co(NO$_3$)$_2$•6H$_2$O—Ti(OCH(CH$_3$)$_2$)$_4$ | 1-butanol |
| UCT-26 | P123 | HNO$_3$—HCl | Mn(NO$_3$)$_2$•4H$_2$O | 1-butanol |
| UCT-27 | P123 | HNO$_3$ | Mn(NO$_3$)$_2$•4H$_2$O | 1-butanol &TMB (as organic additive) |

Table 15 below lists properties for the mesoporous metal oxide materials prepared in the Examples.

TABLE 15

| | Description | Surface Area (m$^2$/g) | Pore Volume (cc/g) | BJH Des. Pore Diameter (nm) | Low-Angle XRD peak position (nm) |
|---|---|---|---|---|---|
| UCT-19 | Brij 56 - P123 | 123 | 0.32 | 3.8 | 9.1 |
| | Brij 58 - P123 | — | — | — | 10.3 |
| | CTABr - P123 | 154 | 0.33 | 3.7 | 8.1 |
| | SDS - P123 | 178 | 0.32 | 3.7 | 6.2 |
| UCT-20 | Pentanol as solvent (+1 g butanol) | — | — | — | 14.0 |
| | Pentanol as solvent (+4 g butanol) | — | — | — | 5.9 |
| UCT-21 | Hexanol as solvent (+3 g butanol) | — | — | — | 5.0 |
| | Hexanol as solvent (+5 g butanol) | — | — | — | 10.7 |
| UCT-22 | Benzyl alcohol as solvent (+4 g butanol) | — | — | — | 4.1 |
| UCT-23 | Mn:Fe 1:1 | — | — | — | 5.5 |
| UCT-24 | Mn:Fe:Co 1:1:1 | — | — | — | 5.5 |
| UCT-25 | Mn:Fe:Co:Ti 1:1:1:1 | — | — | — | 10.5 |
| UCT-26 | HNO$_3$:HCl 1:3 | — | — | — | 5.7 |
| | HNO$_3$:HCl 1:1 | — | — | — | 7.7 |
| | HNO$_3$:HCl 3:1 | — | — | — | 9.1 |
| UCT-27 | TMB as organic additive & heated to 150° C. | 220 | 0.18 | 2.5 | 5.5 &7.3 |
| | TMB as organic additive & heated to 250° C. | 167 | 0.23 | 3.2 | 8.1 & 12.9 |

Example 9

Effect of Pore Volume and Shape on Catalysis

Figure 62:
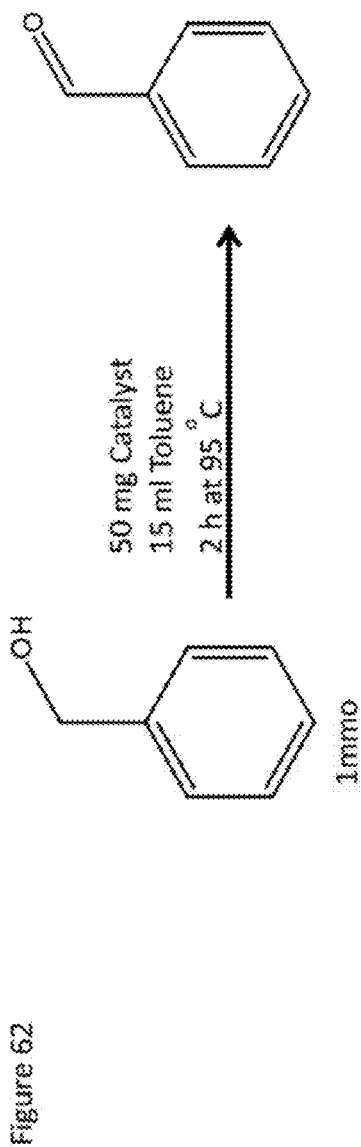
FIG. 62 depicts a benzyl alcohol oxidation reaction catalyzed by manganese based mesoporous metal oxide materials of this disclosure, and sets forth the results from the oxidation reaction.

The catalytic performance of porous materials shows strong dependency on physicochemical properties of the materials such as pore size, shape, and volume. The catalytic performance of manganese based mesoporous metal oxide materials was tested for benzyl alcohol oxidation. Manganese oxides are known to be good oxidation catalysts, therefore the potential of manganese based mesoporous metal oxide materials as an oxidation catalyst were tested for this reaction. FIG. 62 shows the reaction conditions and results for manganese based mesoporous metal oxide materials. Despite UCT-1 having the highest surface area compared to UCT-19 (SDS) and UCT-27 (TMB), this material shows lower activity. The higher activity for UCT-19 (SDS) and UCT-27 (TMB) is attributed to the slit like pore structure and higher pore volume respectively. All mesoporous metal oxide materials show much higher activity than non-porous manganese oxide materials.

Figure 63:
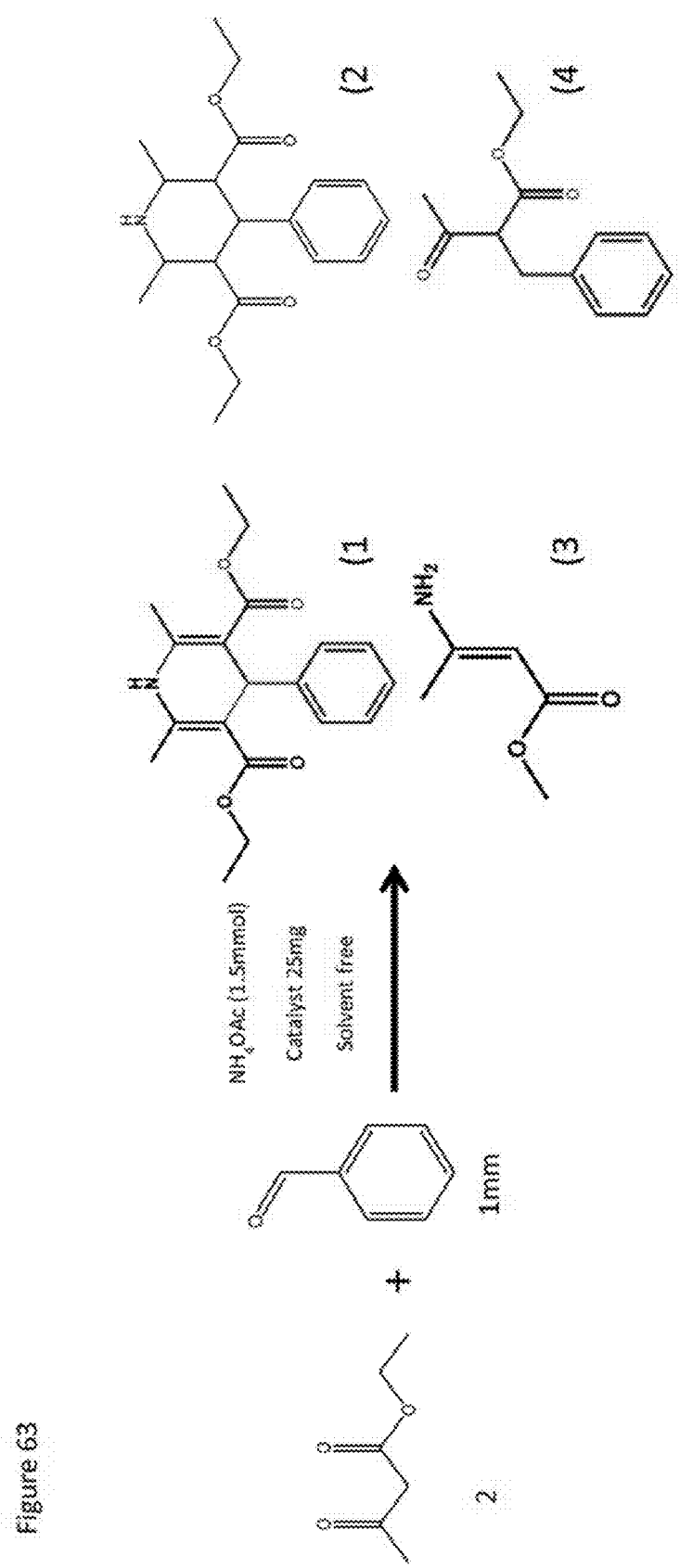
FIG. 63 depicts a Hantzsch reaction catalyzed by mesoporous iron oxide.

FIG. 63 depicts a Hantzsch reaction catalyzed by mesoporous iron oxide. The Hantzsch reaction was conducted in accordance with the conditions set forth in FIG. 64. Conversions and selectivities are set forth in FIG. 64. Compound 1 is a pharmaceutical compound.

Figure 65:
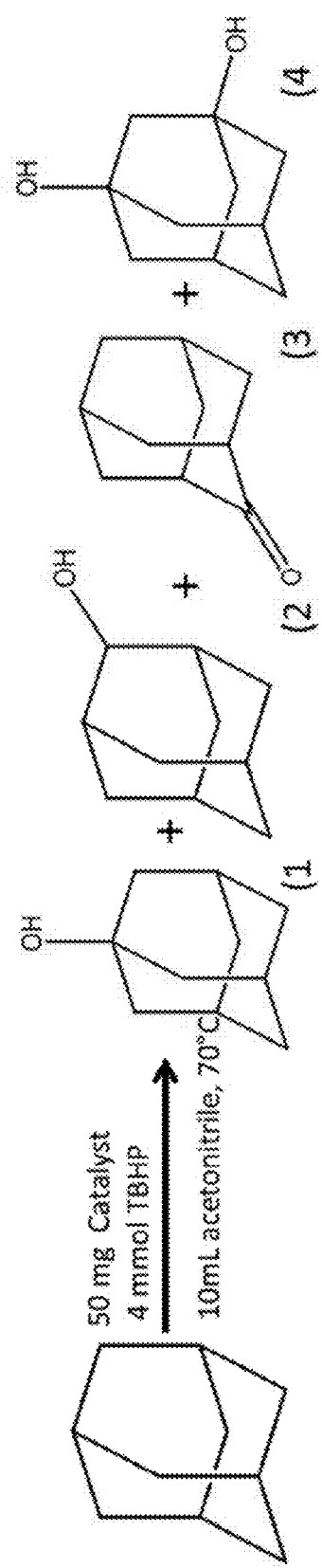
FIG. 65 depicts an adamantane oxidation reaction catalyzed by mesoporous manganese oxide.
Figure 66:
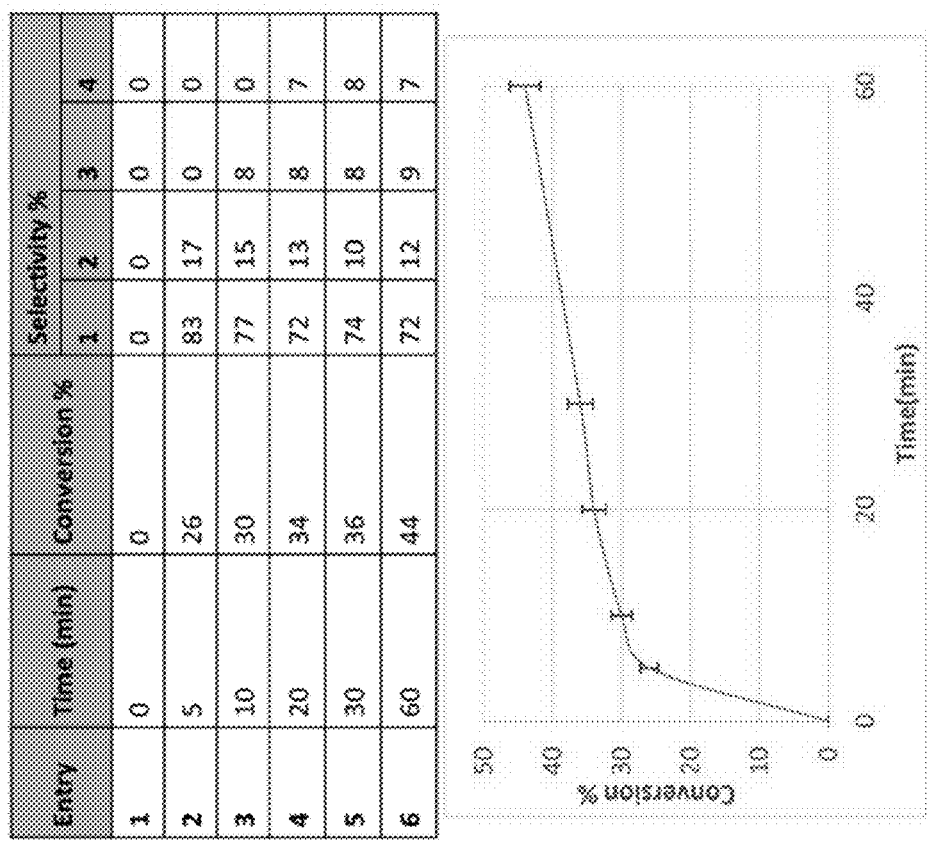
FIG. 66 sets forth the conditions and results generated from the adamantane oxidation reaction catalyzed by mesoporous manganese oxide depicted in FIG. 65.

FIG. 65 depicts an adamantane oxidation reaction catalyzed by mesoporous manganese oxide. The adamantane oxidation reaction was conducted in accordance with the conditions set forth in FIG. 66. Conversions and selectivities are set forth in FIG. 66.

Figure 67:
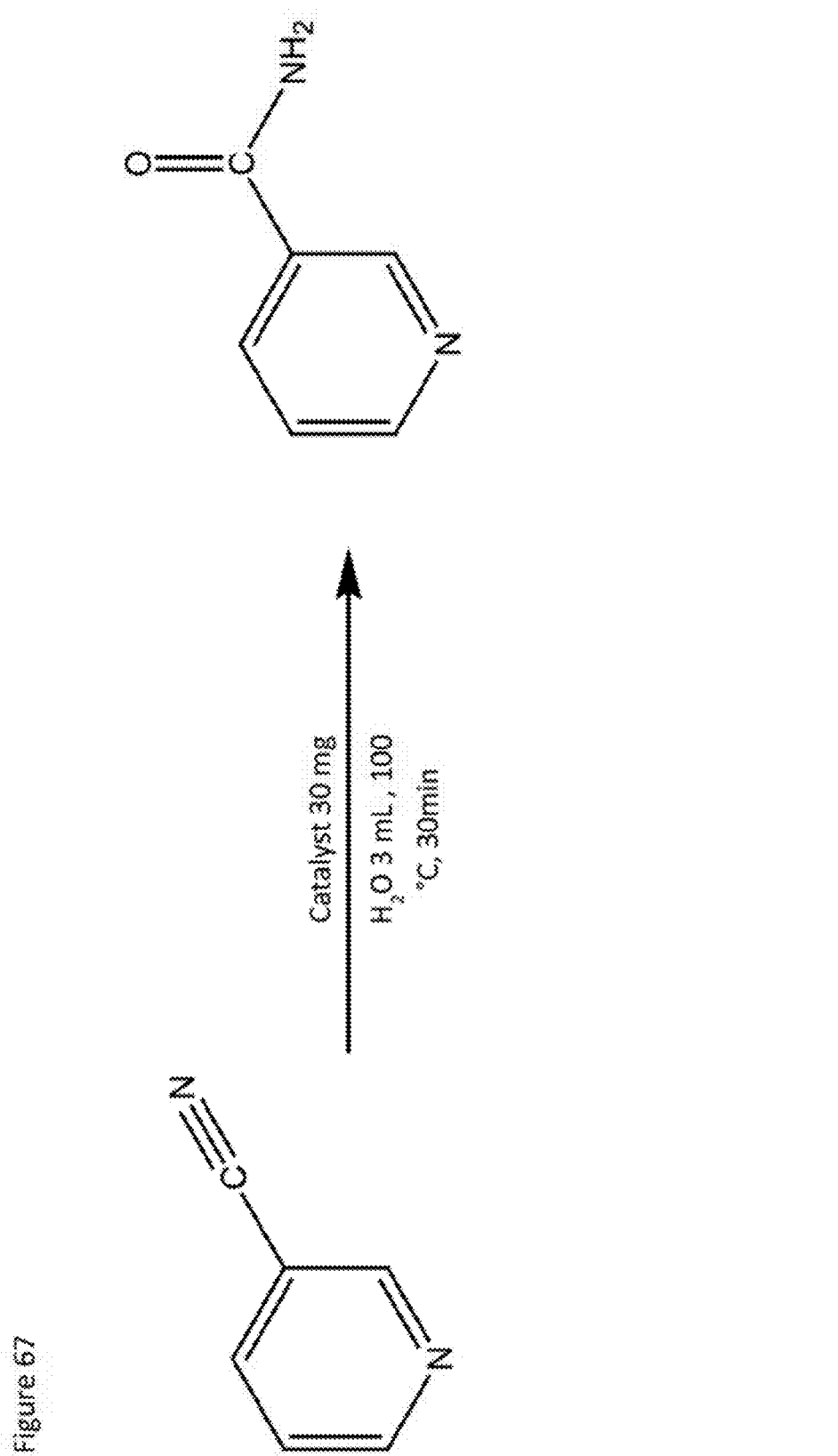
FIG. 67 depicts a hydration reaction catalyzed by mesoporous cerium oxide.

FIG. 67 depicts a hydration reaction catalyzed by mesoporous cerium oxide. The hydration reaction was conducted in accordance with the conditions set forth in FIG. 68. Conversions and selectivities are set forth in FIG. 68.

Figure 69:
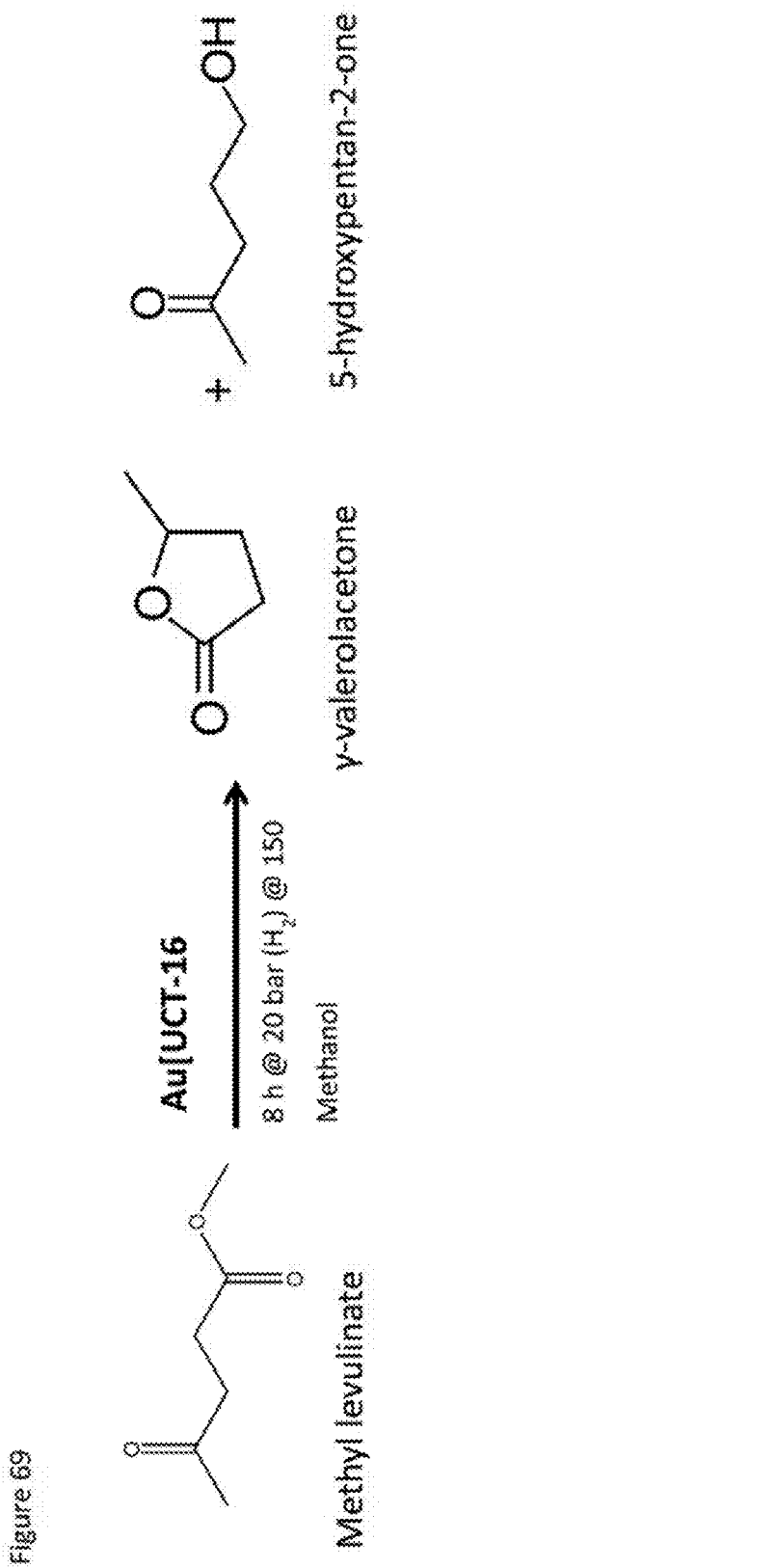
FIG. 69 depicts a hydrogenation reaction of methyl levulinate catalyzed by mesoporous cerium oxide supported nano-nobel metals.

FIG. 69 depicts a hydrogenation reaction of methyl levulinate catalyzed by mesoporous cerium oxide supported nano-noble metal. The noble metal loading was about 2%. The conversion was 100%. The selectivity to γ-valerolactone (GVL) was 52% and the selectivity to 5-hydroxypentan-2-one was 42%. The noble metal was added by deposition to the mesoporous material. Enhanced activity was observed in this biomass conversion reaction.

Figure 70:
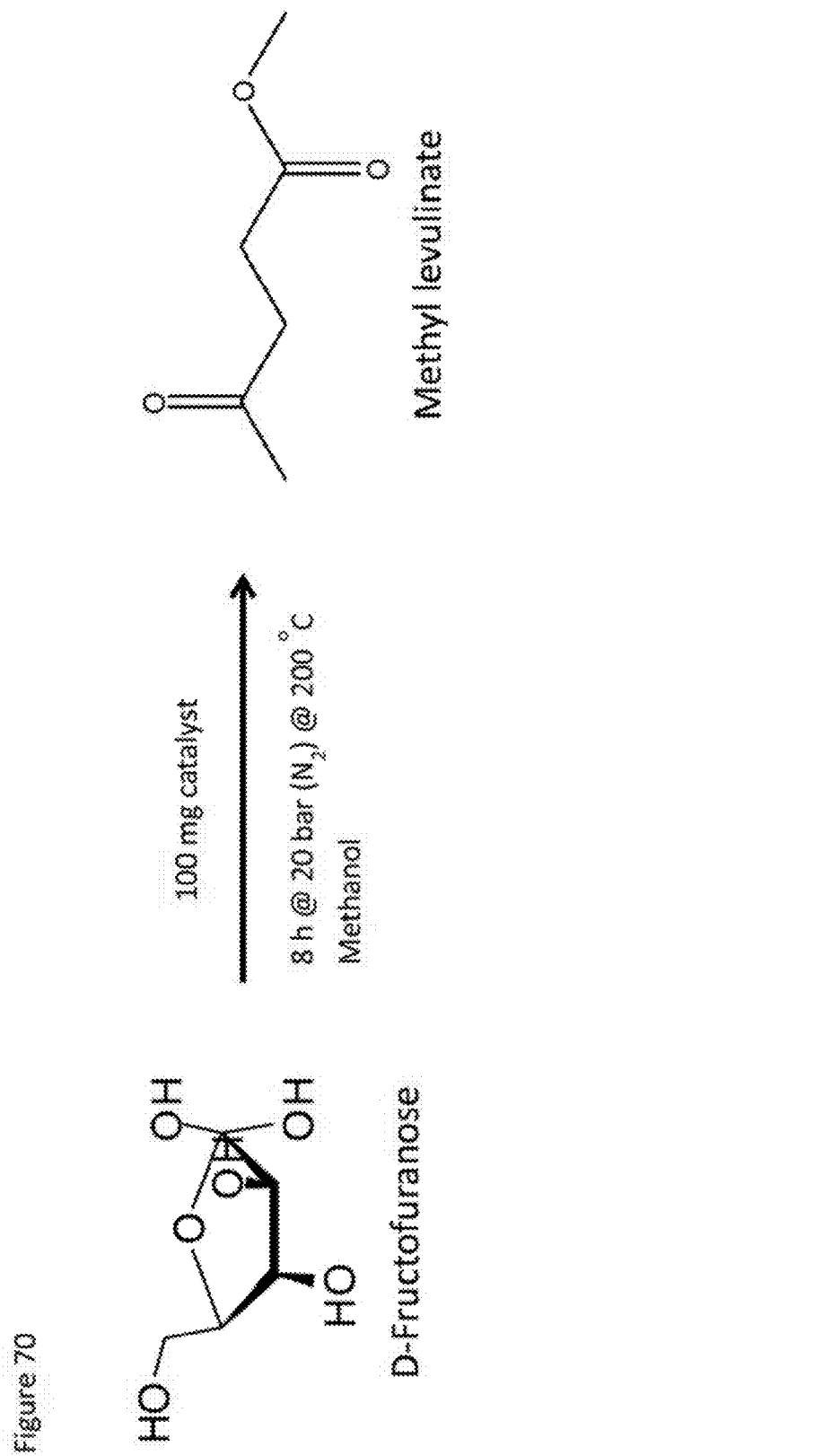
FIG. 70 depicts the conversion of a sugar (i.e., D-fructofuranose) to methyl levulinate.

FIG. 70 depicts the conversion of a sugar (i.e., D-fructofuranose) to methyl levulinate. The conversion was conducted in accordance with the conditions set forth in FIG. 71. The particular catalyst, temperature, conversions, selectivities and yields are set forth in FIG. 71. The mesoporous catalysts maintained high activity with no leaching of metal or sulfate into solution.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims. Also, the subject matter of the appended dependent claims is within the full intended scope of all appended independent claims.

What is claimed is:

1. A process for preparing a mesoporous metal oxide, said process comprising:
providing a micellar solution comprising one or more metal precursors, one or more surfactants, one or more interface modifiers, one or more hydrotropic nitrate ion precursors, and optionally one or more organic and/or inorganic additives; wherein said micellar solution comprises a dispersion of inverse micelles in which at least a portion of said one or more metal precursors are solubilized in the inverse micelles; and
heating the micellar solution at a temperature and for a period of time sufficient to form the mesoporous metal oxide.

2. The process of claim 1 which is a sol-gel micelle based process.

3. The process of claim 1 in which micellization and inter-micellar interaction are controlled by said one or more metal precursors, one or more surfactants, one or more interface modifiers, one or more hydrotropic nitrate ion precursors, and optionally one or more organic and/or inorganic additives.

4. The process of claim 1, wherein the heating step comprises:
heating the micellar solution at a temperature and for a period of time sufficient to form a dried powder; and
heating the dried powder at a temperature and for a period of time sufficient to form the mesoporous metal oxide.

5. The process of claim 4, wherein the micellar solution is heated sequentially as follows: at a temperature from about 75° C. to about 150° C. for a period from about 1 to about 12 hours; and at a temperature from about 40° C. to about 80° C. for a period from about 1 to about 12 hours.

6. The process of claim 4, wherein the dried powder is heated sequentially as follows: at a temperature from about 100° C. to about 200° C. for a period from about 2 to about 20 hours; at a temperature from about 200° C. to about 300° C. for a period from about 1 to about 10 hours; at a temperature from about 300° C. to about 400° C. for a period from about 1 to about 8 hours; at a temperature from about 400° C. to about 500° C. for a period from about 0.5 to about 4 hours; and at a temperature from about 500° C. to about 600° C. for a period from about 0.1 to about 2 hours.

7. The process of claim 4, wherein the dried powder is heated sequentially as follows: at a temperature of about 150° C. for a period of about 12 hours; at a temperature of about 250° C. for a period of about 4 hours; at a temperature of about 350° C. for a period of about 3 hours; at a temperature of about 450° C. for a period of about 2 hours; and at a temperature of about 550° C. for a period of about 1 hour.

8. The process of claim 4, further comprising washing the dried powder with an alcohol for a period of time sufficient to remove organic components therefrom.

9. The process of claim 1, wherein the one or more metal precursors are selected from the group consisting of a transition metal precursor, a Lanthanide metal precursor, a post-transition metal precursor, a metalloid precursor, and mixtures thereof.

10. The process of claim 9, wherein the transition metal precursor comprises a Group 3-12 transition metal precursor selected from the group consisting of a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursor.

11. The process of claim 9, wherein the Lanthanide metal precursor is selected from the group consisting of a La, Ce, Pr, Nd, Pm, Sm, Eu, Gd, Tb, Dy, Ho, Er, Tm, Yb and Lu precursor.

12. The process of claim 9, wherein the post-transition metal precursor is selected from the group consisting of an Al, Ga, In, Tl, Sn, Pb and Bi precursor.

13. The process of claim 9, wherein the metalloid precursor is selected from the group consisting of a B, Si, Ge, As, Sb, Te, Po and At precursor.

14. The process of claim 1, wherein the one or more metal precursors are selected from the group consisting of metal nitrates, metal alkoxides, metal halides, metal phosphates, metal acetates, and $M_xO_y$ oxides that are capable of dissolving in $HNO_3$.

15. The process of claim 1, wherein the one or more metal precursors are selected from the group consisting of $M(NO_3)_x \cdot yH_2O$ (M=Mn, Fe, Co, Cu, Zn), tetraethyl orthosilicate (TEOS), tetramethyl orthosilicate (TMOS), titanium butoxide, zirconium n-propoxide, zirconium butoxide, $Ce(NO_3)_3 \cdot 6H_2O$, $Gd(NO_3)_3 \cdot 6H_2O$, and $Sm(NO_3)_3 \cdot 6H_2O$.

16. The process of claim 1, wherein the one or more interface modifiers comprise an aliphatic, alicyclic or aromatic hydrocarbon, oxygenated hydrocarbon or terpenoid hydrocarbon, of between about 1 and about 20 carbon atoms, or mixtures thereof, that allows the surfactant to organize itself into inverse micelles.

17. The process of claim 1, wherein the one or more hydrotropic nitrate ion precursors comprise $HNO_3$.

18. The process of claim 1, wherein the one or more surfactants comprise an anionic, cationic, non-ionic, or zwitterionic surfactant, or mixtures thereof.

19. The process of claim 1, wherein the one or more surfactants comprise an EO/PO copolymer surfactant, or a surfactant represented by the formula

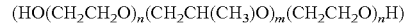
$(HO(CH_2CH_2O)_n(CH_2CH(CH_3)O)_m(CH_2CH_2O)_nH)$ wherein m and n are the same or different, m is a value from about 10 to about 150, and n is a value from about 5 to about 150, or a surfactant represented by the formula

$(PPO)_x(PEO)_y(PPO)_z$ wherein PPO is polypropylene oxide, PEO is polyethylene oxide, and x, y and z are values sufficient for the surfactant to have a hydrophilic-lipophilic balance (HLB) from about 1 to about 18.

20. The process of claim 1, wherein the one or more surfactants comprise

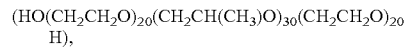
$(HO(CH_2CH_2O)_{20}(CH_2CH(CH_3)O)_{30}(CH_2CH_2O)_{20}H)$,

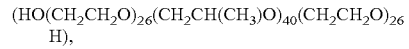
$(HO(CH_2CH_2O)_{26}(CH_2CH(CH_3)O)_{40}(CH_2CH_2O)_{26}H)$,

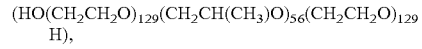
$(HO(CH_2CH_2O)_{129}(CH_2CH(CH_3)O)_{56}(CH_2CH_2O)_{129}H)$,

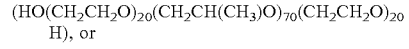
$(HO(CH_2CH_2O)_{20}(CH_2CH(CH_3)O)_{70}(CH_2CH_2O)_{20}H)$, or

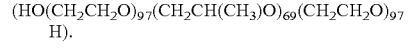
$(HO(CH_2CH_2O)_{97}(CH_2CH(CH_3)O)_{69}(CH_2CH_2O)_{97}H)$.

21. The process of claim 1, wherein the one or more surfactants comprise a Triton® surfactant, a Tween® surfactant, glucose, or an AB or BC polymer surfactant, wherein A is polyisoprene butylene, B is styrene, and C is selected from glucose, amine, carboxyl group-containing compound, and polyethylene glycol (PEG).

22. The process of claim 1, wherein the one or more organic additives comprise urea, decane, octane, benzene, trimethyl benzene or mesitylene (TMB), substituted benzene, polyethylene glycol, thiourea, ethylene diamine, styrene, pyrene, naphthalene, azobenzene, aromatic dye molecules, naphthalene, phenolic compounds, formaldehyde, PPO, PEO, D-fructose, glucose, sucrose, cellulose, starch, citric acid, phenol, aromatic alcohols, aliphatic alcohols, carboxylic acids, phosphates, oleyl ether, lysine, glycine, glutamic acid, tosylate, carboxyl, acetylacetonate, lauric acid, toluene, cyclohexene, terpene, terpenoid hydrocarbons, citrus terpenes, d-limonene, or mixtures thereof.

23. The process of claim 1, wherein the one or more inorganic additives comprise aprotic and protic ionic liquids, ethylammonium nitrate (EAN), ethanolammonium nitrate (EOAN), diethanolammonium formate (DEOAF), laponite, $[C_2H_3Si(OC_2H_5)_3]$, (TESE, capping agent), $H^+$, 4R-ammonium, ammonium, $K^+$, $Na^+$, $Li^+$, $Mg^{2+}$, $Ca^{2+}$, guanidinium, $OSO_3^-$, $SO_3^-$, $OPO_3^-$, $F^-$, $Cl^-$, $Br^-$, $I^-$, $SO_4^{2-}$, $SCN^-$, $HPO_4^{2-}$, acetate, $NO_3^-$, $ClO_4^-$, or mixtures thereof.

24. The process of claim 1, wherein the mesoporous metal oxide has a pore size (diameter) between about 1.5 nanometers and about 50 nanometers.

25. The process of claim 1 which is conducted under process conditions sufficient to control pore size and pore size distribution of the metal oxide and crystal structure of nano-sized metal oxide walls.

26. The process of claim 1, wherein the mesoporous metal oxide is selected from the group consisting of a transition metal oxide, a Lanthanide metal oxide, a post-transition metal oxide, a metalloid oxide, and mixtures thereof.

27. The process of claim 26, wherein the transition metal oxide comprises a Group 3-12 transition metal oxide selected from the group consisting of a Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg oxide.

28. The process of claim 26, wherein the Lanthanide metal oxide is selected from the group consisting of a La, Ce, Pr, Nd, Pm, Sm, Eu, Gd, Tb, Dy, Ho, Er, Tm, Yb and Lu oxide.

29. The process of claim 26, wherein the post-transition metal oxide is selected from the group consisting of an Al, Ga, In, Tl, Sn, Pb and Bi oxide.

30. The process of claim 26, wherein the metalloid oxide is selected from the group consisting of a B, Si, Ge, As, Sb, Te, Po and At oxide.

31. A mesoporous metal oxide produced by a process comprising:
providing a micellar solution comprising one or more metal precursors, one or more surfactants, one or more interface modifiers, one or more hydrotropic nitrate ion precursors, and optionally one or more organic and/or inorganic additives; wherein said micellar solution comprises a dispersion of inverse micelles in which at least a portion of said one or more metal precursors are solubilized in the inverse micelles; and
heating the micellar solution at a temperature and for a period of time sufficient to form the mesoporous metal oxide.

32. The mesoporous metal oxide of claim 31 in which the process is a sol-gel micelle based process.

33. The mesoporous metal oxide of claim 31 in which micellization and inter-micellar interaction in said process are controlled by said one or more metal precursors, one or more surfactants, one or more interface modifiers, one or more hydrotropic nitrate ion precursors, and optionally one or more organic and/or inorganic additives.

34. A method of controlling nano-sized wall crystallinity and mesoporosity in mesoporous metal oxides, said method comprising:
providing a micellar solution comprising one or more metal precursors, one or more surfactants, one or more interface modifiers, one or more hydrotropic nitrate ion precursors, and optionally one or more organic and/or inorganic additives; wherein said micellar solution comprises a dispersion of inverse micelles in which at least a portion of said one or more metal precursors are solubilized in the inverse micelles; and
heating the micellar solution at a temperature and for a period of time sufficient to control nano-sized wall crystallinity and mesoporosity in the mesoporous metal oxides.

35. The method of claim 34 which is a sol-gel micelle based method.

36. The method of claim 34 in which micellization and inter-micellar interaction in said method are controlled by said one or more metal precursors, one or more surfactants, one or more interface modifiers, one or more hydrotropic nitrate ion precursors, and optionally one or more organic and/or inorganic additives.

37. A mesoporous metal oxide particulate produced by the process of claim 1, having nano-sized wall crystallinity, a particle size between about 1 and about 500 nm, a BET surface area between about 50 and about 1000 $m^2/g$, a pore volume (BJH) between about 0.05 and about 2 $cm^3/g$, a monomodal pore size (BJH desorption) distribution between about 1 and 25 nm, and optionally a wall thickness ($2d/\sqrt{3}-$PD, where d is the d-spacing and PD is the pore diameter) between about 2 and about 20 nm; wherein the mesoporous metal oxide particulate exhibits thermal stability up to a temperature of about 800° C.

38. The mesoporous metal oxide particulate of claim 37 having a particle size between about 50 and about 300 nm, a BET surface area between about 60 and about 500 $m^2/g$, a pore volume (BJH) between about 0.075 and about 2 $cm^3/g$, a monomodal pore size (BJH desorption) distribution between about 2 and 13 nm, and optionally a wall thickness ($2d/\sqrt{3}-PD$, where d is the d-spacing and PD is the pore diameter) between about 4 and about 14 nm.

39. A method of tuning structural properties of mesoporous metal oxides, said method comprising:
selecting one or more metal precursors, one or more surfactants, one or more interface modifiers, and one or more hydrotropic nitrate ion precursors;
providing a micellar solution comprising said one or more metal precursors, one or more surfactants, one or more interface modifiers, one or more hydrotropic nitrate ion precursors, and optionally one or more organic and/or inorganic additives; wherein said micellar solution comprises a dispersion of inverse micelles in which at least a portion of said one or more metal precursors are solubilized in the inverse micelles; and
heating the micellar solution at a temperature and for a period of time sufficient to form the mesoporous metal oxides.

40. The method of claim 39, wherein the structural properties are selected from the group consisting of unit cell size, pore size, pore type, pore volume, mesostructure type, and surface morphology.

41. The method of claim 39 which is a sol-gel micelle based method.

42. The method of claim 39 in which micellization and inter-micellar interaction in said method are controlled by said one or more metal precursors, one or more surfactants, one or more interface modifiers, one or more hydrotropic nitrate ion precursors, and optionally one or more organic and/or inorganic additives.

\* \* \* \* \*

UNITED STATES PATENT AND TRADEMARK OFFICE
CERTIFICATE OF CORRECTION

PATENT NO.         : 9,452,933 B2                                    Page 1 of 1
APPLICATION NO.    : 14/037107
DATED              : September 27, 2016
INVENTOR(S)        : Steven L. Suib et al.

It is certified that error appears in the above-identified patent and that said Letters Patent is hereby corrected as shown below:

In the Specification

At Column 1, Line 12, insert:
--STATEMENT OF GOVERNMENT SUPPORT

This invention was made with government support under grant DE-FG02-86ER13622 awarded by the U.S. Department of Energy. The government has certain rights in the invention.--

Signed and Sealed this
Twenty-fifth Day of April, 2017

Michelle K. Lee
*Director of the United States Patent and Trademark Office*